United States Patent
Funabashi et al.

(10) Patent No.: US 9,242,448 B2
(45) Date of Patent: Jan. 26, 2016

(54) PRINTING PRESS AND PRINTING METHOD OF LENTICULAR LENS SHEET

(71) Applicants: Isao Funabashi, Ibaraki (JP); Koji Okasaka, Ibaraki (JP)

(72) Inventors: Isao Funabashi, Ibaraki (JP); Koji Okasaka, Ibaraki (JP)

(73) Assignee: KOMORI CORPORATION, Tokyo (JP)

( * ) Notice: Subject to any disclaimer, the term of this patent is extended or adjusted under 35 U.S.C. 154(b) by 0 days.

(21) Appl. No.: 14/065,325

(22) Filed: Oct. 28, 2013

(65) Prior Publication Data
US 2014/0116279 A1 May 1, 2014

(30) Foreign Application Priority Data

Oct. 29, 2012 (JP) ................................. 2012/237985
Oct. 29, 2012 (JP) ................................. 2012/237986

(51) Int. Cl.
| | |
|---|---|
| B41F 13/12 | (2006.01) |
| B41F 33/00 | (2006.01) |
| B41F 33/02 | (2006.01) |
| B41F 21/00 | (2006.01) |
| B41F 21/05 | (2006.01) |
| B41F 21/06 | (2006.01) |
| B41F 21/12 | (2006.01) |
| B41M 3/00 | (2006.01) |
| H04N 13/04 | (2006.01) |
| B41M 3/06 | (2006.01) |
| G02B 27/22 | (2006.01) |
| G02B 3/00 | (2006.01) |

(52) U.S. Cl.
CPC ................. *B41F 13/12* (2013.01); *B41F 21/00* (2013.01); *B41F 21/05* (2013.01); *B41F 21/06* (2013.01); *B41F 21/12* (2013.01); *B41F 33/00* (2013.01); *B41F 33/0027* (2013.01); *B41F 33/02* (2013.01); *B41M 3/003* (2013.01); *B41M 3/06* (2013.01); *B41P 2213/91* (2013.01); *B41P 2233/13* (2013.01); *G02B 3/005* (2013.01); *G02B 27/2214* (2013.01); *H04N 13/0404* (2013.01)

(58) Field of Classification Search
None
See application file for complete search history.

(56) References Cited

U.S. PATENT DOCUMENTS

| | | | | |
|---|---|---|---|---|
| 3,462,226 | A * | 8/1969 | Huffaker | 101/211 |
| 5,424,553 | A * | 6/1995 | Morton | 250/548 |
| 5,457,515 | A * | 10/1995 | Quadracci et al. | 101/483 |
| 5,689,340 | A * | 11/1997 | Young | 356/401 |
| 5,812,152 | A * | 9/1998 | Torigoe et al. | 347/2 |
| 5,967,032 | A * | 10/1999 | Bravenec et al. | 101/211 |
| 6,087,054 | A * | 7/2000 | Cobb et al. | 430/30 |

(Continued)

FOREIGN PATENT DOCUMENTS

JP 2007-152818 A 6/2007

*Primary Examiner* — Jill Culler
(74) *Attorney, Agent, or Firm* — Blakely Sokoloff Taylor & Zafman

(57) ABSTRACT

In a printing press of a lenticular lens sheet, a cocking adjustment unit adjusts the relative angle between a plate on which a pattern formed from a plurality of pattern portions is formed such that boundary lines between the adjacent pattern portions become parallel and a transparent lenticular lens sheet on which a plurality of lenses are formed such that groove lines between the adjacent lenses become parallel. An adjustment amount calculation unit calculates an adjustment amount for the cocking adjustment unit based on the relationship between the boundary lines and the groove lines in a state in which the lenticular lens sheet is overlaid on the plate. A printing method of a lenticular lens sheet is also disclosed.

18 Claims, 33 Drawing Sheets

(56) References Cited

U.S. PATENT DOCUMENTS

| | | | |
|---|---|---|---|
| 6,249,384 B1 * | 6/2001 | Cobb et al. | 359/623 |
| 6,481,844 B1 * | 11/2002 | Beery | 347/105 |
| RE38,065 E * | 4/2003 | Bravenec et al. | 101/211 |
| 7,593,132 B2 * | 9/2009 | Bast et al. | 358/1.9 |
| 8,217,972 B2 * | 7/2012 | Yoshida | 347/198 |

* cited by examiner

PRINTING PRESS AND PRINTING METHOD OF LENTICULAR LENS SHEET

BACKGROUND OF THE INVENTION

The present invention relates to a printing press for performing printing on a lenticular lens sheet and a printing method.

As shown in FIG. 45A, a lenticular lens sheet 1 is formed by arranging a plurality of long lenses each having a semicircular section in stripes at a pitch of 0.1 mm to 0.7 mm. As shown in FIG. 45B, pairs of pattern portions A1/B1, A2/B2, . . . , for right and left eyes are printed on the reverse surface of the lenticular lens sheet 1 at an interval of ½ the lens width. An observer views different images with depth on one lenticular lens sheet 1 in accordance with his/her observation direction. This realizes stereopsis by so-called optical illusion.

There are not only the above-described lenticules having a pattern printed on the lenticular lens sheet 1 to provide a view of a stereoscopic image but also lenticules that combine a plurality of totally different patterns to change the image depending on the viewing angle and lenticules that combine a plurality of gradually changing patterns to produce a moving image.

Such an effect of lenticules can be obtained by accurately positioning the lenticular lens sheet 1 formed by arranging a number of long lenses at a specific pitch and a pattern formed by arranging a number of long patterns at a specific pitch. Even in a very small amount, a positional shift between them makes it impossible to obtain the effect. For this reason, alignment between the lenticular lens sheet 1 and the pattern to be printed is very important.

Japanese Patent Laid-Open No. 2007-152818 (literature 1) proposes, as a register adjustment device of a printing press for performing printing on the lenticular lens sheet 1, a device that adjusts the position of a plate with respect to the lenticular lens sheet 1 using a register adjustment mechanism. In the technique of literature 1, when the operator inputs a misregistration amount to the control console, the register adjustment mechanisms of all printing units operate based on the misregistration amount and perform register adjustment of the plate cylinders.

In the technique of literature 1, however, the operator needs to visually confirm the misregistration amount of the printed lenticular lens sheet 1, determine the actual register adjustment amount based on the misregistration amount, and perform printing again after that. For this reason, a lot of rejected sheets are produced. As a result, the advantages of directly printing the pattern on the lenticular lens sheet 1, lead time shortening and large cost reduction, are lost.

SUMMARY OF THE INVENTION

The present invention has been made to solve the above-described problem, and has as its object to propose a printing press and a printing method of a lenticular lens sheet which can accurately print a pattern on a lenticular lens sheet while reducing the number of rejected sheets.

In order to achieve the above-mentioned object, according to an aspect of the present invention, there is provided a printing press of a lenticular lens sheet, comprising a cocking adjustment unit that adjusts a relative angle between a plate on which a pattern formed from a plurality of pattern portions is formed such that boundary lines between the adjacent pattern portions become parallel and the lenticular lens sheet on which a plurality of lenses are formed such that groove lines between the adjacent lenses become parallel and which is transparent, and an adjustment amount calculation unit that calculates an adjustment amount for the cocking adjustment unit based on a relationship between the boundary lines and the groove lines in a state in which the lenticular lens sheet is overlaid on the plate.

According to another aspect of the present invention, there is provided a printing method of a lenticular lens sheet, comprising the steps of positioning a plate and the lenticular lens sheet by overlaying the lenticular lens sheet on which a plurality of lenses are formed such that groove lines between the adjacent lenses become parallel and which is transparent, on the plate on which a pattern formed from a plurality of pattern portions is formed such that boundary lines between the adjacent pattern portions become parallel; and calculating, by an adjustment amount calculation unit based on a relationship between the boundary lines and the groove lines in a state in which the lenticular lens sheet is overlaid on the plate, an adjustment amount for a cocking adjustment unit that adjusts a relative angle between the plate an the lenticular lens sheet.

DESCRIPTION OF THE PREFERRED EMBODIMENTS

The embodiments of the present invention will now be described with reference to the accompanying drawings.

<First Embodiment>

<Arrangement of Four-Color Sheet-Fed Web Offset Printing Press>

Figure 1:
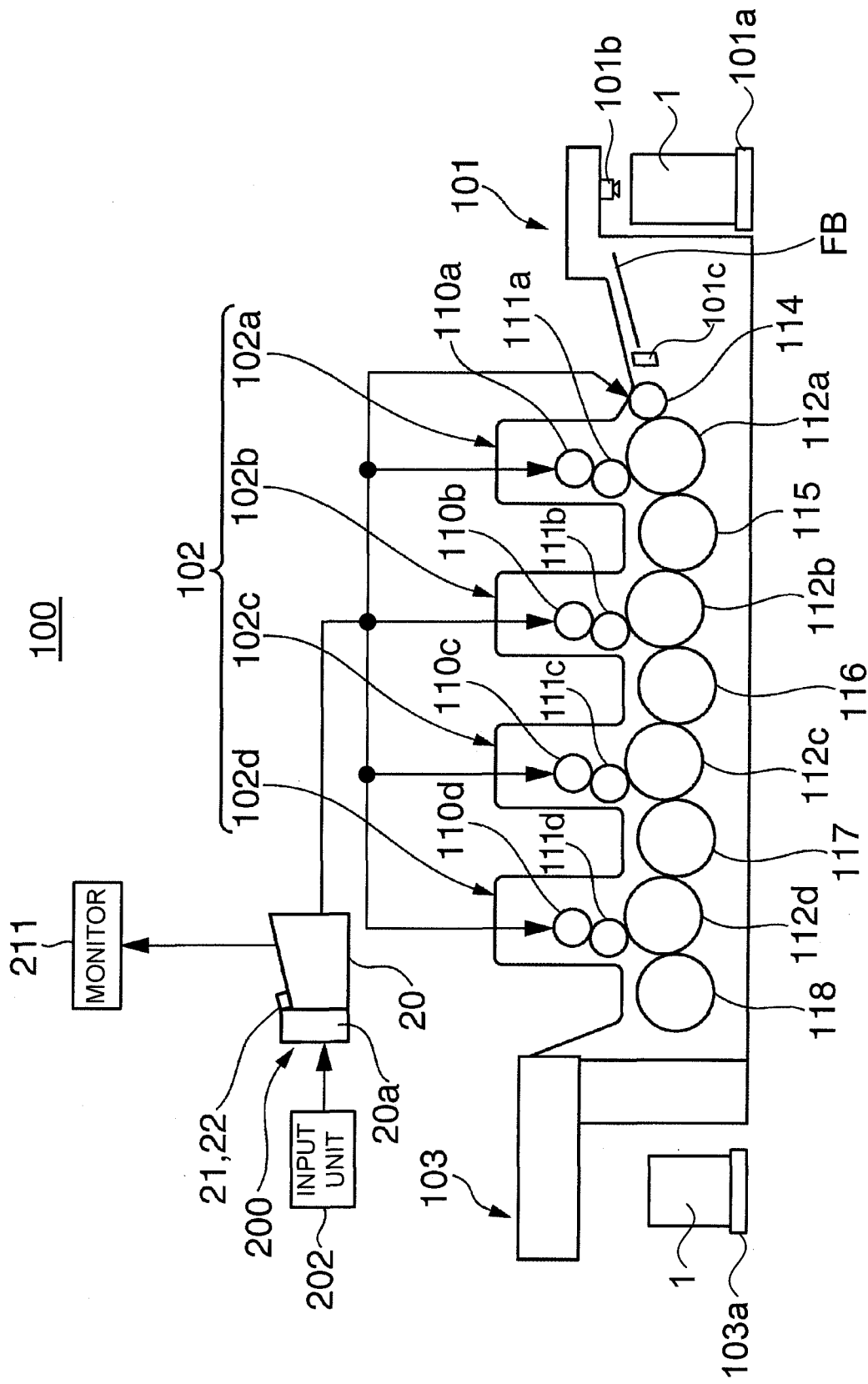
FIG. 1 is a side view showing the arrangement of a four-color sheet-fed web offset printing press.

As shown in FIG. 1, a four-color sheet-fed web offset printing press 100 that is a printing press includes a sheet supply device 101, a printing unit 102 including printing units 102a to 102d of four colors, a sheet delivery device 103, and a control console 200.

The sheet supply device 101 includes a suction device 101b that sucks and conveys one lenticular lens sheet 1 at the top of a bundle of lenticular lens sheets 1 placed on a stack board 101a, and a feeder board FB that conveys the lenticular lens sheet 1 conveyed from the suction device 101b to the printing unit 102. A front lay 101c that aligns the circumferential position of one end (leading-side end) of the lenticular lens sheet 1 is provided on the distal end side of the feeder board FB.

The printing units 102a to 102d of four colors include plate cylinders 110a to 110d, blanket cylinders (transfer cylinders) 111a to 111d, and impression cylinders (transport cylinders) 112a to 112d, respectively, The plate cylinders 110a to 110d are supported to rotatable with respect to the frame. The blanket cylinders 111a to 111d are supported to rotatable with respect to the frame, and have the outer surfaces in contact with the plate cylinders 110a to 110d, respectively. The impression cylinders 112a to 112d are supported to rotatable with respect to the frame, and have the outer surfaces in contact with the blanket cylinders 111a to 111d, respectively.

Notches (not shown) facing each other are formed in the outer surfaces of the plate cylinders 110a to 110d and those of the blanket cylinders 111a to 111d. A plate clamp configured to mount a plate is provided in the notch of each of the plate cylinders 110a to 110d. A blanket holding device that holds a blanket is provided in the notch of each of the blanket cylinders 111a to 111d.

Notches (not shown) facing those of the blanket cylinders 111a to 111d are formed in the outer surfaces of the impression cylinders 112a to 112d. A gripper device (not shown) configured to receive and convey the lenticular lens sheet 1 is provided in each of the notches.

A transfer cylinder 114 supported to be rotatable with respect to the frame is arranged in contact with the impression cylinder 112a. A swing arm shaft pregripper (not shown) is provided between the feeder board FB and the transfer cylinder 114. The swing arm shaft pregripper is supported by the frame to be swingable between the transfer cylinder 114 and the distal end side of the feeder board FB. The swing arm shaft pregripper is provided with grippers that receive and hold the leading-side end of the lenticular lens sheet 1.

A transfer cylinder 115 is disposed between the impression cylinder 112a and the impression cylinder 112b while being in contact with both of them. A transfer cylinder 116 is disposed between the impression cylinder 112b and the impression cylinder 112c while being in contact with both of them. A transfer cylinder 117 is disposed between the impression cylinder 112c and the impression cylinder 112d while being in contact with both of them. A transfer cylinder 118 in contact with the impression cylinder 112d is disposed on its downstream side in the sheet conveyance direction. The transfer cylinders 115 to 118 are supported to be rotatable with respect to the frame. Notches (not shown) facing those of the impression cylinders 112a to 112d are formed in the outer surfaces of the transfer cylinders 115 to 118 as well. A gripper device (not shown) configured to receive and convey the lenticular lens sheet 1 is provided in each of the notches.

The sheet delivery device 103 near the transfer cylinder 118 is provided with a stack board 103a for delivery on which the lenticular lens sheet 1 conveyed by a delivery chain (not shown) and a gripper bar included in the sheet delivery device 103 is stacked.

<Arrangement of Plate Cylinder>

All the plate cylinders 110a to 110d in the printing units 102a to 102d have the same arrangement. Hence, only the plate cylinder 110a will be described here.

Figure 2:
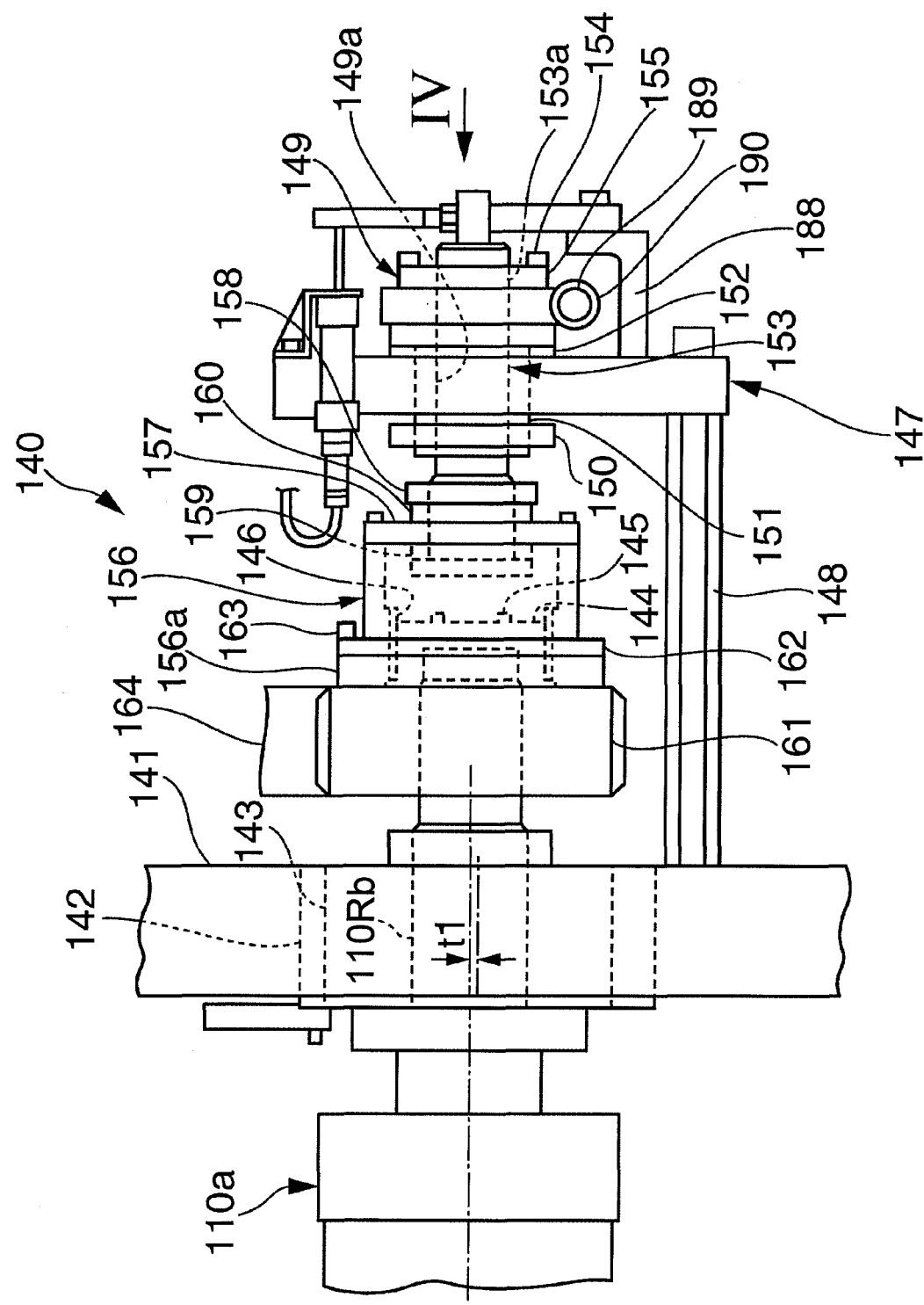
FIG. 2 is a front view showing the arrangement of the drive-side end of a plate cylinder in a plate cylinder register adjustment device.
Figure 3:
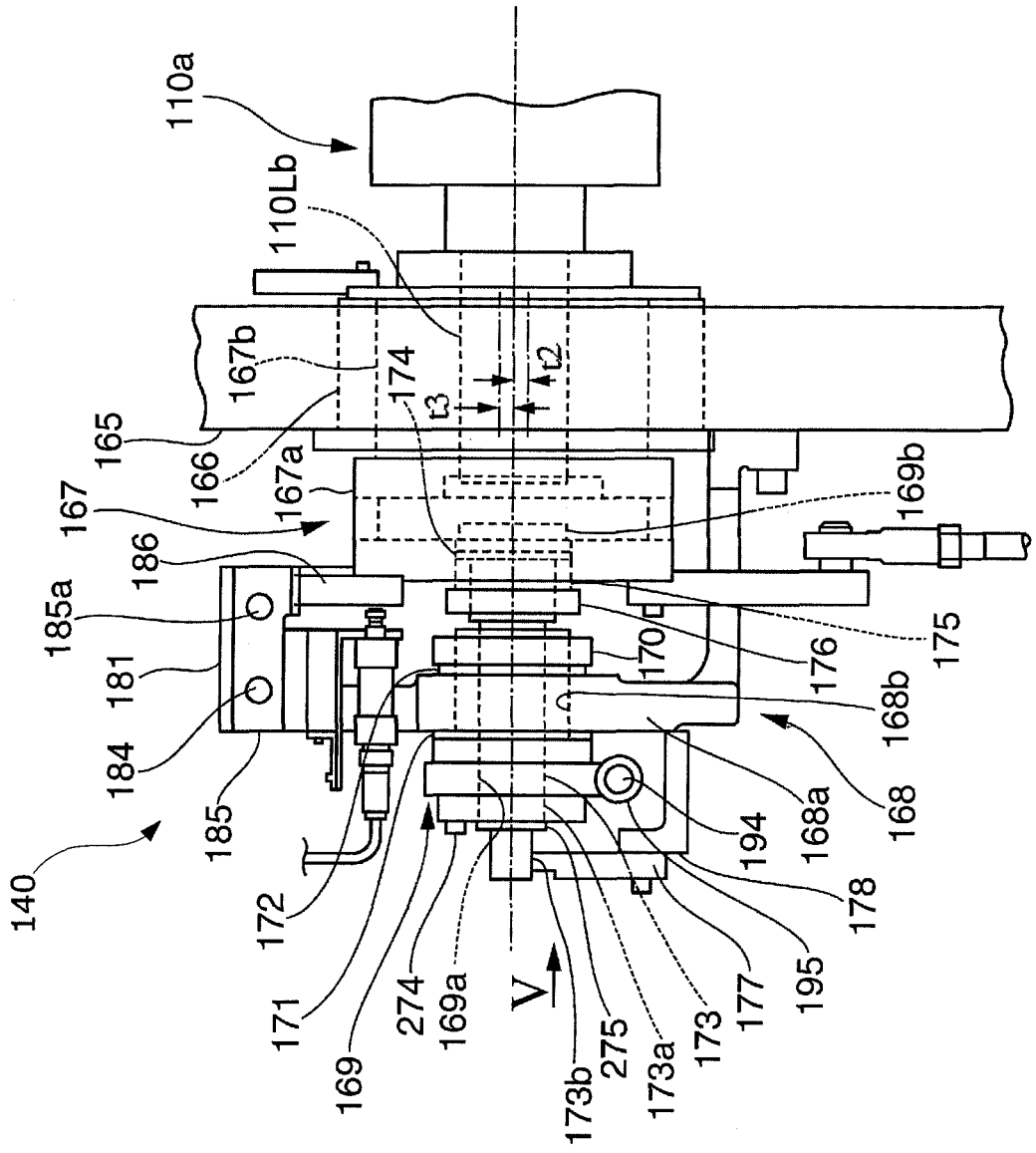
FIG. 3 is a front view showing the arrangement of the operation-side end of the plate cylinder in the plate cylinder register adjustment device.

As shown in FIGS. 2 and 3, the plate cylinder 110a includes end shafts 110Rb and 110Lb at the right and left side ends. The end shafts 110Rb and 110Lb are rotatably supported by a drive-side frame 141 and an operation-side frame 165, respectively. A plate cylinder register adjustment device 140 that adjusts the register of the plate cylinder 110a is provided outside the drive-side frame 141 and the operation-side frame 165 of the plate cylinder 110a.

The arrangement of the plate cylinder register adjustment device 140 will be described next with reference to FIGS. 2 to 5. Each of the plate cylinders 110a to 110d is provided with the plate cylinder register adjustment device 140. Since all the plate cylinder register adjustment devices 140 have the same structure, the plate cylinder register adjustment device 140 provided on the plate cylinder 110a will be described here.

Figure 11:
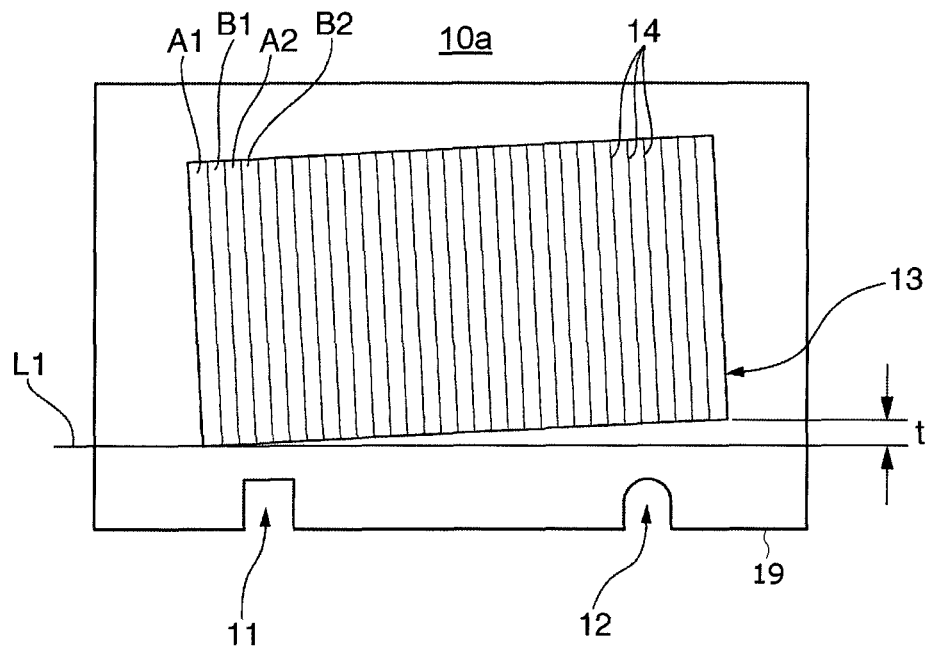
FIG. 11 is a plan view showing the arrangement of a plate.

As shown in FIG. 2, in the plate cylinder register adjustment device 140, an outer metal 142 is axially supported by the drive-side frame 141. The end shaft 110Rb of the plate cylinder 110a is axially supported by the outer metal 142 via an inner metal 143. A plate 10a as shown in FIG. 11 is attached to the outer surface of the plate cylinder 110a. The axis of the outer circumference of the outer metal 142 and that of the inner metal 143 and the plate cylinder 110a have an eccentric amount t1. An external gear 144 is fixed by bolts 145 to the end face of the end shaft 110Rb projecting outward from the drive-side frame 141. The external gear 144 meshes with an internal gear 146 to be described later.

A bracket 147 parallel to the drive-side frame 141 is provided outside the drive-side frame 141. The drive-side frame 141 and the bracket 147 are connected by a plurality of stays 148. A stepped worm wheel 149 is inserted in the bearing hole of the bracket 147 and tightened and fixed to the bracket 147 by a nut 150 threadably engaging with the distal-end threaded portion of the worm wheel 149. Thrust bearings 151 and 152 are arranged on both sides of the bracket 147.

A threaded portion 153a of a flanged screw shaft 153 threadably engages with an internal threaded hole 149a of the worm wheel 149. A screw plate 155 fixed to the worm wheel 149 by long holes and bolts 154 threadably engages with the distal end of the threaded portion 153a.

A circular plate 157 is screwed into one open end of a cylindrical coupling 156 having the internal gear 146 on the inner surface. One end of the screw shaft 153 is fitted in the hole of the circular plate 157 and fixed by the flange and a nut 158. The flange, the nut 158, and the circular plate 157 sandwich thrust bearings 159 and 160. This arrangement allows the screw shaft 153 and the coupling 156 to pivot with respect to each other, and regulates their movement in the axial direction.

A helical gear 161 is fixed to a flange portion 156a of the coupling 156 by a ring 162 and a bolt 163. The helical gear 161 threadably engages with a helical gear 164 on the drive side. Rotation on the drive side is transmitted to the plate cylinder 110a via the helical gears 164 and 161, the internal gear 146, and the external gear 144. In this case, since the external gear 144 and the internal gear 146 threadably slidably engage with each other, the coupling 156 can move in the axial direction without any problem.

As shown in FIG. 3, an outer metal 166 is axially supported by the operation-side frame 165 so as to pivot. An inner metal 167 is formed into a stepped shape by a hollow bracket portion 167a and a bearing portion 167b having a diameter smaller than that of the bracket portion 167a. The bearing portion 167b of the inner metal 167 is fitted in the outer metal 166 so as to pivot. The end shaft 110Lb of the plate cylinder 110a is rotatably supported by the hole of the bearing portion 167b.

The axis of the outer circumference of the outer metal 166 and that of the plate cylinder 110a have an eccentric amount t2 in FIG. 3. The axis of the outer circumference of the inner metal 167 and that of the plate cylinder 110a have an eccentric amount t3. The eccentric amounts t1 and t2 are necessary to adjust the printing pressure of the plate cylinder 110a on the blanket cylinder 111a.

Outside the operation-side frame 165, a vertical member 168a of a bracket 168 having an L shape when viewed from the front is fixed on the side of the operation-side frame 165 in parallel to it. A stepped worm wheel 169 is inserted in a bearing hole 168b of the vertical member 168a and tightened and fixed by a nut 170 threadably engaging with the distal-end threaded portion of the worm wheel 169. Thrust bearings 171 and 172 are arranged on both sides of the bracket 168.

A threaded portion 173a of a screw shaft 173 threadably engages with an internal threaded hole 169a of the worm wheel 169. A screw plate 275 fixed to the worm wheel 169 by long holes and bolts 274 threadably engages with the distal end of the threaded portion 173a.

A flange 169b of the screw shaft 173 is engageably inserted in the hollow portion of the bracket portion 167a via a thrust bearing 174. The screw shaft 173 and the bracket portion 167a are tightened and fixed by a nut 176 threadably engaging with the threaded portion via a thrust bearing 175.

This arrangement allows the screw shaft 173 and the bracket portion 167a to pivot with respect to each other, and regulates their movement in the axial direction. A whirl-stop 177 is supported by the bracket 168 via a bearing box 178 to be described later. To regulate the pivot of the screw shaft 173, the upper flat surface of the whirl-stop 177 abuts against a distal end 173b of the screw shaft 173.

Figure 4:
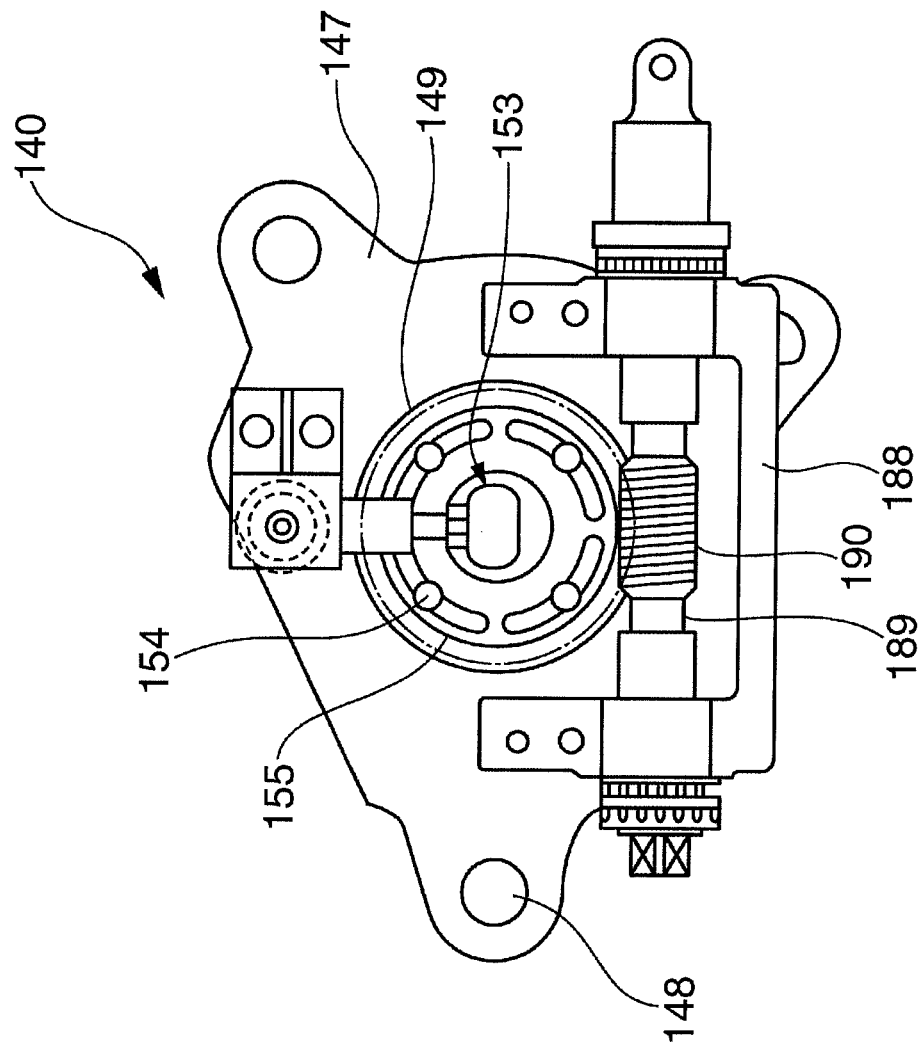
FIG. 4 is a side view observed in the direction of an arrow IV in FIG. 2.

As shown in FIGS. 2 and 4, a bearing box 188 formed into a box shape open upward is fixed to the bracket 147 on the drive side. A worm shaft 189 is axially supported by the bearing box 188. A worm 190 meshing with the above-described worm wheel 149 is axially supported by the worm shaft 189. In addition, the worm shaft 189 is connected to the motor shaft of a circumferential adjustment motor (not shown) serving as an actuator for plate cylinder register adjustment. Note that in the plate cylinder register adjustment device 140, the worm shaft 189, the worm wheel 149, the screw shaft 153, the coupling 156, and the helical gear 161 constitute a circumferential position adjustment mechanism that adjusts the circumferential register with respect to the lenticular lens sheet 1.

Figure 5:
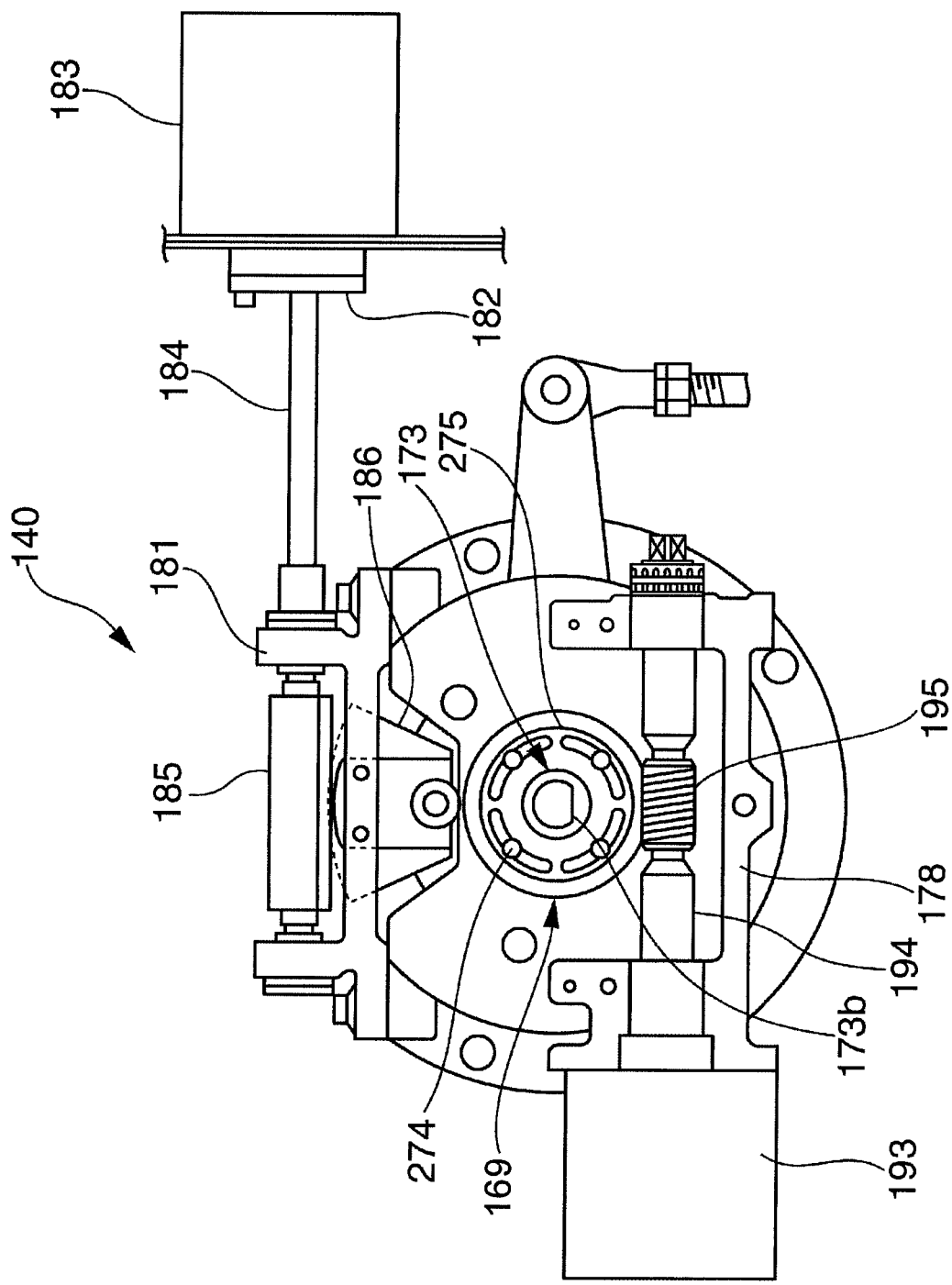
FIG. 5 is a side view observed in the direction of an arrow V in FIG. 3.

On the other hand, as shown in FIGS. 3 and 5, a lateral adjustment motor 193 serving as an actuator for plate cylinder register adjustment is fixed to the bearing box 178. A worm shaft 194 is connected to the motor shaft of the lateral adjustment motor 193. A worm 195 meshing with the worm wheel 169 is integrally formed on the worm shaft 194. Note that in the plate cylinder register adjustment device 140, the lateral adjustment motor 193, the worm wheel 169, the screw shaft 173, and the bracket portion 167*a* constitute a lateral position adjustment mechanism that adjusts the lateral register with respect to the lenticular lens sheet 1.

<Arrangement of Transfer Cylinder>

Figure 6:
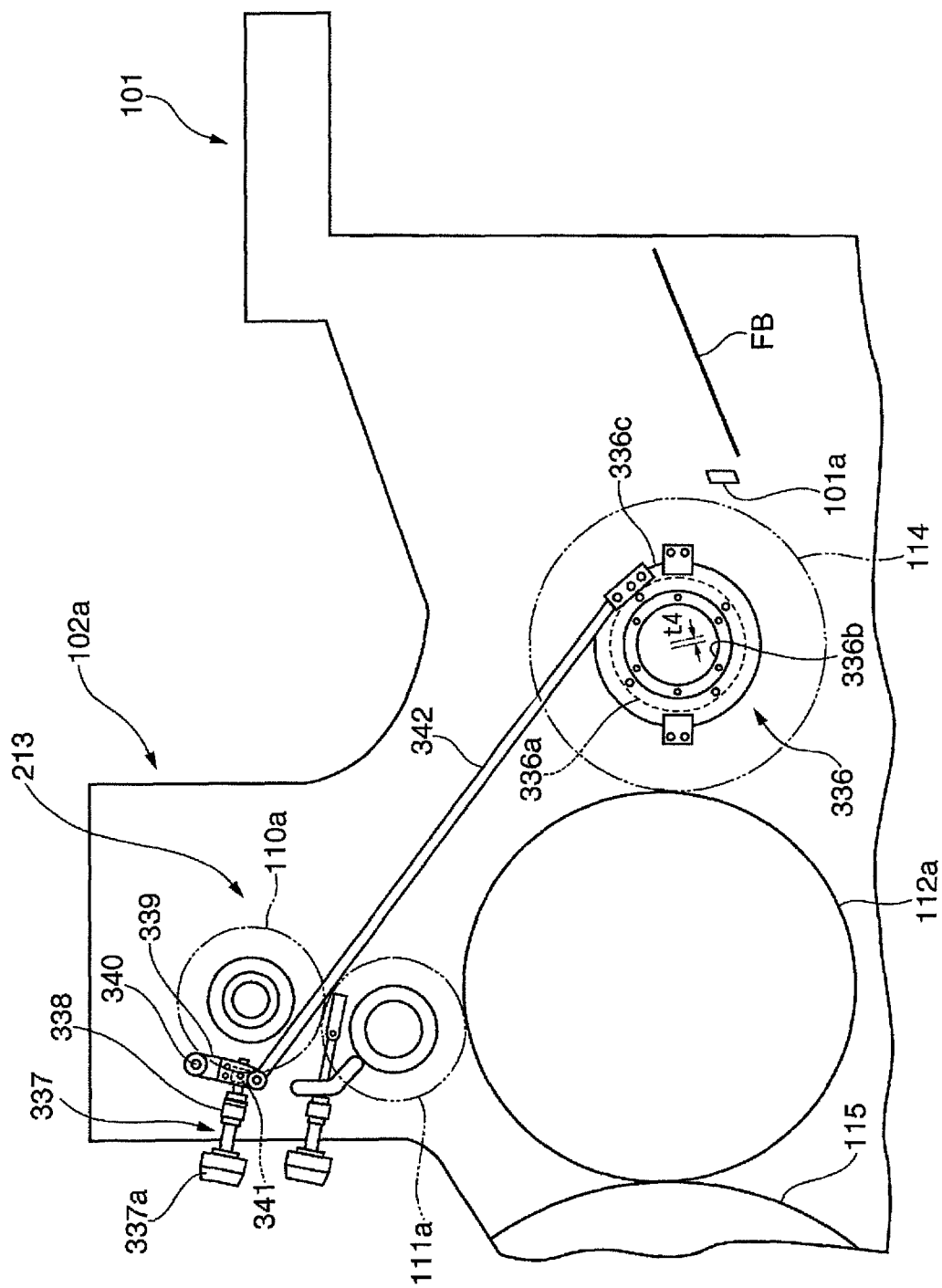
FIG. 6 is a side view showing the arrangement of a manual transfer cylinder cocking adjustment device.
Figure 7:
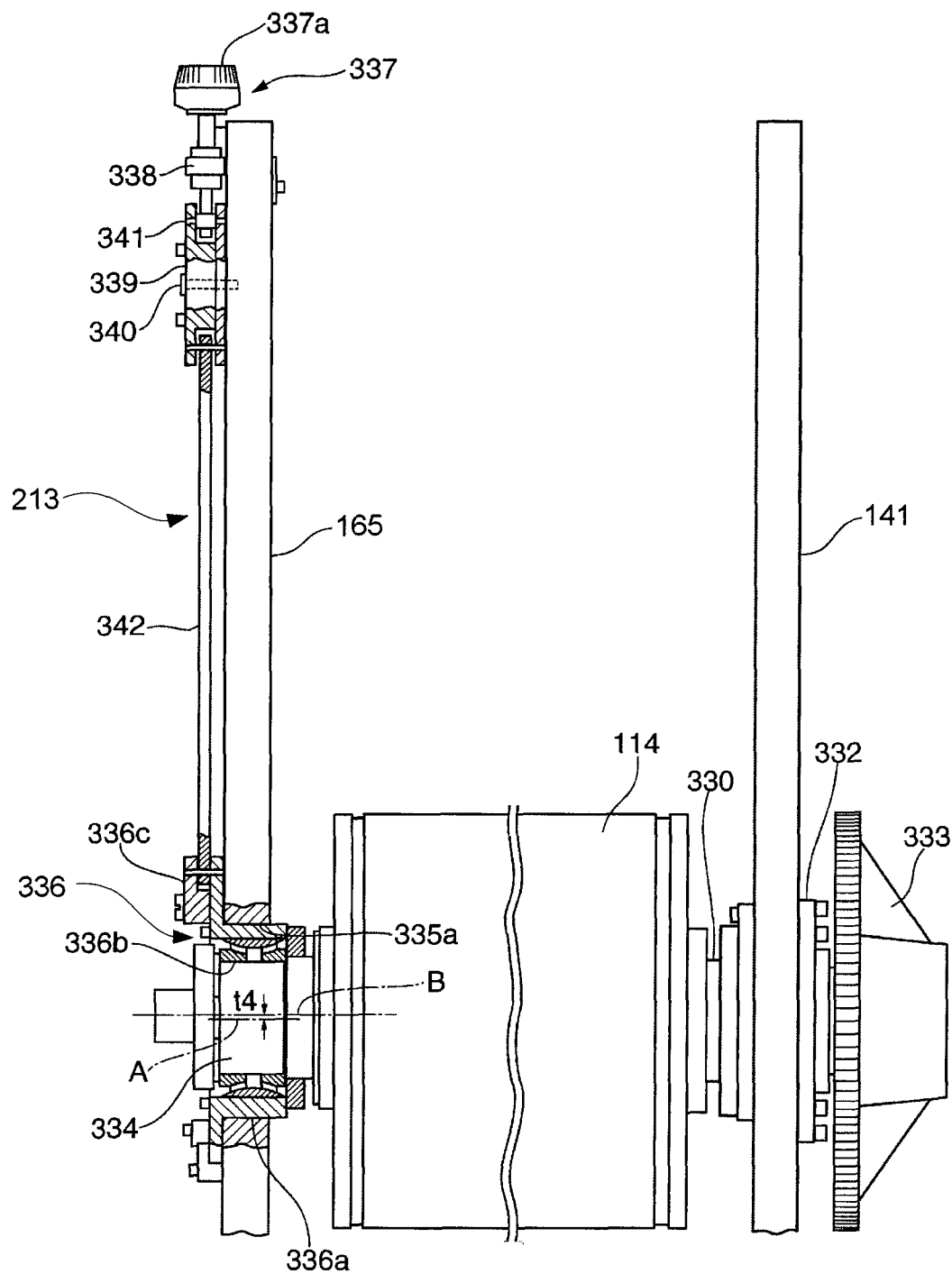
FIG. 7 is an exploded plan view showing the arrangement of the manual transfer cylinder cocking adjustment device.

The arrangement of the transfer cylinder 114 will be described next. As shown in FIGS. 6 and 7, the transfer cylinder 114 is the first transfer cylinder existing immediately after the feeder board FB and the swing arm shaft pregripper. A manual transfer cylinder cocking adjustment device 213 serving as a cocking adjustment unit that performs cocking adjustment for the transfer cylinder 114 is provided.

One end shaft 330 of the transfer cylinder 114 is supported to be rotatable with respect to a bearing 332 fitted in the bearing hole of the drive-side frame 141. A plate cylinder drive gear 333 connected to the drive side is axially supported by the end shaft 330. The other end shaft 334 of the transfer cylinder 114 is supported to be rotatable with respect to an eccentric bearing 336 fitted in a bearing hole 335*a* of the operation-side frame 165. An axis A of a frame-side outer circumference 336*a* fitted in the bearing hole 335*a* of the eccentric bearing 336 and an axis B of an end shaft-side internal circumference 336*b* have an eccentric amount t4.

On the other hand, a handle 337 with a dial 337*a* is supported at the end of the operation-side frame 165 on the side of the sheet delivery device 103 by a stud 338 embedded in the operation-side frame 165 so as to pivot. A lever 339 is pivotally attached to n the operation-side frame 165 by a pin 340 to be swingable.

The distal-end threaded portion of the handle 337 threadably engages with the threaded hole of a piece 341 attached to the swing end-side forked portion of the lever 339 to be movable. In addition, one end of a rod 342 is pivotally attached to the swing end-side forked portion of the lever 339, and the other end of the rod 342 is pivotally attached to a forked portion 336*c* formed on the flange portion of the eccentric bearing 336.

The handle 337 is used as an operation unit that causes the eccentric bearing 336 to pivot. Note that although FIG. 7 divisionally illustrates the forked portion to which the piece 341 is pivotally attached and the forked portion to which one end of the rod 342 is pivotally attached on the upper and lower sides because it is an exploded view, they are pivotally attached to the same forked portion in practice. The handle 337, the lever 339, the rod 342, and the eccentric bearing 336 constitute the manual transfer cylinder cocking adjustment device 213. The manual transfer cylinder cocking adjustment device 213 also functions as a sheet skewing device (cocking adjustment unit) that adjusts the angle of the lenticular lens sheet 1 with respect to the plate 10*a*.

<Arrangement of Control Console>

Figure 8:
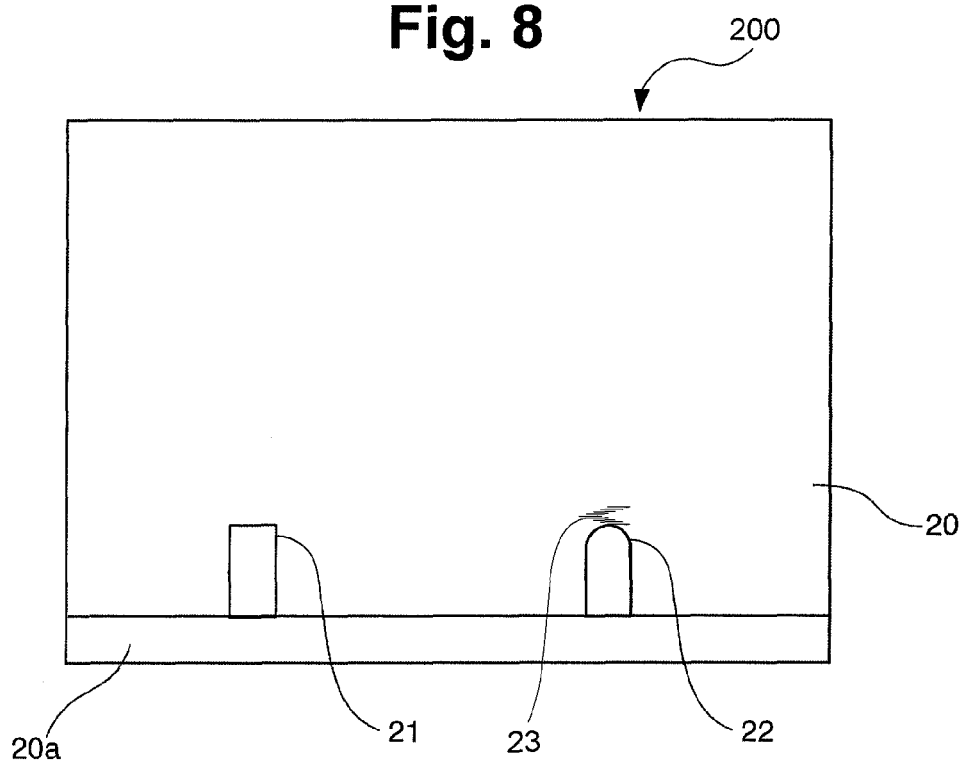
FIG. 8 is a plan view showing the arrangement of a control console.
Figure 12:
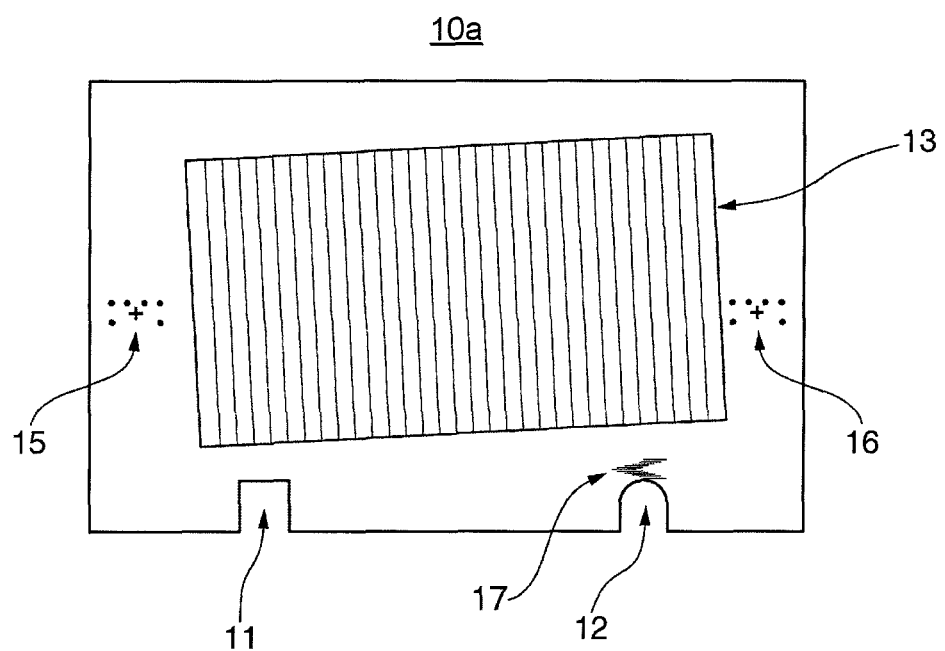
FIG. 12 is a plan view showing the arrangement of a plate provided with register marks and a pattern.
Figure 13A:
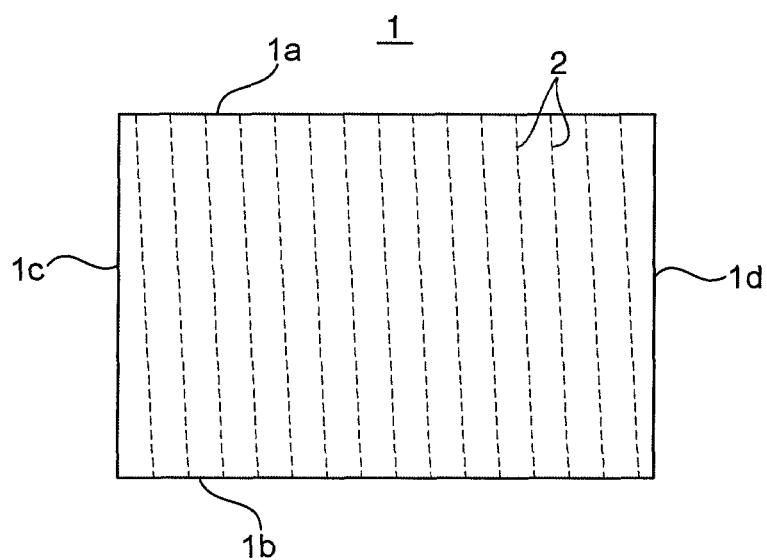
FIGS. 13A and 13B are plan views showing examples of the arrangement of a lenticular lens sheet.
Figure 13B:
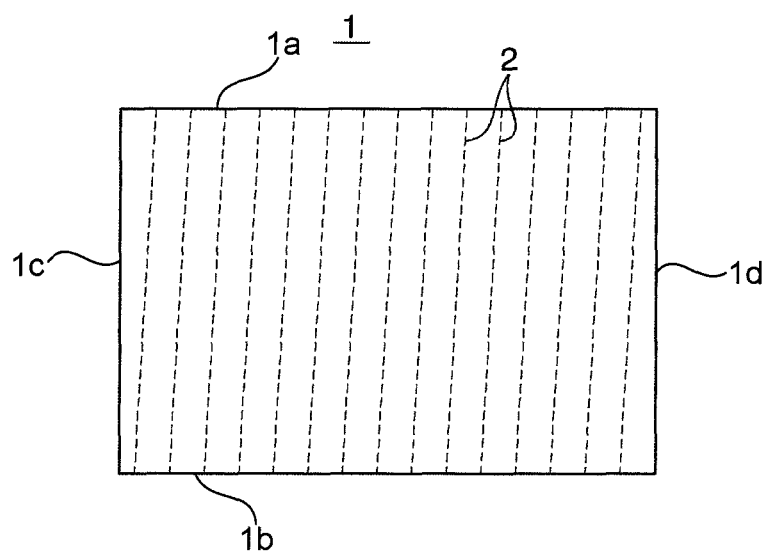

The arrangement of the control console 200 in the four-color sheet-fed web offset printing press 100 will be described next. As shown in FIGS. 1 and 8, the control console 200 includes a table 20. The plate 10*a* as shown in FIGS. 11 and 12 and the lenticular lens sheet 1 as shown in FIGS. 13A and 13B are placed on the upper surface of the table 20.

A frame 20*a* is provided at an end of the table 20. A stopper (first reference member) 21 projecting from the frame 20*a* and having a rectangular distal end and a stopper (second reference member) 22 having a semicircular distal end are disposed on the upper surface of the table 20 while being spaced apart from each other. Although FIG. 8 illustrates an example in which the stoppers 21 and 22 are arranged on one edge of the table 20, the arrangement of the stoppers 21 and 22 is not limited to this. In addition, a scale 23 indicating the distance from the semicircular from the semicircular distal end of the stopper 22 is provided on the upper surface of the table 20 on the distal end side of the stopper 22. The "distance" means the distance in a direction perpendicular to the one edge of the table 20 or the frame 20*a*.

Figure 9:
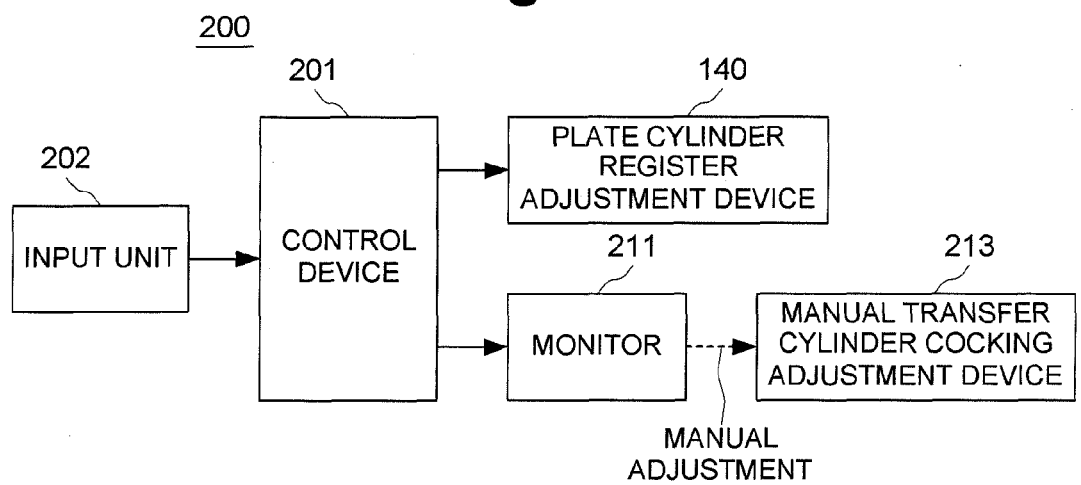
FIG. 9 is a block diagram showing the circuit arrangement of the control console that performs a manual transfer cylinder cocking adjustment operation in the first embodiment.

The table 20 incorporates a control device 201 having a microcomputer configuration including a CPU (Central Processing Unit) as shown in FIG. 9. An input unit 202 formed from a keyboard and the like to accept an input from the operator is connected to the control device 201. A monitor 211 serving as a display unit and the above-described plate cylinder register adjustment device 140 are also connected to the control device 201. However, the manual transfer cylinder cocking adjustment device 213 of the transfer cylinder 114 is not connected to the control device 201.

Figure 10:
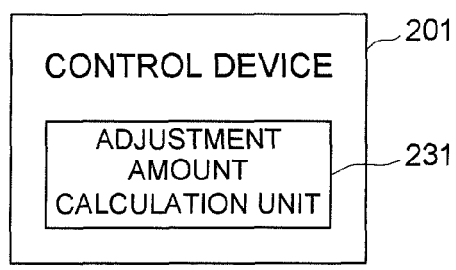
FIG. 10 is a block diagram showing the arrangement of a control device in FIG. 9.
Figure 18A:
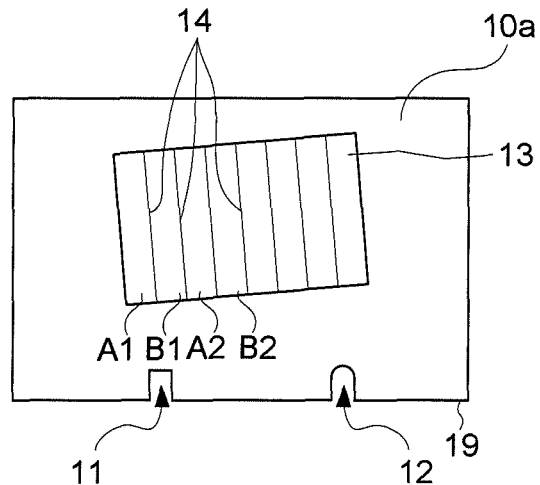
FIGS. 18A to 18C are plan views for explaining a transfer cylinder cocking adjustment.

As shown in FIG. 10, the control device 201 includes an adjustment amount calculation unit 231 that calculates a cocking adjustment amount for the manual transfer cylinder cocking adjustment device (cocking adjustment unit) 213 based on the relationship between the boundary lines 14 of the pattern 13 of the plate 10*a* and the groove lines 2 of the lenticular lens sheet 1 in a state in which the lenticular lens sheet 1 (FIG. 18B) is overlaid on the plate 10*a* (FIG. 18A). Details of the adjustment amount calculation unit 231 will be described later.

<Arrangement of Plate Mounted on Plate Cylinder>

Plates 10*a* to 10*d* are mounted on the plate cylinders 110*a* to 110*d*, respectively. All the plates 10*a* to 10*d* have the same arrangement. Hence, only the arrangement of the plate 10*a* mounted on the plate cylinder 110*a* will be described here.

As shown in FIG. 11, the plate 10*a* mounted on the plate cylinder 110*a* is rectangular as a whole. A rectangular notch (first reference pin hole) 11 and a U-shaped notch (second reference pin hole) 12 are formed on one side (lower edge 19 in FIG. 11) of the plate 10*a* while being spaced apart from each other. The rectangular notch 11 and the U-shaped notch 12 serve as references when attaching the plate 10*a* to the plate cylinder 110*a*. The rectangular notch 11 and the U-shaped notch 12 have the same shapes as those of distal ends of the stoppers 21 and 22, respectively. In addition, the interval between the rectangular notch 11 and the U-shaped notch 12 is the same as that between the stoppers 21 and 22.

A pattern 13 made using the rectangular notch 11 and the U-shaped notch 12 as the references is formed on the plate 10*a*. The pattern 13 is formed from a plurality of long pattern portions A1, B1, A2, B2, . . . . Boundary lines 14 between the pattern portions adjacent each other are parallel.

Figure 45A:
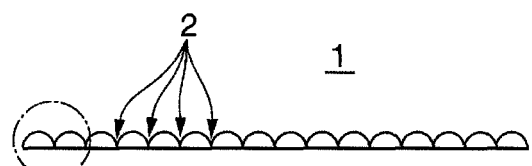
FIG. 45A is a sectional view showing the arrangement of a lenticular lens sheet.
Figure 45B:
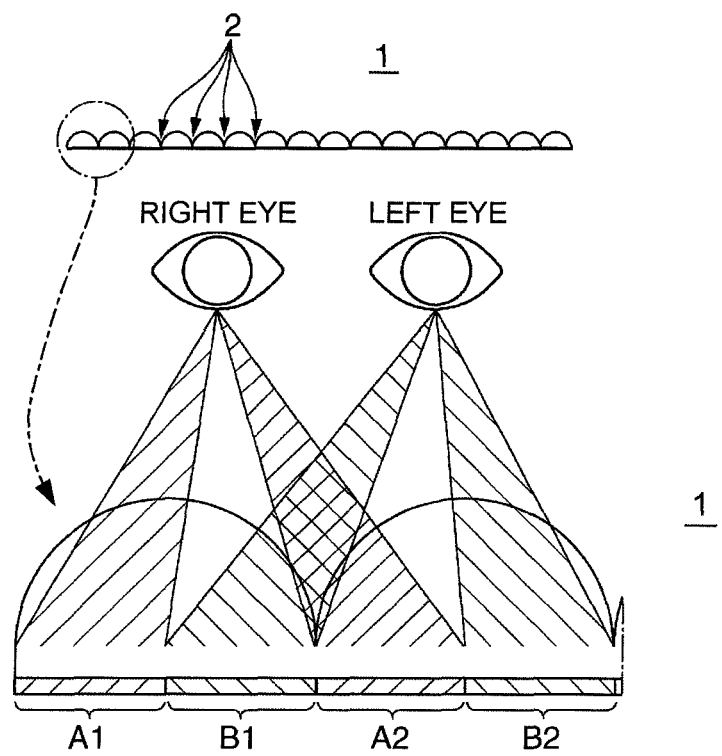
FIG. 45B is a view for explaining the principle of the lenticular lens sheet.

As shown in FIG. 45B, the pattern portions A1 and B1 form one combined pattern portion. A plurality of pattern portions form the pattern 13. The width (A1+B1) of one combined pattern portion equals the width of one lens of the lenticular lens sheet 1, that is, the distance between groove lines 2 indicated by broken lines in FIGS. 13A and 13B.

Because of the reasons of the plate maker, the plate 10*a* is normally made such that the lower right corner of the pattern 13 is raised upward by a distance t with respect to a virtual horizontal line L1 parallel to the lower edge 19 on which the rectangular notch 11 and the U-shaped notch 12 are formed.

However, the plate 10a may be made such that the pattern 13 becomes parallel to the virtual horizontal line L1.

As shown in FIG. 12, cross-shaped register marks 15 and 16 are formed on the left and right sides of the pattern 13 of the plate 10a. The register marks 15 and 16 are formed on the plate 10a simultaneously as the pattern 13. The relative positional relationship between the pattern 13 and the register marks 15 and 16 is common to all the four plates 10a to 10d.

Additionally, a scale 17 indicating the distance from the distal end of the U-shaped notch 12 is provided on the distal end side of the U-shaped notch 12 on the plate 10a. The "distance" means the distance in a direction perpendicular to the lower edge 19 of the plate 10a. As will be described later, when the plate 10a is placed on the table 20, the stopper 22 of the table 20 fits in the U-shaped notch 12 of the plate 10a. In this state, the scale 17 indicates the distance from the distal end of the stopper 22.

<Arrangement of Lenticular Lens Sheet>

As shown in FIGS. 13A and 13B, the lenticular lens sheet 1 to which the pattern 13 of the plate 10a is transferred is formed by arranging a plurality of long lenses each having a semicircular section in stripes at a pitch of 0.1 mm to 0.7 mm. The lenticular lens sheet 1 has an obverse surface with uneven stripes and a flat reverse surface. The lenticular lens sheet 1 is a transparent sheet. "Transparent" does not necessarily indicate "colorless and transparent". The lenticular lens sheet 1 may be color-tinted if printing on its reverse surface can visually be recognized from the obverse surface. The plurality of lenses are formed such that the groove lines 2 between the adjacent lenses become parallel. The lenticular lens sheet 1 is rectangular and has the edges (upper edge 1a, lower edge 1b, left edge 1c, and right edge 1d) of the four sides.

The groove lines 2 of the lenticular lens sheet 1 are ideally parallel to the left edge 1c and the right edge 1d. In practice, however, the groove lines 2 are not necessarily parallel to the left edge 1c and the right edge 1d. In addition, the direction of the groove lines 2 may change between cutting lots (one lot includes about 100 sheets) (FIGS. 13A and 13B).

<Adjustment Operation of Four-Color Sheet-Fed Web Offset Printing Press>

Before the start of printing by the four-color sheet-fed web offset printing press 100, if a misregistration in the circumferential direction or lateral direction exists between the lenticular lens sheet 1 and the pattern 13 of the plate 10a mounted on plate cylinder 110a, a circumferential or lateral register adjustment operation is performed in advance. In addition, to make the plurality of boundary lines 14 of the pattern 13 of the plate 10a match the plurality of groove lines 2 of the lenticular lens sheet 1, the cocking adjustment operation by the transfer cylinder 114 is performed in advance.

<Plate Cylinder Register Adjustment Operation>

A circumferential register adjustment operation for the plate cylinder 110a which is performed when a misregistration in the circumferential direction exists between the lenticular lens sheet 1 and the pattern 13 of the plate 10a mounted on the plate cylinder 110a and a lateral register adjustment operation for the plate cylinder 110a which is performed when a misregistration in the lateral direction (the axial direction of the plate cylinder 110a) exists between the lenticular lens sheet 1 and the pattern 13 of the plate 10a mounted on the plate cylinder 110a will be described.

The circumferential register adjustment operation and the lateral register adjustment operation for the plate cylinder 110a of the first color are performed in a state in which the printing operation of the four-color sheet-fed web offset printing press 100 is stopped. The circumferential register adjustment operation and the lateral register adjustment operation for the plate cylinder 110b of the second color, the plate cylinder 110c of the third color, and the plate cylinder 110d of the fourth color are sequentially executed after the register adjustment operation of the plate 10a mounted on the plate cylinder 110a of the first color. With these operations, all the circumferential and lateral positions of the plate 10a mounted on the plate cylinder 110a of the first color to the plate 10d mounted on the plate cylinder 110d of the fourth color are aligned.

Under the control of the control device 201, a circumferential adjustment motor (not shown) is driven, and the worm shaft 189 of the circumferential position adjustment mechanism in the plate cylinder register adjustment device 140 shown in FIGS. 2 and 4 pivots. Then, the screw shaft 153 rotates via the worm 190 and the worm wheel 149 and moves in the axial direction by the screw function of the threaded portion 153a. The coupling 156 and the helical gear 161 integrated with the screw shaft 153 in the axial direction also move in the axial direction, and the plate cylinder 110a slightly rotates in the circumferential direction by the helical gear function of the helical gears 161 and 164. The circumferential register adjustment for the plate cylinder 110a is thus performed.

That is, when the plate cylinder 110a rotates in the circumferential direction, the plate 10a mounted on it also rotates in the circumferential direction together with the plate cylinder 110a. This eliminates the misregistration in the circumferential direction between the lenticular lens sheet 1 and the pattern 13 of the plate 10a mounted on the plate cylinder 110a.

The circumferential register adjustment for the plate cylinder 110a is performed to transfer the pattern 13 of the first color to the lenticular lens sheet 1. The circumferential register adjustment is similarly performed for the plate cylinders 110b, 110c, and 110d based on the circumferential register adjustment amount at this time.

As shown in FIGS. 3 and 5, under the control of the control device 201, the lateral adjustment motor 193 is driven, and the worm shaft 194 of the lateral position adjustment mechanism in the plate cylinder register adjustment device 140 rotates. Then, the screw shaft 173 moves in the axial direction by the screw function of the threaded portion 173a. The integrated plate cylinder 110a moves in the axial direction via the screw shaft 173 and the bracket portion 167a. The lateral register adjustment for the plate cylinder 110a is thus performed.

That is, when the plate cylinder 110a moves in the axial direction, the plate 10a mounted on it also moves in the axial direction together with the plate cylinder 110a. This eliminates the misregistration in the lateral direction between the lenticular lens sheet 1 and the pattern 13 of the plate 10a mounted on the plate cylinder 110a.

The lateral register adjustment for the plate cylinder 110a is performed to transfer the pattern 13 of the first color to the lenticular lens sheet 1. The lateral register adjustment is similarly performed for the plate cylinders 110b, 110c, and 110d based on the lateral register adjustment amount at this time.

<Manual Transfer Cylinder Cocking Adjustment Operation>

As described above, when the circumferential and lateral register adjustment operations of the plates 10b to 10d of the remaining three colors have ended based on the circumferential and lateral register adjustment operations of the plate 10a of the first color, the misregistrations in the circumferential and lateral directions are eliminated in all of the plate 10a of the first color to the plate 10d of the fourth color.

In the lenticular lens sheet 1, however, the groove lines 2 between the lenses are not necessarily parallel to the left edge 1c and the right edge 1d, as shown in FIGS. 13A and 13B. For this reason, even if the plate 10a and the lenticular lens sheet 1 are overlaid such that the frame around the pattern 13 formed on the plate 10a matches the edges (upper edge 1a, lower edge 1b, left edge 1c, and right edge 1d) of the lenticular lens sheet 1, the boundary lines 14 between the pattern portions A1, B1, A2, B2, . . . of the pattern 13 do not angularly match the groove lines 2 between the lenses of the lenticular lens sheet 1, resulting in a shift. It is therefore necessary to obtain a cocking adjustment amount hp (to be described later) used by the operator to perform transfer cylinder cocking adjustment by manually operating the manual transfer cylinder cocking adjustment device 213 of the transfer cylinder 114 to make the plurality of boundary lines 14 of the pattern 13 of the plate 10a on the plate cylinder 110 match the plurality of groove lines 2 of the lenticular lens sheet 1. The cocking adjustment amount hp is obtained in accordance with the following procedure.

Figure 14:
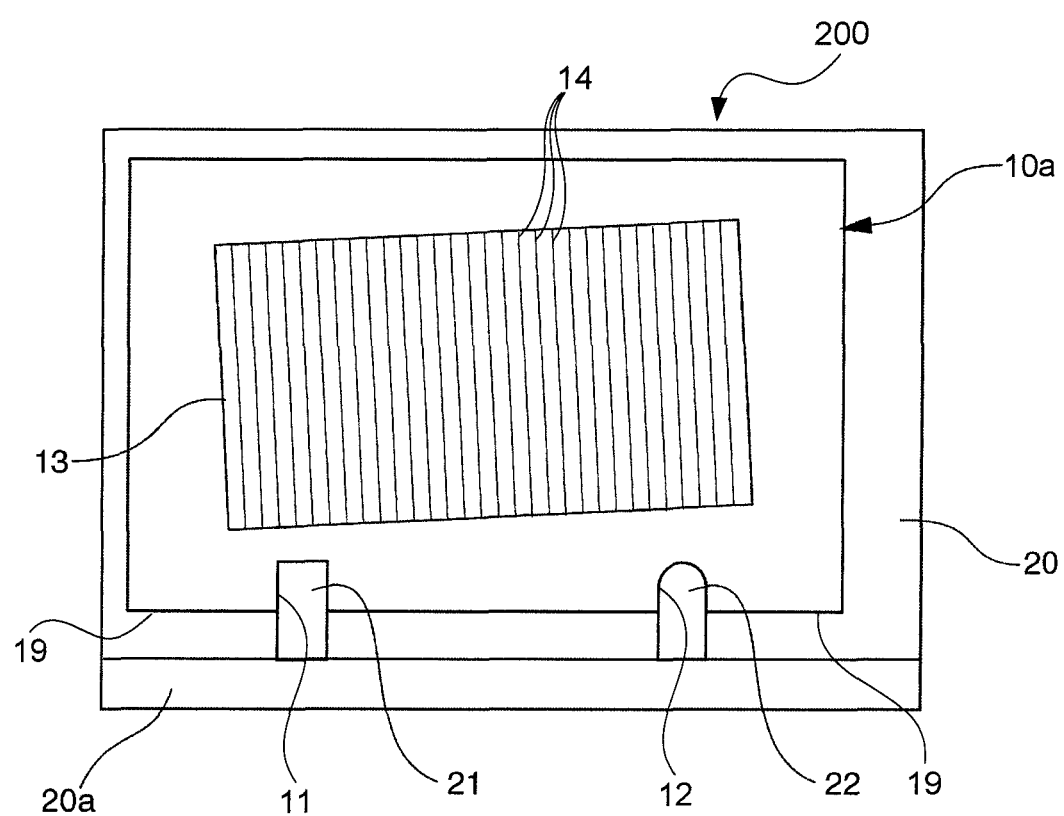
FIG. 14 is a plan view showing a state in which the plate is fixed on the upper surface of a table.
Figure 19:
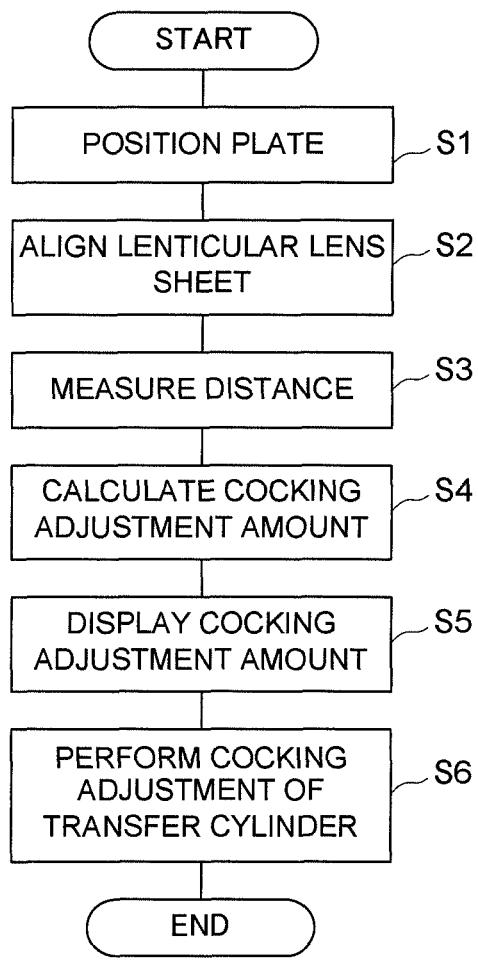
FIG. 19 is a flowchart showing the procedure of the cocking adjustment operation of the transfer cylinder.

First, the operator places the plate 10a of the first color to be mounted on the plate cylinder 110a on the upper surface of the table 20 of the control console 200 in the four-color sheet-fed web offset printing press 100. At this time, the rectangular notch 11 and the U-shaped notch 12 formed in the lower edge 19 of the plate 10a are fitted on the two stoppers 21 and 22 projecting from the frame 20a of the table 20 so as to abut against them, as shown in FIG. 14. The plate 10a is thus positioned on the table 20. Plate positioning step S1 (FIG. 19) of the plate 10a is performed in this way.

Figure 15A:
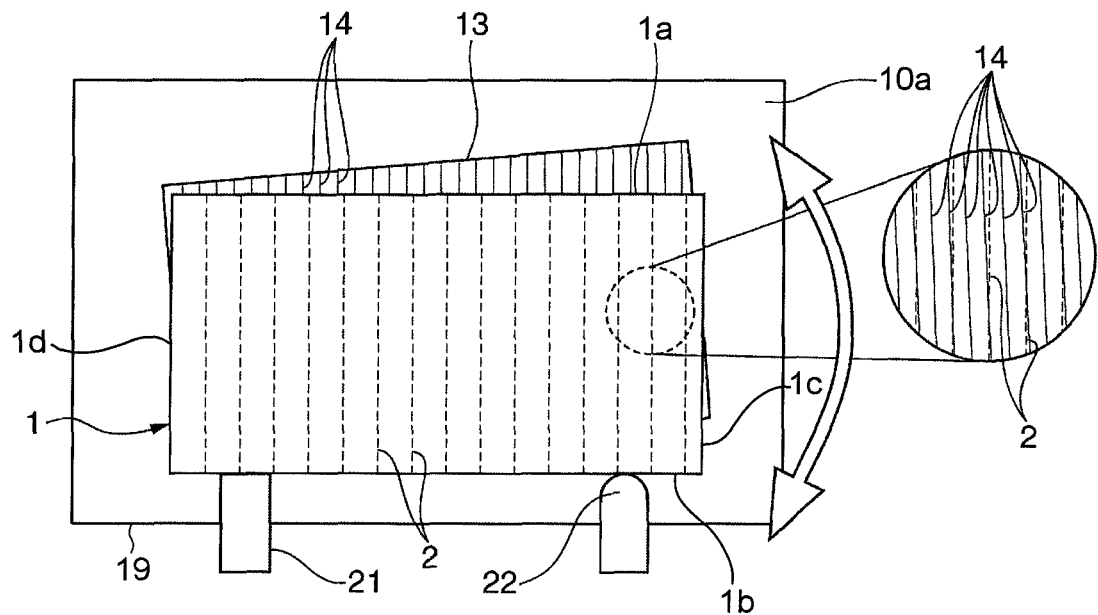
FIGS. 15A and 15B are plan views for explaining alignment between the pattern of the plate and the pattern transfer region of the lenticular lens sheet.

As shown in FIG. 15A, the operator places the lenticular lens sheet 1 on the plate 10a positioned on the table 20 and abuts the lower edge 1b of the lenticular lens sheet 1 against the stoppers 21 and 22 of the table 20. At this time, the lenticular lens sheet 1 is placed such that the left end of the lower edge 1b of the lenticular lens sheet 1 projects to the outside of the stopper 21 (the opposite side of the stopper 22 viewed from the stopper 21). Since the lenticular lens sheet 1 is formed from a transparent member, the operator can visually observe, through the lenticular lens sheet 1, the relationship between the boundary lines 14 between the plurality of pattern portions of the pattern 13 of the plate 10a and the groove lines 2 between the plurality of lenses of the lenticular lens sheet 1.

Figure 15B:
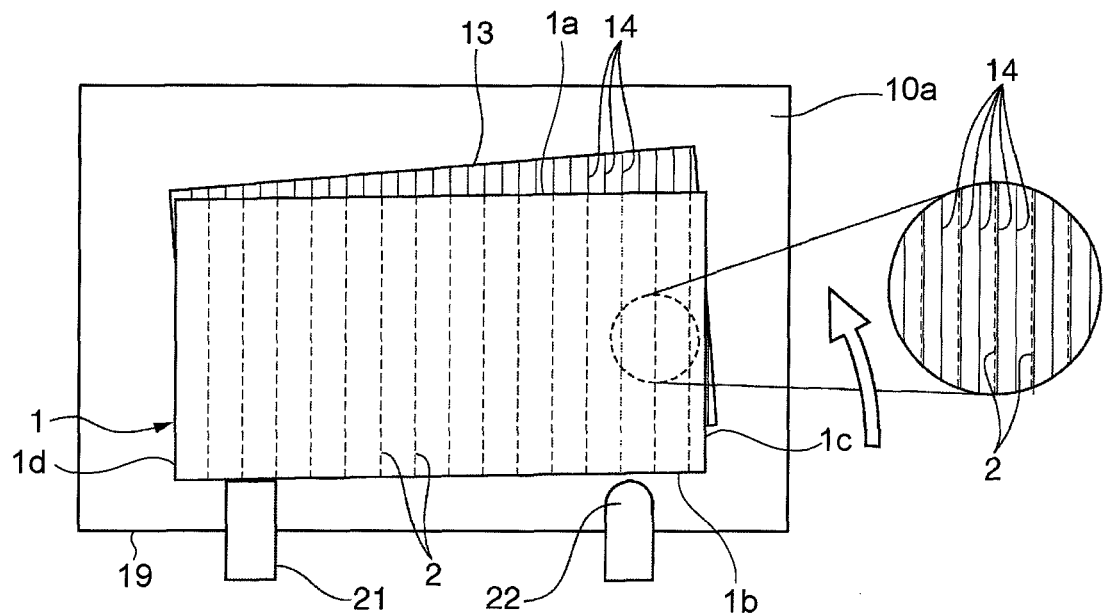

As shown in FIG. 15B, the operator rotates the lenticular lens sheet 1 to separate the right end side of the lower edge 1b of the lenticular lens sheet 1 from the stopper 22 while keeping the left end side of the lower edge 1b of the lenticular lens sheet 1 in contact with the stopper 21. The boundary lines 14 of the plate 10a match the groove lines 2 of the lenticular lens sheet 1 at a certain angle.

For example, the operator brings the lenticular lens sheet 1 into contact with the stopper 21, and in this state, rotates the lenticular lens sheet 1 using the point of contact as the rotation center to make the groove lines 2 of the lenticular lens sheet 1 parallel to the boundary lines 14 of the plate 10a. Let θ be the rotation angle at this time. If the groove lines 2 of the lenticular lens sheet 1 do not match the boundary lines 14 of the plate 10a, the operator moves the lenticular lens sheet 1 in its longitudinal direction while maintaining the angle θ in the state in which the lenticular lens sheet 1 is in contact with the stopper 21, thereby making the groove lines 2 match the boundary lines 14. If the groove lines 2 match the boundary lines 14, the groove lines 2 are parallel to the boundary lines 14. It is therefore possible to easily confirm that the groove lines 2 are parallel to the boundary lines 14 by making the groove lines 2 match the boundary lines 14. Note that if it can be confirmed that the groove lines 2 are parallel to the boundary lines 14, the groove lines 2 need not always be made to match the boundary lines 14.

The lenticular lens sheet 1 is thus accurately aligned with the pattern 13 of the plate 10a. Lenticular lens sheet aligning step S2 (FIG. 19) of the lenticular lens sheet 1 to the plate 10a is performed in this way.

This makes it possible to form a state in which the pattern portions A1, B1, A2, B2, . . . of the pattern 13 of the plate 10a are accurately aligned with the pattern transfer regions between the groove lines 2 of the lenticular lens sheet 1, that is, a relative positional (angular) relationship capable of accurately transferring the combined pattern portions (A1+B1, A2+B2, . . . ) of the pattern 13 of the plate 10a to the pattern transfer regions between the groove lines 2 of the lenticular lens sheet 1.

Figure 16:
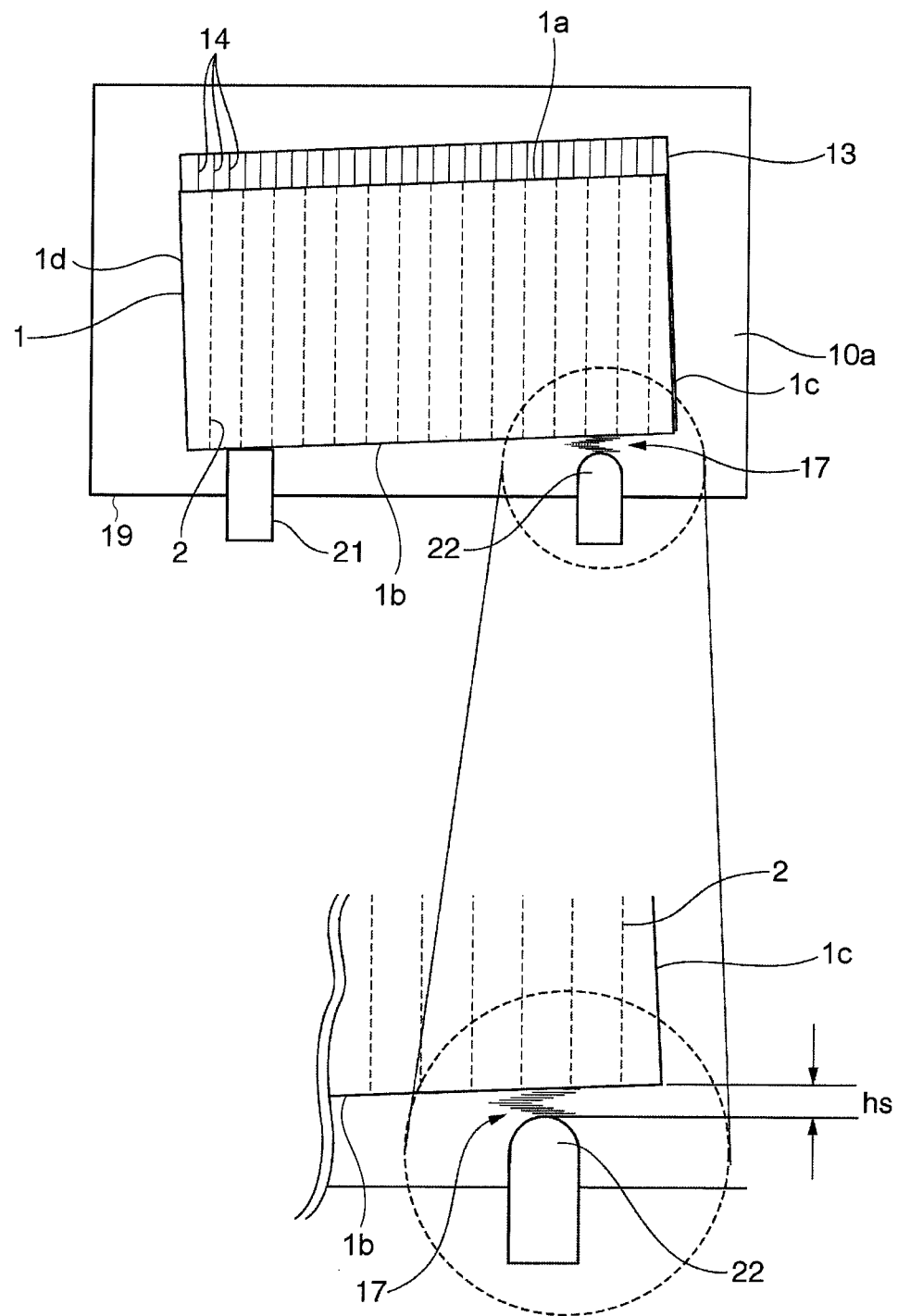
FIG. 16 is a plan view for explaining reading the distance (gap amount) of the lenticular lens sheet with respect to the reference position of the plate.

In the state in which the lenticular lens sheet 1 is aligned with the pattern 13 of the plate 10a, the operator visually observes the scale 17 provided on the surface of the plate 10a, thereby reading a distance (gap amount) hs from the distal end of the stopper 22 to the lower edge 1b of the lenticular lens sheet 1, as shown in FIG. 16. As described above, the "distance" means the distance in a direction perpendicular to the one edge of the table 20, the frame 20a, or the lower edge 19 of the plate 10a (the same will apply hereinafter). Distance measurement step S3 (FIG. 19) of the distance (gap amount) hs is performed in this way.

The operator inputs the distance hs from the input unit 202 of the control console 200. The distance hs is output to the control device 201. The adjustment amount calculation unit 231 of the control device 201 calculates the cocking adjustment amount hp of the lenticular lens sheet 1 with respect to the pattern 13 of the plate 10a based on the distance hs.

Figure 17A:
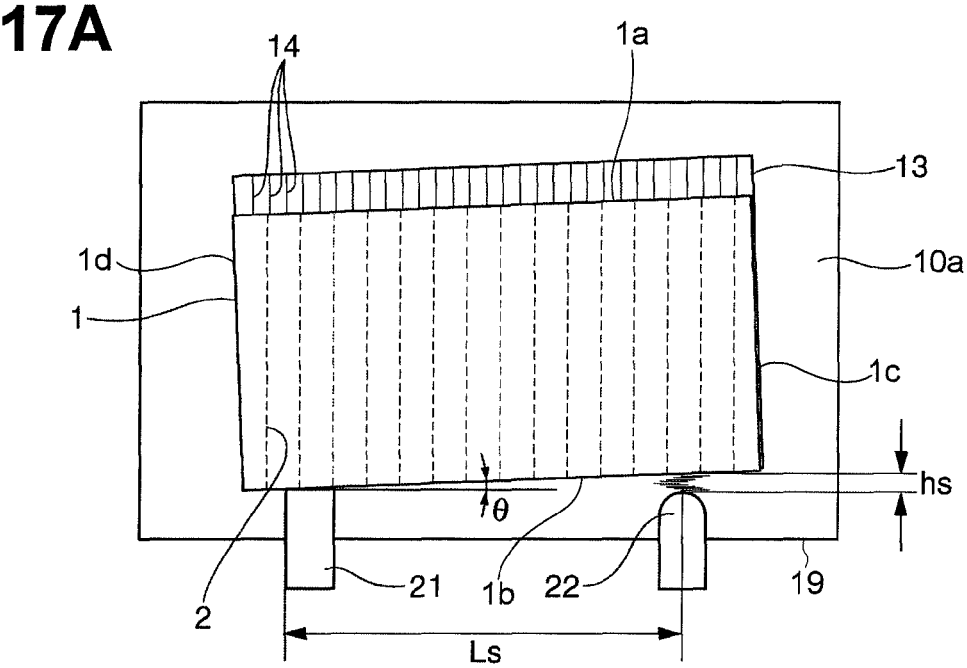
FIGS. 17A to 17C are plan views for explaining a cocking adjustment amount calculation method.
Figure 17B:
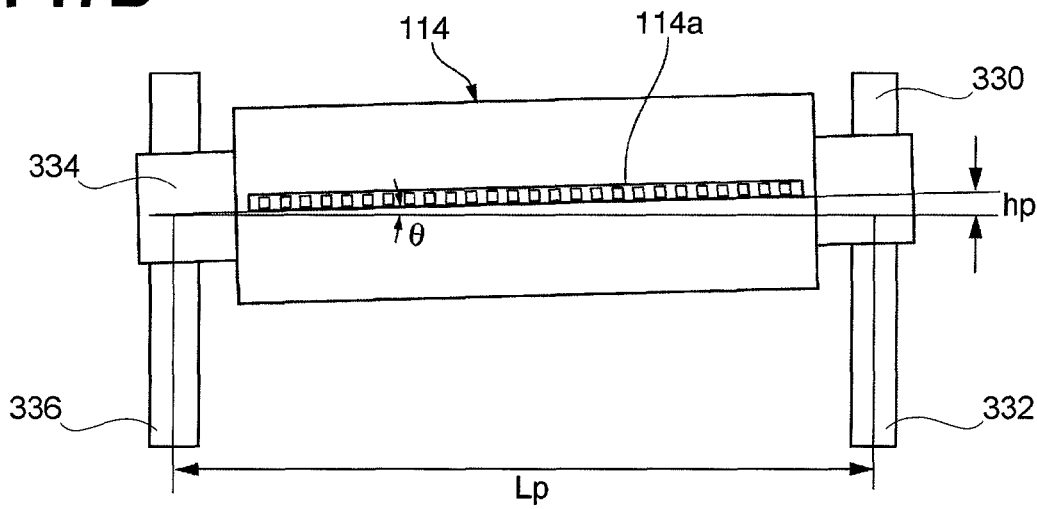
Figure 17C:
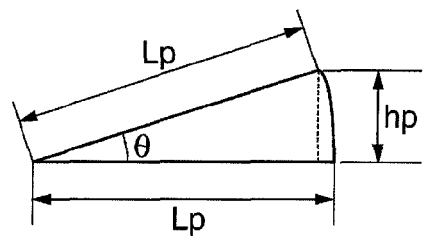

The cocking adjustment amount hp can be calculated in the following way. As shown in FIG. 17A, let Ls be the distance between the left end of the stopper 21 of the table 20 (that is, the portion where the stopper 21 abuts against the lower edge 1b of the lenticular lens sheet 1) and the distal end (central position) of the stopper 22, and hs be the distance (gap amount) from the distal end of the stopper 22 to the lower edge 1b of the lenticular lens sheet 1. As shown in FIG. 17B, let Lp be the distance between the shaft supporting portions of the transfer cylinder 114 (that is, the distance between the bearing 332 of the end shaft 330 and the bearing 336 of the end shaft 334 of the transfer cylinder 114), and hp be the moving amount (that is, cocking adjustment amount) of one end shaft 330 of the transfer cylinder 114. In this case, $hp = Lp \times \sin\theta$, as shown in FIG. 17C.

On the other hand, since the relation $hs = Ls \times \tan\theta$ holds, as shown in FIG. 17A, $\theta = \arctan(hs/Ls)$. Hence, the cocking adjustment amount hp is given by $hp = Lp \times \sin\{\arctan(hs/Ls)\}$, which is obtained by the known sizes Ls and Lp and the distance hs measured in the distance measurement step. Calculation step S4 (FIG. 19) of the cocking adjustment amount hp is performed in this way.

The control device 201 displays the calculated cocking adjustment amount hp on the monitor 211. The operator can thus recognize the cocking adjustment amount hp serving as an index when manually performing cocking adjustment of the transfer cylinder 114. Display step S5 (FIG. 19) of the cocking adjustment amount hp is performed in this way.

The operator operates the handle 337 based on the cocking adjustment amount hp displayed on the monitor 211 while confirming the dial 337a of the manual transfer cylinder cocking adjustment device 213. In accordance with the operation of the handle 337, the lever 339 swings via the piece 341, and the eccentric bearing 336 pivots via the rod 342 by an angle corresponding to the pivotal operation of the handle 337. The transfer cylinder 114 thus undergoes skewing adjustment (cocking adjustment) in accordance with the pivotal movement of the eccentric bearing 336. Transfer cylinder cocking adjustment step S6 (FIG. 19) is performed in this way.

Since the bearing 336 on the operation side of the transfer cylinder 114 has the eccentric amount t4, the shaft of the transfer cylinder 114 tilts with respect to the shaft of the impression cylinder 112a by the eccentric function of the bearing 336, and skewing adjustment (cocking adjustment) is performed by the cocking adjustment amount hp. The lenticular lens sheet 1 conveyed via the transfer cylinder 114 also tilts by the cocking adjustment amount hp, and the conveyance angle of the lenticular lens sheet 1 is adjusted.

That is, when the lenticular lens sheet 1 conveyed via the feeder board FB and the swing device is transferred to the gripper device of the transfer cylinder 114, the lenticular lens sheet 1 is held and conveyed in a state in which the conveyance angle undergoes skewing adjustment by the cocking adjustment amount hp because the manual transfer cylinder cocking adjustment device 213 has performed the skewing adjustment of the transfer cylinder 114 in advance by the cocking adjustment amount hp.

As described above, the circumferential position adjustment mechanism and the lateral position adjustment mechanism of the plate cylinder register adjustment device 140 perform the circumferential and lateral register adjustment operations of the plate cylinders 110a to 110d in advance. In addition, the manual transfer cylinder cocking adjustment device 213 performs the cocking adjustment operation of the transfer cylinder 114 in advance. Adjustment is thus performed in advance to a transfer enable state in which the plurality of boundary lines 14 of the pattern 13 of each of the plates 10a to 10d on the plate cylinders 110a to 110d of the first to fourth colors match the plurality of groove lines 2 of the lenticular lens sheet 1.

Figure 18B:
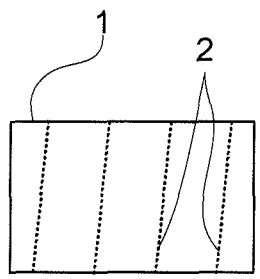
Figure 18C:
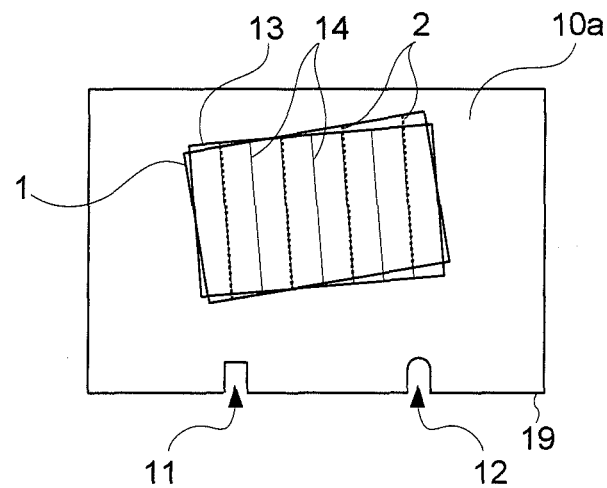

When passing through the transfer cylinder 114 that has undergone the skewing adjustment in advance, the lenticular lens sheet 1 having the tilted groove lines 2 as shown in FIG. 18B also undergoes skewing adjustment by itself. The lenticular lens sheet 1 that has undergone the skewing adjustment passes between the impression cylinder 112a and the blanket cylinder 111a in contact with the plate cylinder 110a that has undergone the circumferential and lateral register adjustments in advance. At this time, a positional relationship in which the boundary lines 14 (FIG. 18A) of the pattern 13 of the plate 10a transferred via the blanket cylinder 111a relatively match the groove lines 2 (FIG. 18B) of the lenticular lens sheet 1, as shown in FIG. 18C, is obtained. It is therefore possible to accurately transfer the combined pattern portions (A1+B1, A2+B2, . . . ) of the pattern 13 of the plate 10a to the pattern transfer regions between the groove lines 2 of the lenticular lens sheet 1 without shifts. The adjustment operation of the four-color sheet-fed web offset printing press 100 thus ends.

Since the plate cylinder register adjustment device 140 has performed the circumferential and lateral register adjustments, and the transfer cylinder 114 has performed the skewing adjustment, the four-color sheet-fed web offset printing press 100 performs test printing on the lenticular lens sheet 1 via the printing units 102a to 102d. As a result, if shift amounts exist in the register marks 15 and 16 of the respective colors printed on the lenticular lens sheet 1 by the printing units 102a to 102d, fine circumferential or lateral register adjustment of the plate cylinders 110a to 110d or fine skewing adjustment of the transfer cylinder 114 is performed based on the shift amounts.

In this embodiment, a case has been described in which after the circumferential and lateral register adjustment operations of the plate cylinder register adjustment device 140 have ended, the manual transfer cylinder cocking adjustment device 213 performs the cocking adjustment operation of the transfer cylinder 114. However, the present invention is not limited to this. After the cocking adjustment operation of the transfer cylinder 114 by the manual transfer cylinder cocking adjustment device 213, the plate cylinder register adjustment device 140 may perform the circumferential and lateral register adjustment operations, or the operations may simultaneously be performed.

<Printing Operation of Four-Color Sheet-Fed Web Offset Printing Press>

In the four-color sheet-fed web offset printing press 100, the lenticular lens sheet 1 held by the suction device 101b of the sheet supply device 101 is placed on the feeder board FB and conveyed. In a state in which one end (leading-side end) of the lenticular lens sheet 1 abuts against the front lay 101c provided on the distal end side of the feeder board FB, and the circumferential position is aligned, the lenticular lens sheet 1 is transferred from the swing arm grippers of the swing device to the gripper device of the transfer cylinder 114.

The cocking adjustment operation of the transfer cylinder 114 is performed in advance by the manual transfer cylinder cocking adjustment device 213. For this reason, when the lenticular lens sheet 1 is transferred from the gripper device of the transfer cylinder 114 to the gripper device of the impression cylinder 112a of the printing unit 102a, the lenticular lens sheet 1 is held and conveyed by the gripper device of the impression cylinder 112a in a state in which the conveyance angle of the lenticular lens sheet 1 undergoes skewing adjustment by the cocking adjustment amount hp. At this time, the lenticular lens sheet 1 is conveyed with its reverse surface facing outward.

The lenticular lens sheet 1 held by the gripper device of the impression cylinder 112a is conveyed as the impression cylinder 112a rotates, and passes between the impression cylinder 112a and the blanket cylinder 111a. At this time, the pattern 13 of the plate 10a of the first color mounted on the plate cylinder 110a is transferred to the reverse surface of the lenticular lens sheet 1 via the blanket cylinder 111a.

The cocking adjustment operation of the transfer cylinder 114 is performed in advance, and the circumferential and lateral register adjustment operations of the plate cylinder 110a are performed in advance by the circumferential position adjustment mechanism and the lateral position adjustment mechanism in the plate cylinder register adjustment device 140. Hence, the pattern is accurately transferred in a state in which the boundary lines 14 of the pattern 13 of the plate 10a of the first color match the groove lines 2 of the lenticular lens sheet 1.

The lenticular lens sheet 1 with the transferred pattern 13 of the plate 10a is transferred from the gripper device of the impression cylinder 112a to the gripper device of the transfer cylinder 115 and then conveyed from the transfer cylinder 115 to the impression cylinder 112b of the printing unit 102b.

In the printing unit 102b, the lenticular lens sheet 1 held by the gripper device of the impression cylinder 112b is conveyed as the impression cylinder 112b rotates, and passes between the impression cylinder 112b and the blanket cylinder 111b, as in the printing unit 102a. At this time, the pattern 13 of the plate 10b of the second color mounted on the plate cylinder 110b is transferred to the reverse surface of the lenticular lens sheet 1 via the blanket cylinder 111b.

In the printing units 102c and 102d as well, the patterns 13 of the plates 10c and 10d of the third and fourth colors are accurately transferred to the reverse surface of the lenticular lens sheet 1 via the blanket cylinders 111c and 111d in a similar manner. After that, the lenticular lens sheet 1 is conveyed to the sheet delivery device 103 via the transfer cylinder 118.

The circumferential and lateral register adjustments are similarly performed for the plate cylinder 110b, 110c, and 110d based on the circumferential and lateral register adjustment amounts for the plate cylinder 110a. Hence, the pattern is accurately transferred in a state in which in all of the pattern 13 of the plate 10a of the first color to the pattern 13 of the plate 10d of the fourth color, the boundary lines 14 match the groove lines 2 of the lenticular lens sheet 1.

The lenticular lens sheet 1 conveyed to the sheet delivery device 103 is conveyed via the gripper bar of the delivery chain (not shown) provided in the sheet delivery device 103 and stacked on the stack board 103a for delivery under the deliver chain.

As described above, when transferring the pattern 13 of the plate 10a to the lenticular lens sheet 1 of the second lot after the pattern 13 of the plate 10a has accurately been transferred to the lenticular lens sheets 1 of the first lot, the cocking adjustment amount hp calculated for the lenticular lens sheet 1 of the first lot cannot directly be used. In this case, the cocking adjustment amount hp for the lenticular lens sheet 1 of the second lot is obtained in the following way.

Figure 20:
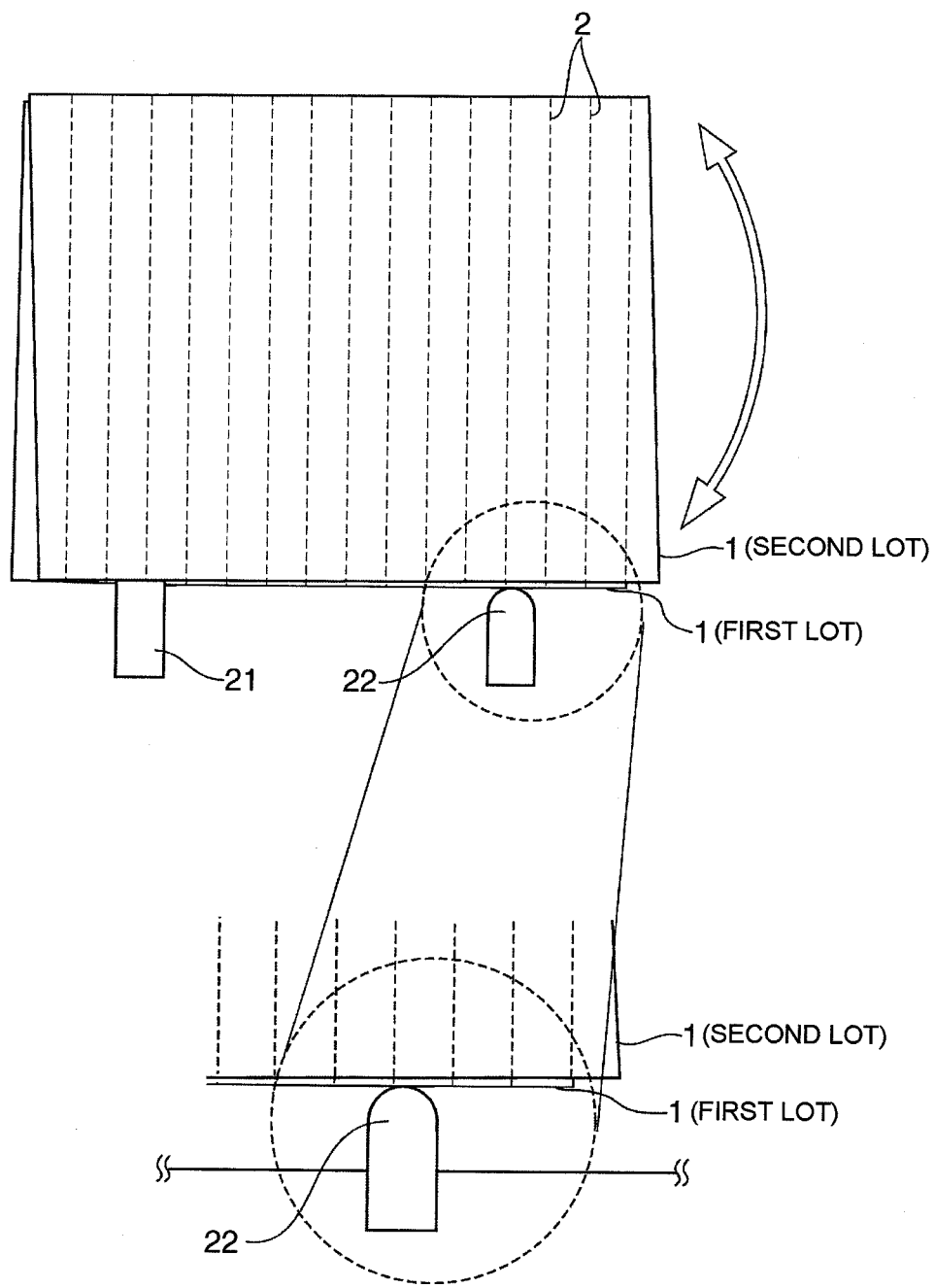
FIG. 20 is a plan view for explaining reading the distance (gap amount) of the lenticular lens sheet of the second lot with respect to the reference position of the plate.

As shown in FIG. 20, the operator abuts the lower edge 1b of the lenticular lens sheet 1 of the first lot against the stoppers 21 and 22 of the table 20. The operator places and overlays the lenticular lens sheet 1 of the second lot on the lenticular lens sheet 1 of the first lot. The operator rotates the lenticular lens sheet 1 of the second lot to separate the right end of the lower edge 1b of the lenticular lens sheet 1 of the second lot from the stopper 22 while keeping the left end side of the lower edge 1b of the lenticular lens sheet 1 of the second lot in contact with the stopper 21 of the table 20 without moving the lenticular lens sheet 1 of the first lot. All the plurality of groove lines 2 of the lenticular lens sheet 1 of the second lot match the plurality of groove lines 2 of the lenticular lens sheet 1 of the first lot at a certain angle.

The operator reads the distance (gap amount) hs from the distal end of the stopper 22 to the lower edge 1b of the lenticular lens sheet 1 of the second lot by the scale 23 provided on the table 20, and inputs the distance (gap amount) hs to the control device 201 via the input unit 202. This makes it possible to obtain the cocking adjustment amount hp of the lenticular lens sheet 1 of the second lot by the transfer cylinder 114.

The thus obtained cocking adjustment amount hp of the lenticular lens sheet 1 of the second lot is the difference from the cocking adjustment amount hp of the lenticular lens sheet 1 of the first lot. Assume that the cocking adjustment amount hp obtained from the relationship between the boundary lines 14 of the pattern 13 of the plate 10a and the groove lines 2 of the lenticular lens sheet 1 is referred to as the "absolute cocking adjustment amount hp". In this case, the difference corresponds to the difference between the absolute cocking adjustment amount hp of the lenticular lens sheet 1 of the first lot and the absolute cocking adjustment amount hp of the lenticular lens sheet 1 of the second lot. The value of the difference is used as the cocking adjustment amount for the lenticular lens sheet 1 of the second lot.

The cocking adjustment amount hp of the lenticular lens sheet 1 of the second lot is also calculated in advance before the start of the printing operation of the four-color sheet-fed web offset printing press 100. This makes it possible to shorten the printing press stop time from the end of printing of the lenticular lens sheets 1 of the first lot until the start of printing of the lenticular lens sheets 1 of the second lot as much as possible.

When printing of the lenticular lens sheets 1 of the first lot has ended, the operator operates the handle 337 based on the cocking adjustment amount hp of the second lot (the difference from the cocking adjustment amount hp of the first lot) obtained in advance while confirming the dial 337a of the manual transfer cylinder cocking adjustment device 213. Since the transfer cylinder 114 undergoes skewing adjustment (cocking adjustment) in accordance with the lenticular lens sheet 1 of the second lot, the conveyance angle of the lenticular lens sheet 1 of the second lot conveyed via the transfer cylinder 114 also undergoes skewing adjustment.

<Jig Plate>

In the first embodiment, a case has been described in which the cocking adjustment amount hp is obtained using the plate 10a of the first color. The plates 10a to 10d of the respective colors basically have the same arrangement except the pattern 13. The tilt of the boundary lines 14 between the pattern portions A1, B1, ... is also the same among the plates 10a to 10d. Hence, the cocking adjustment amount hp may be obtained using the plates 10b to 10d of the second to fourth colors in place of the plate 10a of the first color.

Figure 21:
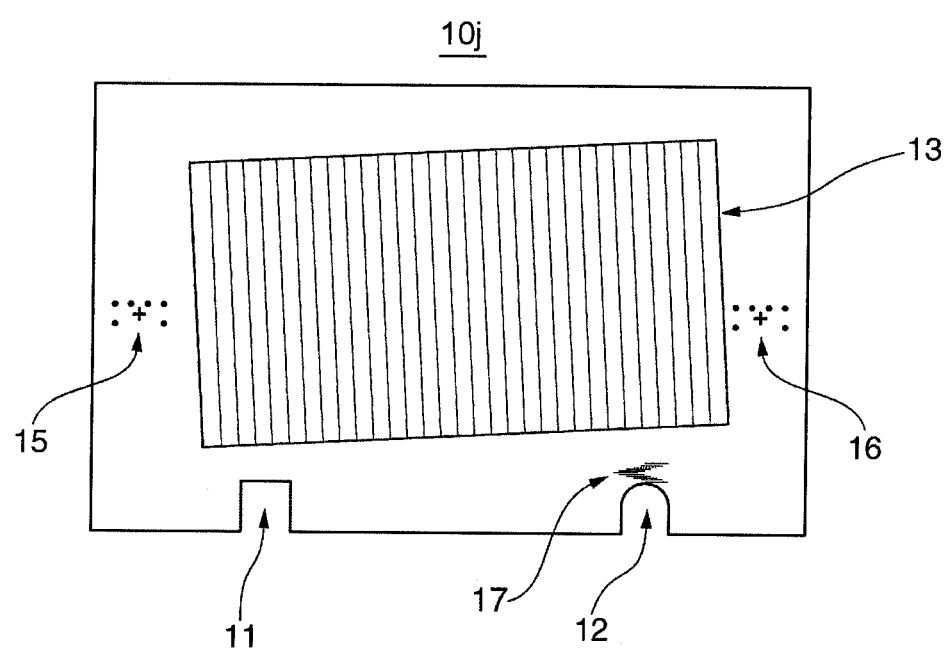
FIG. 21 is a plan view showing the arrangement of a jig plate.

The cocking adjustment amount hp can also be obtained using a jig plate 10j as shown in FIG. 21 in place the plates 10a to 10d actually used in printing. The jig plate 10j is a plate serving as a jig used for an adjustment operation without being attached to the plate cylinders 110a to 110d. The jig plate 10j basically has the same arrangement as the plates 10a to 10d of the respective colors except the pattern 13. The tilt of the boundary lines 14 between the pattern portions A1, B1, ... is also the same as in the plates 10a to 10d.

A method of obtaining the cocking adjustment amount hp for the lenticular lens sheet 1 of the first lot using the jig plate 10j is the same as the above-described method using the plate 10a.

A method of obtaining the cocking adjustment amount hp for the lenticular lens sheet 1 of the second lot using the jig plate 10j will be described.

The operator places the jig plate 10j on the upper surface of the table 20 of the control console 200, and fits the notches 11 and 12 on the stoppers 21 and 22, thereby positioning the jig plate 10j. The lenticular lens sheet 1 of the second lot is placed on the jig plate 10j, and the lower edge 1b of the lenticular lens sheet 1 is made to abut against the stoppers 21 and 22. The operator rotates the lenticular lens sheet 1 while keeping the left end side of the lower edge 1b of the lenticular lens sheet 1 in contact with the stopper 21, thereby making the plurality of groove lines 2 of the lenticular lens sheet 1 match the plurality of boundary lines 14 of the pattern 13 of the jig plate 10j. The operator refers to the scale 17 provided on the jig plate 10j, to read the distance (gap amount) hs from the distal end of the stopper 22 to the lower edge 1b of the lenticular lens sheet 1, and inputs the distance hs from the input unit 202 to the control device 201.

The adjustment amount calculation unit 231 of the control device 201 calculates the cocking adjustment amount hp of the lenticular lens sheet 1 of the second lot based on the input distance hs. This corresponds to the above-described absolute cocking adjustment amount hp. Hence, the adjustment amount calculation unit 231 calculates the difference between the cocking adjustment amount hp of the lenticular lens sheet 1 of the second lot and the cocking adjustment amount hp of the lenticular lens sheet 1 of the first lot. The control device 201 displays the difference on the monitor 211 as the cocking adjustment amount hp of the lenticular lens sheet 1 of the second lot.

The cocking adjustment amount hp of the lenticular lens sheet 1 of the first lot used here can be either a value obtained using the plate 10a or a value obtained using the jig plate 10j. The cocking adjustment amount hp of the same value can be obtained using either of the plate 10a and the jig plate 10j. Alternatively, either a value stored when calculated by the adjustment amount calculation unit 231 or a value input by the operator when calculating the cocking adjustment amount hp of the lenticular lens sheet 1 of the second lot can be used as the cocking adjustment amount hp of the lenticular lens sheet 1 of the first lot.

After the printing operation of the lenticular lens sheets 1 of the first lot has ended, the operator operates the handle 337 based on the difference displayed on the monitor 211 while confirming the dial 337a of the manual transfer cylinder cocking adjustment device 213 from the state in which the transfer cylinder 114 has undergone the skewing adjustment (cocking adjustment) based on the cocking adjustment amount hp of the first lot. Transfer cylinder cocking adjustment step S6 of the transfer cylinder 114 for the lenticular lens sheet 1 of the second lot is performed in this way.

As described above, when switching the lenticular lens sheets 1 from the first lot to the second lot, the operator performs skewing adjustment of the lenticular lens sheet 1 by the difference from the cocking adjustment amount hp of the first lot from the state in which the adjustment is done for the lenticular lens sheets 1 of the first lot. It is therefore possible to not only minimize the machine step time at the time of lot switching but also switch the lot without stopping the machine depending on the operation speed of the printing press or the relative change amount of the groove lines 2 between the lots.

Use of the jig plate 10j makes it possible to obtain the cocking adjustment amount hp of the lenticular lens sheet 1 of the second lot during printing of the lenticular lens sheet 1 of the first lot.

<First Modification of First Embodiment>

Figure 22:
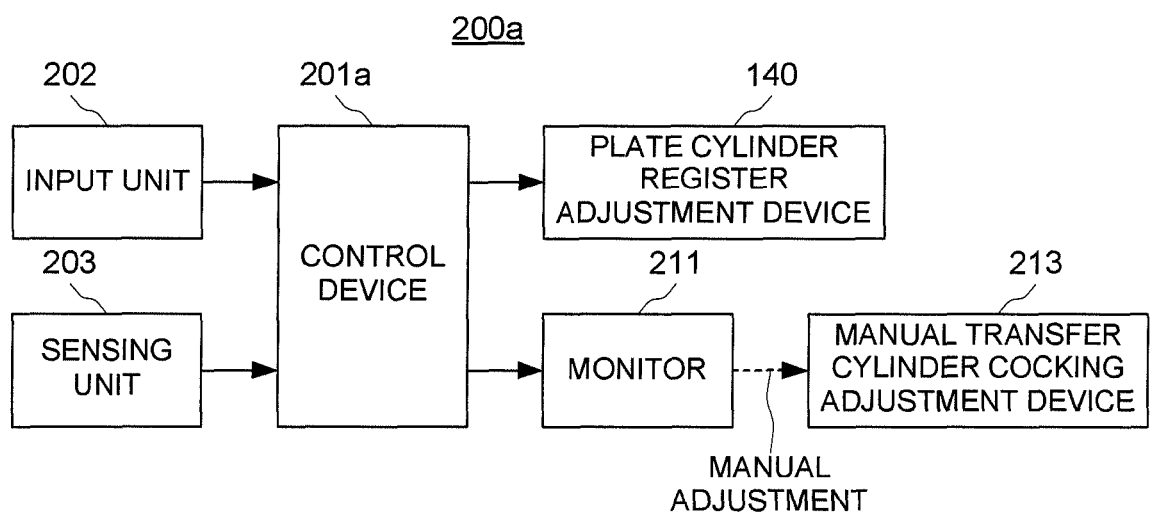
FIG. 22 is a block diagram showing the circuit arrangement of a control console that performs a manual transfer cylinder cocking adjustment operation in the description of the first modification of the first embodiment.

In the above-described first embodiment, the operator visually measures the distance hs between the lenticular lens sheet 1 and the stopper 22 of the table 20. This distance measurement may mechanically be performed. In this case, a control console 200a as shown in FIG. 22 is used. The control console 200a includes a sensing unit 203 that optically senses the positional relationship between the stopper 22 and the lenticular lens sheet 1. A camera, a photoelectric sensor, or the like is used as the sensing unit 203. The sensing unit 203 is connected to a control device 201a.

Figure 23:
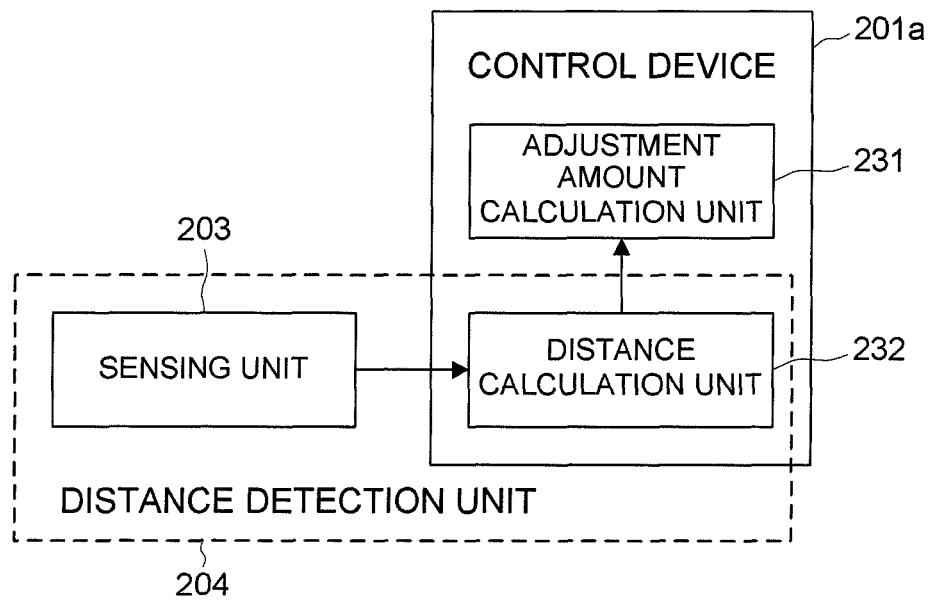
FIG. 23 is a block diagram showing the arrangement of a control device in FIG. 22.

As shown in FIG. 23, the control device 201a includes a distance calculation unit 232 in addition to the above-described adjustment amount calculation unit 231. The distance calculation unit 232 calculates the distance hs between the stopper 22 and the lenticular lens sheet 1 based on the output of the sensing unit 203. The sensing unit 203 and the distance calculation unit 232 constitute a distance detection unit 204 that detects the distance hs from the stopper 22 to the edge of the lenticular lens sheet 1.

Note that the same reference numerals as in FIGS. 9 and 10 denote the corresponding portions in FIGS. 22 and 23. A description of the corresponding portions will be omitted.

In this case as well, the plate positioning step S1 and the lenticular lens sheet aligning step S2 in the manual transfer cylinder cocking adjustment operation are performed. The sensing unit 203 senses the positional relationship between the stopper 22 and the lenticular lens sheet 1 in a state in which the lenticular lens sheet 1 is aligned with the pattern 13 of the plate 10a, as shown in FIG. 15B. The sensing result is output to the control device 201a.

If the sensing unit 203 is a camera, the sensing unit 203 captures the image of the state in which the lower edge 1b of the lenticular lens sheet 1 overlaid on the pattern 13 of the plate 10a is separated from the stopper 22, as shown in FIG. 16, and the image is output to the control device 201a as the sensing result. The distance calculation unit 232 of the control device 201a analyzes the image from the sensing unit 203, thereby calculating the distance (gap amount) hs between the stopper 22 and the lower edge 1b of the lenticular lens sheet 1. The distance measurement step S3 of the distance hs is performed in this way.

If the sensing unit 203 is a photoelectric sensor, the position of the lower edge 1b of the lenticular lens sheet 1 away from the stopper 22 is sensed based on a change in the reflected light amount of the light-emitting/receiving device, and the sensing result is output to the control device 201a. The distance calculation unit 232 of the control device 201a calculates the distance hs between the stopper 22 and the lower edge 1b of the lenticular lens sheet 1 based on the sensing result from the sensing unit 203 and the position of the stopper 22 registered in advance. The distance detection step S3 of the distance hs is performed in this way.

<Second Modification of First Embodiment>

Figure 24:
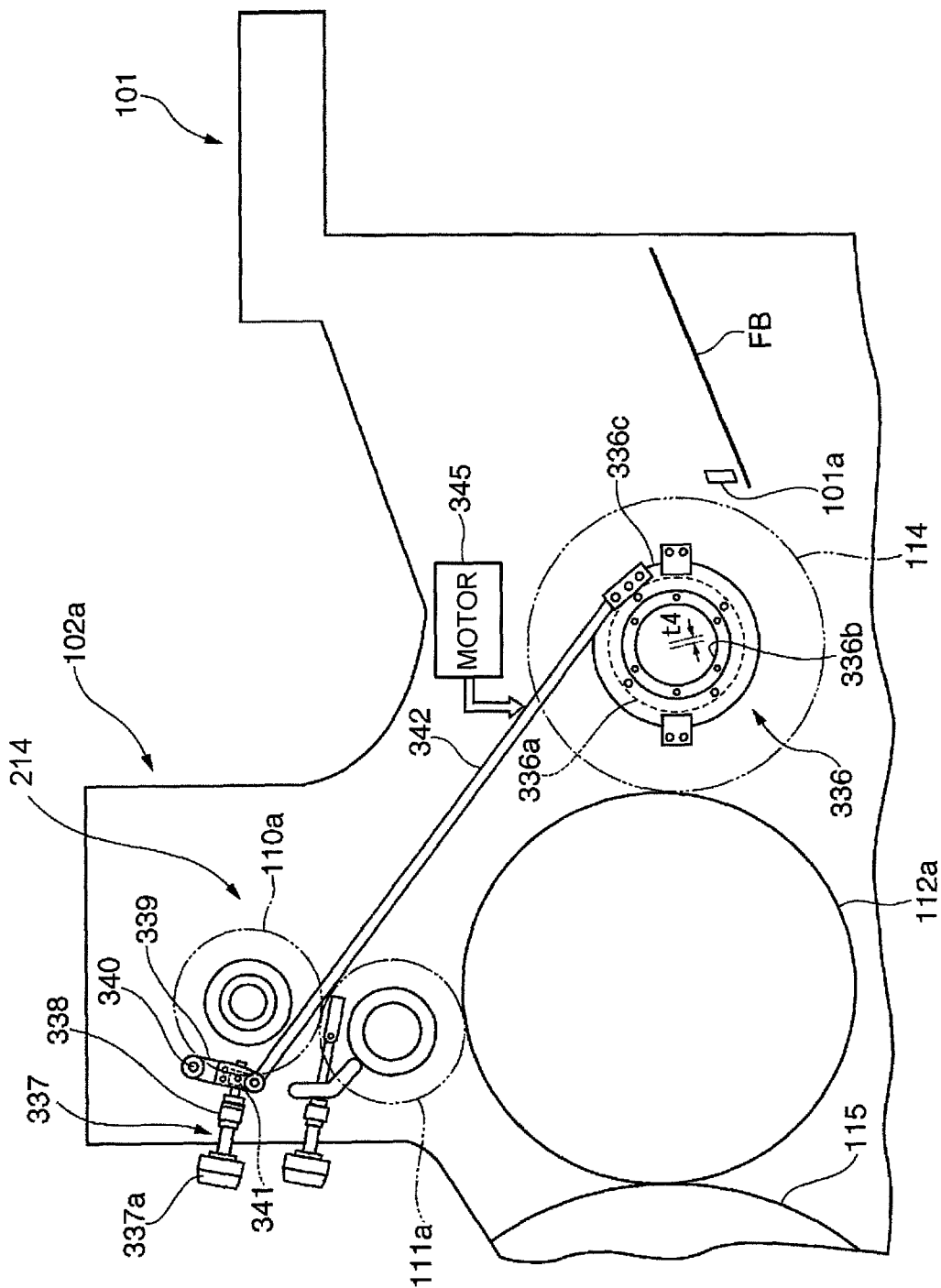
FIG. 24 is a side view showing the arrangement of an automatic transfer cylinder cocking adjustment device.

In the first embodiment, the operator manually performs transfer cylinder cocking adjustment using the manual transfer cylinder cocking adjustment device 213 of the control console 200. The transfer cylinder cocking adjustment may be performed automatically. In this case, an automatic transfer cylinder cocking adjustment device (cocking adjustment unit) 214 shown in FIG. 24 is used in place of the manual transfer cylinder cocking adjustment device 213. Note that the same reference numerals as in FIG. 6 denote the corresponding portions in FIG. 24.

The automatic transfer cylinder cocking adjustment device 214 is formed by adding a motor 345 to the manual transfer cylinder cocking adjustment device 213 shown in FIG. 6. The motor 345 is an actuator that is connected to the rod 342 and makes the eccentric bearing 336 pivot by a predetermined angle via the rod 342. The automatic transfer cylinder cocking adjustment device 214 is provided with, for example, a switch configured to give an instruction to the motor 345 that makes the eccentric bearing 336 pivot. The switch is used as an operation unit configured to operate the automatic transfer cylinder cocking adjustment device 214. The rest of the arrangement of the automatic transfer cylinder cocking adjustment device 214 is the same as that of the manual transfer cylinder cocking adjustment device 213. The motor 345, the rod 342, and the eccentric bearing 336 constitute the automatic transfer cylinder cocking adjustment device 214. The automatic transfer cylinder cocking adjustment device 214 also functions as a sheet skewing device (cocking adjustment unit) that adjusts the angle of the lenticular lens sheet 1 with respect to the plate 10a.

Figure 25:
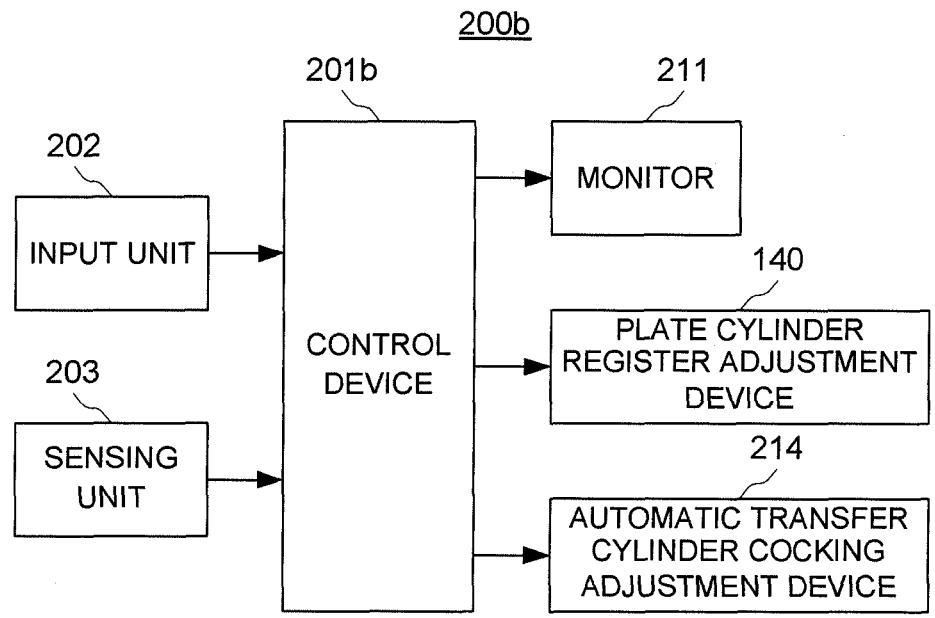
FIG. 25 is a block diagram showing the circuit arrangement of a control console that performs an automatic transfer cylinder cocking adjustment operation in the second modification of the first embodiment.

As shown in FIG. 25, a control console 200b includes a control device 201b, the input unit 202, the above-described sensing unit 203, the monitor 211, the plate cylinder register adjustment device 140, and the automatic transfer cylinder cocking adjustment device 214. The input unit 202, the sensing unit 203, the monitor 211, the plate cylinder register adjustment device 140, and the automatic transfer cylinder cocking adjustment device 214 are connected to the control device 201b.

Figure 26:
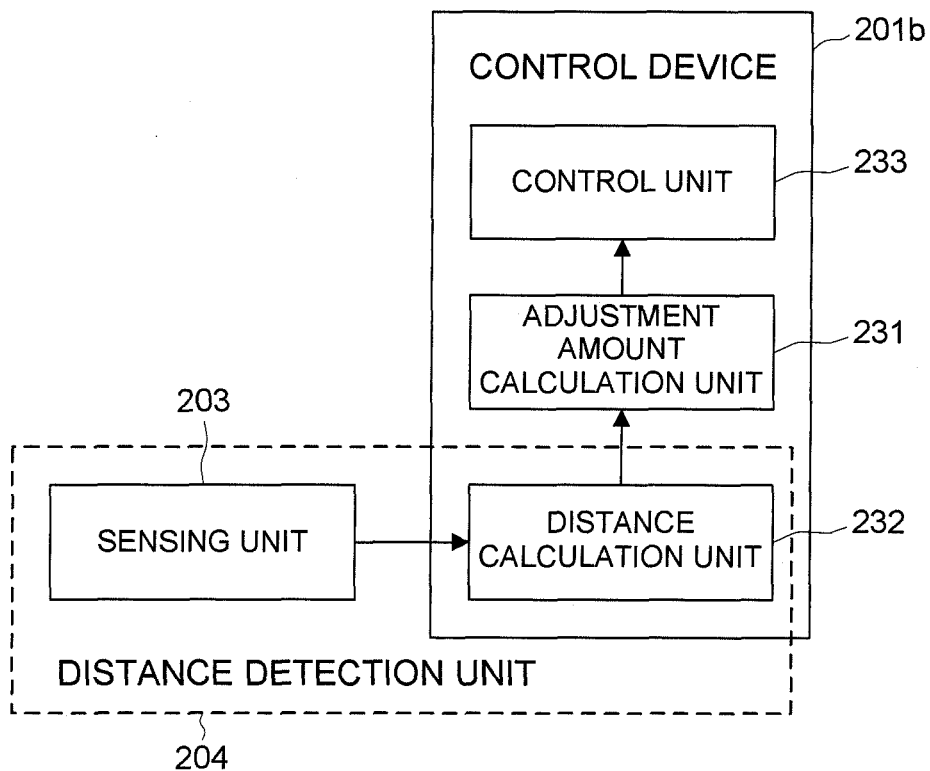
FIG. 26 is a block diagram showing the arrangement of a control device in FIG. 25.

As shown in FIG. 26, the control device 201b includes a control unit 233 in addition to the above-described adjustment amount calculation unit 231 and distance calculation unit 232. The control unit 233 controls the motor 345 of the automatic transfer cylinder cocking adjustment device 214 based on the cocking adjustment amount hp calculated by the adjustment amount calculation unit 231, thereby controlling the sheet skewing device.

In the automatic transfer cylinder cocking adjustment operation as well, the plate positioning step S1 and the lenticular lens sheet aligning step S2 are performed, as in the above-described manual transfer cylinder cocking adjustment operation. Then, the sensing unit 203 and the distance calculation unit 232 perform the distance measurement step S3 of calculating the distance (gap amount) hs between the stopper 22 of the table 20 and the lower edge 1b of the lenticular lens sheet 1.

The adjustment amount calculation unit 231 calculates the cocking adjustment amount hp from the known sizes Ls and Lp registered in advance and the distance hs output from the distance calculation unit 232. The calculation step S4 of the cocking adjustment amount hp is performed in this way. The cocking adjustment amount hp is output to the control unit 233. At this time, the cocking adjustment amount hp can also be displayed on the monitor 211 (display step S5).

The control unit 233 drives the motor 345 of the automatic transfer cylinder cocking adjustment device 214 in accordance with the cocking adjustment amount hp. This moves the rod 342 and makes the eccentric bearing 336 pivotally attached to the distal end of the rod 342 pivot by an angle corresponding to the cocking adjustment amount hp. As a result, the transfer cylinder 114 undergoes skewing adjustment (cocking adjustment) in accordance with the pivotal movement of the eccentric bearing 336. The control step of the control device 201b for the automatic transfer cylinder cocking adjustment device 214 is performed in this way.

<Second Embodiment>

The second embodiment of the present invention will be described next. The overall arrangement of a four-color sheet-fed web offset printing press 100 according to the second embodiment is the same as in the first embodiment. Hence, a description will appropriately be omitted, and portions different from the first embodiment will mainly be explained.

The four-color sheet-fed web offset printing press 100 according to the second embodiment performs the cocking adjustment operation using, as a plate cylinder cocking adjustment device (cocking adjustment unit), a manual skewing adjustment mechanism (to be described later) in a plate cylinder register adjustment device 140, which manually adjusts a skewing register, without using the manual transfer cylinder cocking adjustment device 213 of the transfer cylinder 114 in the first embodiment. That is, in the second embodiment, the plate cylinder register adjustment device 140 serves as the plate cylinder cocking adjustment device as well.

<Arrangement of Plate Cylinder>

The arrangement of a plate cylinder 110a according to the second embodiment is the same as that of the plate cylinder 110a shown in FIGS. 2 and 3. However, the plate cylinder register adjustment device 140 provided in the plate cylinder 110a is provided not only with the above-described circumferential position adjustment mechanism and lateral position adjustment mechanism but also with a manual skewing adjustment mechanism (plate cylinder cocking adjustment device) that adjusts the skewing register of the plate cylinder 110a. The manual skewing adjustment mechanism will be described.

Figure 27:
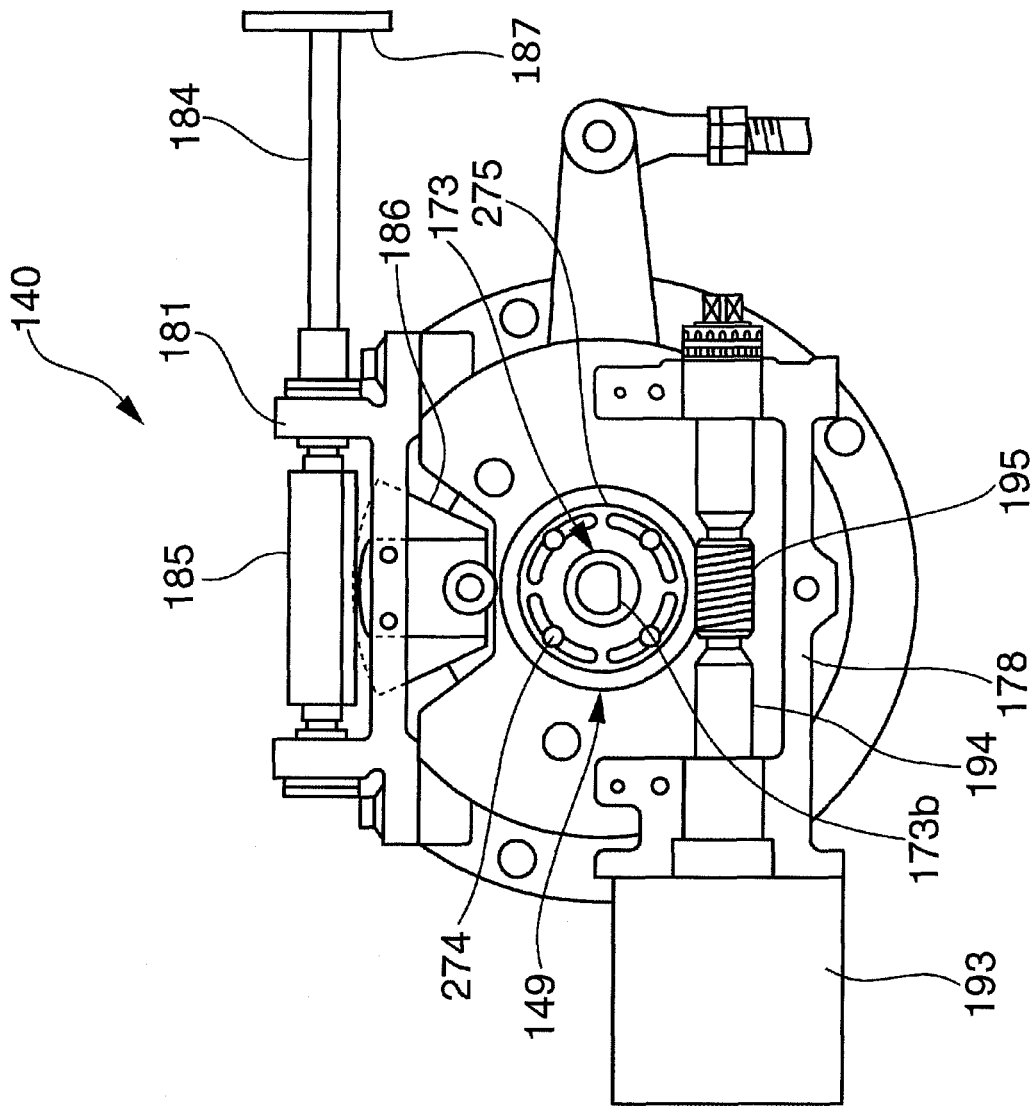
FIG. 27 is a side view showing the arrangement of a plate cylinder register adjustment device according to the second embodiment.

The same reference numerals as in FIGS. 3 and 5 denote the corresponding portions in FIG. 27. As shown in FIG. 27, a bearing 181 having a U shape when viewed from a side is fixed at the top of a bracket 168 on the operation side. A rotating shaft 184 is axially supported by the bearing 181. A handle 187 serving as an operation unit configured to rotate the rotating shaft 184 is attached to the distal end of the rotating shaft 184. A rack 185 whose pivotal movement is regulated by a guide shaft 185a threadably engages with the threaded portion of the rotating shaft 184.

A segment gear 186 having a fan shape meshes with the rack 185. The segment gear 186 is fixed to the outer circumference of an inner metal 167. An end shaft 110Lb of the plate cylinder 110a is axially supported by the hole of a bearing portion 167b of the inner metal 167 to be rotatable. Note that the handle 187, the rotating shaft 184, the bearing 181, the rack 185, the segment gear 186, and the inner metal 167 constitute the manual skewing adjustment mechanism (plate cylinder cocking adjustment device) that manually adjusts the skewing register of the plate cylinder 110a.

<Arrangement of Transfer Cylinder>

A transfer cylinder 114 according to the second embodiment is the same as the transfer cylinder 114 according to the first embodiment except that the manual transfer cylinder cocking adjustment device 213 (FIGS. 6 and 7) is not provided as a sheet skewing device using the transfer cylinder 114.

<Arrangement of Control Console>

Figure 28:
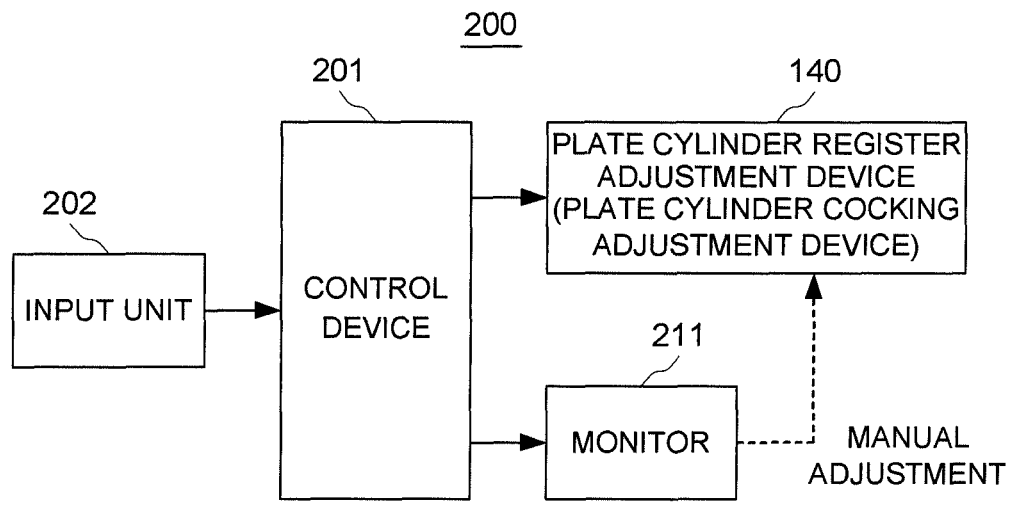
FIG. 28 is a block diagram showing the circuit arrangement of a control console that performs a manual plate cylinder cocking adjustment operation in the second embodiment.

The same reference numerals as in FIG. 9 denote the corresponding portions in FIG. 28. As shown in FIG. 28, a table 20 of a control console 200 incorporates a control device 201 having a microcomputer configuration. As in the first embodiment, an input unit 202 formed from a keyboard and the like, a monitor 211 serving as a display unit, and the plate cylinder register adjustment device 140 are connected to the control device 201.

As described above, the plate cylinder register adjustment device 140 is used as the circumferential position adjustment mechanism, the lateral position adjustment mechanism, and manual skewing adjustment mechanism (plate cylinder cocking adjustment device). However, the control device 201 only controls to cause the plate cylinder register adjustment device 140 to function as the circumferential position adjustment mechanism and the lateral position adjustment mechanism. The control device 201 does not directly control to cause the plate cylinder register adjustment device 140 to function as the manual skewing adjustment mechanism. The function as the manual skewing adjustment mechanism is implemented by causing an operator who recognizes a cocking adjustment amount hp displayed on the monitor 211 to manually operate the plate cylinder register adjustment device 140.

Figure 29:
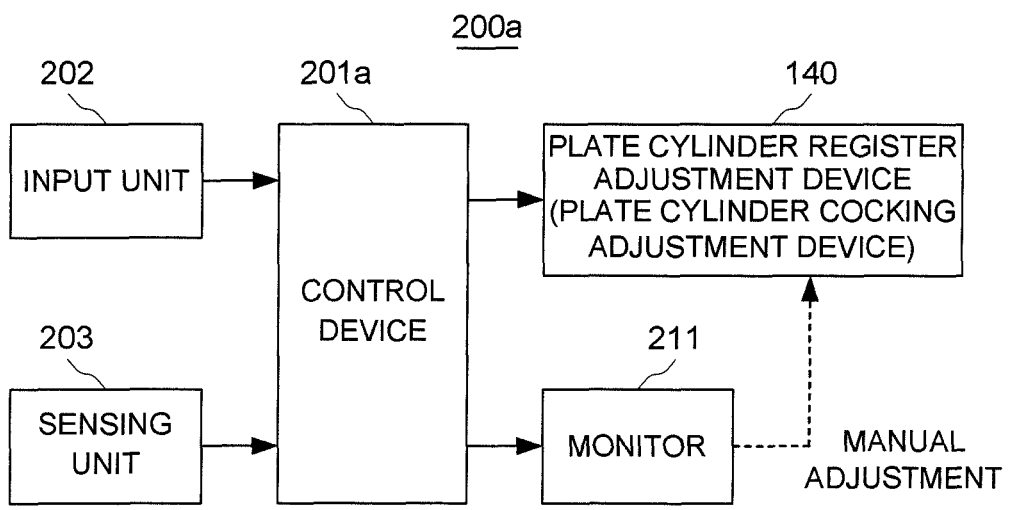
FIG. 29 is a block diagram showing the circuit arrangement of a control console that performs a manual plate cylinder cocking adjustment operation in the description of another embodiment corresponding to the second embodiment.

As shown in FIG. 29, a control console 200a including a sensing unit 203 formed from a camera, a photoelectric sensor, or the like may be used, as in the first modification of the first embodiment.

<Arrangements of Lenticular Lens Sheet and Plate Mounted on Plate Cylinder>

Plates 10a to 10d mounted on plate cylinders 110a to 110d and a lenticular lens sheet 1 to which a pattern 13 of each of the plates 10a to 10d is transferred are the same as in the first embodiment.

<Plate Cylinder Register Adjustment Operation>

The circumferential and lateral register adjustment operations for the plate cylinders 110a to 110d by the plate cylinder register adjustment device 140 when circumferential and lateral misregistrations are generated between the lenticular lens sheet 1 and the pattern 13 of the plate 10a mounted on the plate cylinder 110a are the same as in the first embodiment.

Hence, a description of the circumferential and lateral register adjustment operations will be omitted.

<Manual Plate Cylinder Cocking Adjustment Operation>

A manual plate cylinder cocking adjustment operation when manually adjusting the skewing register of the plate cylinders 110a to 110d using the plate cylinder cocking adjustment device (handle 187, rotating shaft 184, bearing 181, rack 185, segment gear 186, and inner metal 167) after the plate cylinder register adjustment device 140 has performed the circumferential and lateral register adjustment operations for the plate cylinders 110a to 110d will be described.

The control device 201 calculates the cocking adjustment amount hp based on a distance (gap amount) hs between a stopper 22 and a lower edge 1b of the lenticular lens sheet 1 input from the input unit 202 by the operator, as in the first embodiment (calculation step S4). The control device 201 displays the cocking adjustment amount hp on the monitor 211 (display step S5).

The operator confirms the cocking adjustment amount hp on the monitor 211, and operates the handle 187 of the manual skewing adjustment mechanism (plate cylinder cocking adjustment device) of the plate cylinder register adjustment device 140 (FIGS. 3 and 27) in accordance with the cocking adjustment amount hp. The rotating shaft 184 rotates in accordance with the operation of the handle 187, and the rack 185 is moved by the screw function obtained by the rotation of the rotating shaft 184. This makes the segment gear 186 pivot, and the inner metal 167 integrated with the segment gear 186 accordingly pivots.

Figure 30:
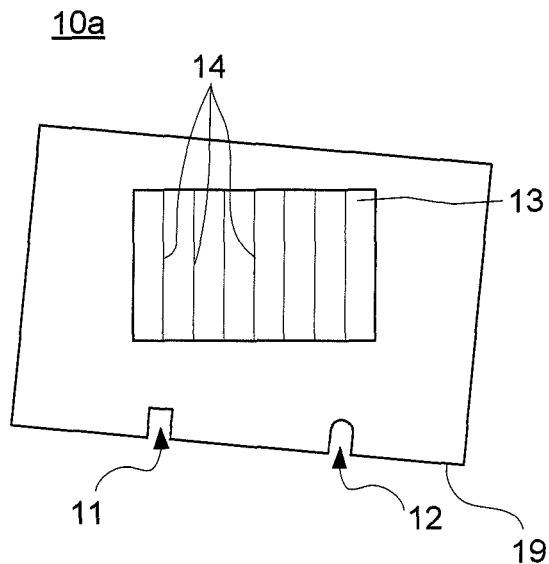
FIG. 30 is a plan view for explaining plate cylinder cocking adjustment.

The axis of the outer circumference of the inner metal 167 and that of the plate cylinder 110a have an eccentric amount t3. The axial-direction orientation of the plate cylinder 110a undergoes skewing adjustment (plate cylinder cocking adjustment) by the cocking adjustment amount hp due to the eccentric function of the eccentric amount t3, and the plate cylinder 110a itself tilts by the cocking adjustment amount hp. As a result, the plate 10a mounted on the plate cylinder 110a also tilts by the cocking adjustment amount hp as a whole, as shown in FIG. 30.

Similarly, the manual skewing adjustment mechanism (plate cylinder cocking adjustment device) of the plate cylinder register adjustment device 140 tilt the plate cylinders 110b to 110d themselves by the cocking adjustment amount hp.

As described above, the circumferential position adjustment mechanism, the lateral position adjustment mechanism, and the manual skewing adjustment mechanism (plate cylinder cocking adjustment device) of the plate cylinder register adjustment device 140 perform the circumferential and lateral register adjustment operations and the skewing adjustment operation in advance for the plate cylinders 110a to 110d. Adjustment is thus performed in advance such that when the lenticular lens sheet 1 passes between impression cylinders 112a to 112d and blanket cylinders 111a to 111d in contact with the plate cylinders 110a to 110d, a positional relationship in which a plurality of boundary lines 14 of the patterns 13 of the plates 10a to 10d to be transferred via the blanket cylinders 111a to 111d relatively match a plurality of groove lines 2 of the lenticular lens sheet 1 is obtained.

It is therefore possible to accurately transfer the combined pattern portions (A1+B1, A2+B2, . . . ) of the patterns 13 of the plates 10a to 10d mounted on the plate cylinders 110a to 110d tilted by the cocking adjustment amount hp to the pattern transfer regions between the groove lines 2 of the lenticular lens sheet 1 conveyed by the transfer cylinder 114.

Since the plate cylinder register adjustment device 140 has performed the circumferential, lateral, and skewing register adjustments, the four-color sheet-fed web offset printing press 100 performs test printing on the lenticular lens sheet 1 via printing units 102a to 102d. As a result, if shift amounts exist in register marks 15 and 16 of the respective colors printed on the lenticular lens sheet 1 by the printing units 102a to 102d, fine circumferential, lateral, or skewing register adjustment of the plate cylinders 110a to 110d is performed based on the shift amounts.

<Printing Operation of Four-Color Sheet-Fed Web Offset Printing Press>

In the four-color sheet-fed web offset printing press 100, the lenticular lens sheet 1 held by a suction device 101b of a sheet supply device 101 is placed on a feeder board FB and conveyed. In a state in which one end (leading-side end) of the lenticular lens sheet 1 abuts against a front lay 101c provided on the distal end side of the feeder board FB, and the circumferential position is aligned, the lenticular lens sheet 1 is transferred from the swing arm grippers of the swing device to the gripper device of the transfer cylinder 114.

The lenticular lens sheet 1 held by the gripper device of the transfer cylinder 114 is transferred to the gripper device of the impression cylinder 112a. In the second embodiment, since the transfer cylinder 114 has not undergone transfer cylinder cocking adjustment, the lenticular lens sheet 1 is held and conveyed by the gripper device of the impression cylinder 112a without skewing adjustment of its conveyance angle. At this time, the lenticular lens sheet 1 is conveyed with its reverse surface facing outward.

The lenticular lens sheet 1 held by the gripper device of the impression cylinder 112a is conveyed as the impression cylinder 112a rotates, and passes between the impression cylinder 112a and the blanket cylinder 111a. At this time, the pattern 13 of the plate 10a of the first color mounted on the plate cylinder 110a is transferred to the reverse surface of the lenticular lens sheet 1 via the blanket cylinder 111a.

The circumferential position adjustment mechanism, the lateral position adjustment mechanism, and the skewing adjustment mechanism (plate cylinder cocking adjustment device) of the plate cylinder register adjustment device 140 perform the circumferential and lateral register adjustment operations and the cocking adjustment operation according to the cocking adjustment amount hp for the plate cylinder 110a in advance. Hence, the pattern is accurately transferred in a state in which the boundary lines 14 of the pattern 13 of the plate 10a of the first color match the groove lines 2 of the lenticular lens sheet 1.

The lenticular lens sheet 1 with the transferred pattern 13 of the plate 10a is transferred from the gripper device of the impression cylinder 112a to the gripper device of a transfer cylinder 115 and then conveyed from the transfer cylinder 115 to the impression cylinder 112b of the printing unit 102b.

The circumferential position adjustment mechanism, the lateral position adjustment mechanism, and the skewing adjustment mechanism (plate cylinder cocking adjustment device) of the plate cylinder register adjustment device 140 also perform the circumferential and lateral register adjustment operations and the cocking adjustment operation of the plate cylinders 110b to 110d. Hence, in the printing units 102b, 102c, and 102d as well, the patterns 13 of the plates 10b, 10c, and 10d of the second, third, and fourth colors are accurately transferred to the reverse surface of the lenticular lens sheet 1 via the blanket cylinders 111b, 111c, and 111d.

The lenticular lens sheet 1 to which the patterns 13 of the four colors have been transferred is conveyed to a sheet delivery device 103 via a transfer cylinder 118 and stacked on a stack board 103a for delivery via the gripper bar of a delivery chain.

Note that the calculation of the cocking adjustment amount hp, print processing, and the like for the lenticular lens sheet 1 of the second lot are the same as in the first embodiment, and a description thereof will be omitted here.

<Modification of Second Embodiment>

In the second embodiment, the operator manually performs the plate cylinder cocking adjustment operation. The plate cylinder cocking adjustment operation may be performed automatically. In this case, the plate cylinder register adjustment device 140 including a skewing adjustment motor 183 serving as an actuator for plate cylinder register adjustment as shown in FIGS. 3 and 5 is used.

The bearing 181 formed into a U shape is fixed at the top of the bracket 168 on the operation side. The rotating shaft 184 is axially supported by the bearing 181 and a bearing 182 on the frame side. The above-described skewing adjustment motor 183 is connected to the rotating shaft 184. The rack 185 whose pivotal movement is regulated by the guide shaft 185a threadably engages with the threaded portion of the rotating shaft 184. The rest of the arrangement is the same as in the second embodiment. Note that the skewing adjustment motor 183, the rotating shaft 184, the bearing 181, the rack 185, the segment gear 186, and the inner metal 167 constitute the automatic skewing adjustment mechanism (plate cylinder cocking adjustment device, cocking adjustment unit) that automatically adjusts the skewing register of the plate cylinder 110a.

Figure 31:
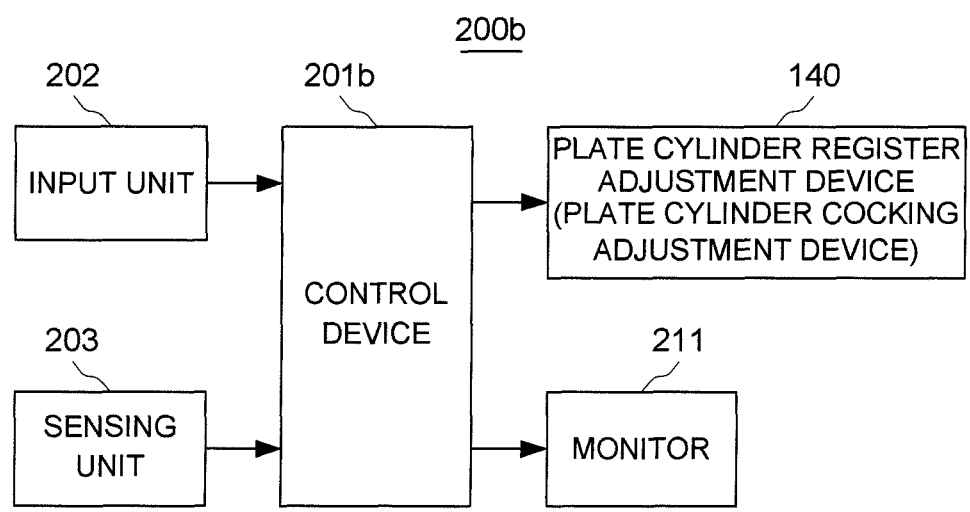
FIG. 31 is a block diagram showing the circuit arrangement of a control console that performs an automatic plate cylinder cocking adjustment operation in the description of a modification of the second embodiment.

As shown in FIG. 31, the basic arrangement of a control console 200b is the same as that of the control console 200a shown in FIG. 29. However, a control device 201b of the control console 200b directly controls not only the circumferential position adjustment mechanism and the lateral position adjustment mechanism of the plate cylinder register adjustment device 140 but also the automatic skewing adjustment mechanism. For this purpose, the control device 201b includes a control unit 233 in addition to an adjustment amount calculation unit 231 and a distance calculation unit 232, like the control device 201b shown in FIG. 26. The control unit 233 controls the skewing adjustment motor 183 based on the cocking adjustment amount hp calculated by the adjustment amount calculation unit 231, thereby controlling the automatic skewing adjustment mechanism.

An automatic plate cylinder cocking adjustment operation when automatically adjusting the skewing register of the plate cylinder 110a using the automatic skewing adjustment mechanism of the plate cylinder register adjustment device 140 will be described.

In the automatic plate cylinder cocking adjustment operation as well, plate positioning step S1 and lenticular lens sheet aligning step S2 are performed, as in the above-described manual plate cylinder cocking adjustment operation. Then, the sensing unit 203 and the distance calculation unit 232 perform distance measurement step S3 of calculating a distance (gap amount) hs between the stopper 22 of the table 20 and the lower edge 1b of the lenticular lens sheet 1. The adjustment amount calculation unit 231 calculates the cocking adjustment amount hp from known sizes Ls and Lp registered in advance and the distance hs output from the distance calculation unit 232 (calculation step S4). The monitor 211 displays the cocking adjustment amount hp (display step S5).

The control unit 233 drives the skewing adjustment motor 183 of the automatic skewing adjustment mechanism of the plate cylinder register adjustment device 140 in accordance with the cocking adjustment amount hp. The rotating shaft 184 thus rotates, and the rack 185 is moved by the screw function obtained by the rotation of the rotating shaft 184. This makes the segment gear 186 pivot, and the inner metal 167 integrated with the segment gear 186 accordingly pivots. The axial-direction orientation of the plate cylinder 110a undergoes skewing adjustment (plate cylinder cocking adjustment) by the cocking adjustment amount hp due to the eccentric function of the eccentric amount t3, and the plate cylinder 110a itself tilts by the cocking adjustment amount hp. As a result, the plate 10a mounted on the plate cylinder 110a also tilts by the cocking adjustment amount hp as a whole, as shown in FIG. 30.

When the lenticular lens sheet 1 passes between impression cylinder 112a and the blanket cylinder 111a in contact with the plate cylinder 110a, a positional relationship in which the plurality of boundary lines 14 of the patterns 13 of the plate 10a to be transferred via the blanket cylinder 111a relatively match the plurality of groove lines 2 of the lenticular lens sheet 1 is obtained. Hence, in the printing unit 102a, it is possible to accurately transfer the combined pattern portions (A1+B1, A2+B2, . . . ) of the pattern 13 of the plate 10a mounted on the plate cylinder 110a tilted by the cocking adjustment amount hp to the pattern transfer regions between the groove lines 2 of the lenticular lens sheet 1 conveyed by the transfer cylinder 114.

<Third Embodiment>

The third embodiment of the present invention will be described next. The overall arrangement of a four-color sheet-fed web offset printing press 100 according to the third embodiment is the same as in the first embodiment. Hence, a description will appropriately be omitted, and portions different from the first embodiment will mainly be explained.

The four-color sheet-fed web offset printing press 100 according to the third embodiment uses a sheet skewing device (cocking adjustment unit) that directly tilts a lenticular lens sheet 1 by the front lay of a feeder board FB in place of the manual transfer cylinder cocking adjustment device 213 according to the first embodiment or the manual skewing adjustment mechanism (plate cylinder cocking adjustment device) of the plate cylinder register adjustment device 140 according to the second embodiment.

<Arrangement of Front Lay>

Figure 32:
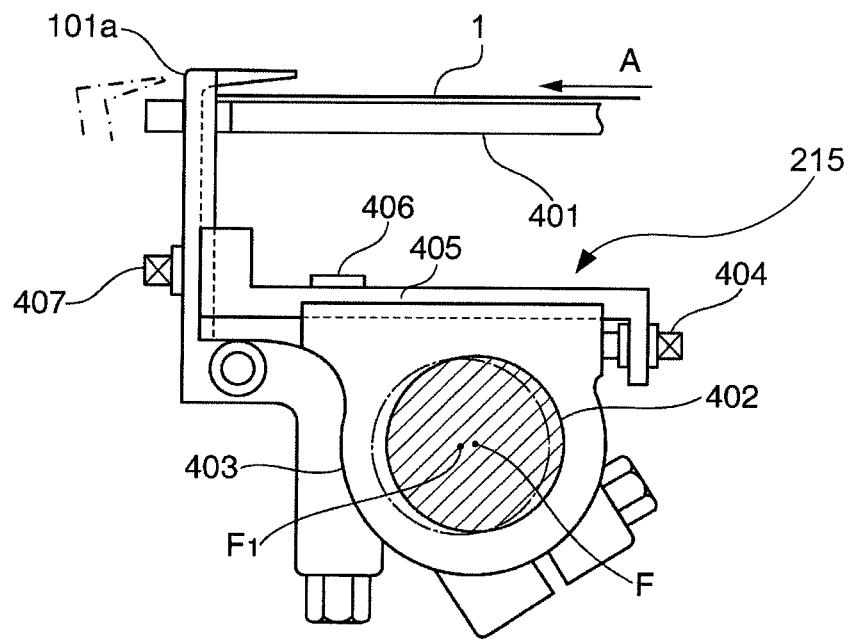
FIG. 32 is a side view showing the arrangement of a front lay cocking adjustment device according to the third embodiment.
Figure 33:
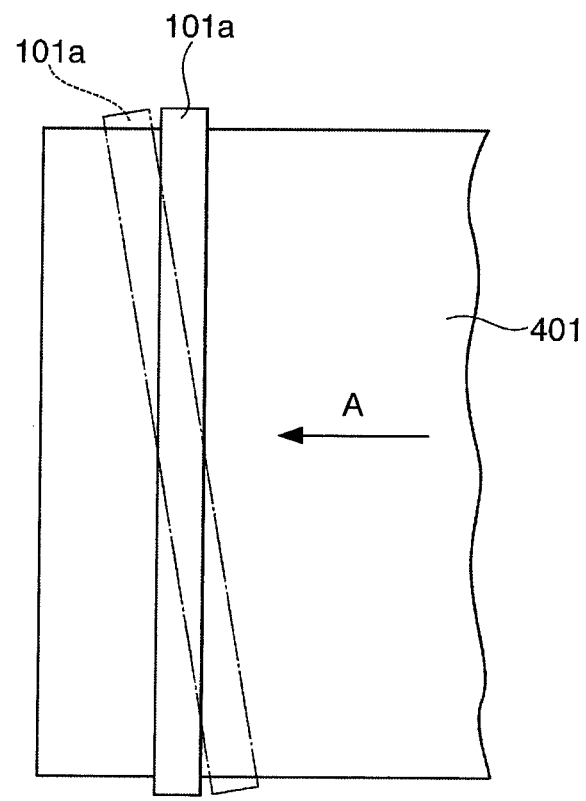
FIG. 33 is a plan view showing a state in which a front lay has undergone skewing adjustment.

As shown in FIGS. 32 and 33, the lenticular lens sheet 1 is conveyed on a feedboard 401 of the feeder board FB in the sheet conveyance direction indicated by an arrow A. A front lay 101a is disposed at the distal end of the feedboard 401. The front lay 101a has a width slightly larger than that of the feedboard 401 of the feeder board FB. While projecting from the top of the distal end of the feedboard 401, the front lay 101a is arranged parallel to the width direction of the feedboard 401 perpendicular to the sheet conveyance direction. The front lay 101a is provided with a front lay cocking adjustment device (cocking adjustment unit) 215 serving as a sheet skewing device that adjusts the angle with respect to the width direction of the feedboard 401, thereby adjusting the orientation of the lenticular lens sheet 1 abutting against the front lay 101a.

In the front lay cocking adjustment device 215, a holder 403 is axially supported by a shaft 402 provided under the feedboard 401. A plate 405 is fixed to the holder 403 by a bolt 406. The front lay 101a is attached to the end of the plate 405 by a set screw 407 to be adjustable in the vertical direction. The front lay 101a can movably be adjusted by an adjusting screw 404 in the sheet conveyance direction or a direction reverse to it.

Figure 34:
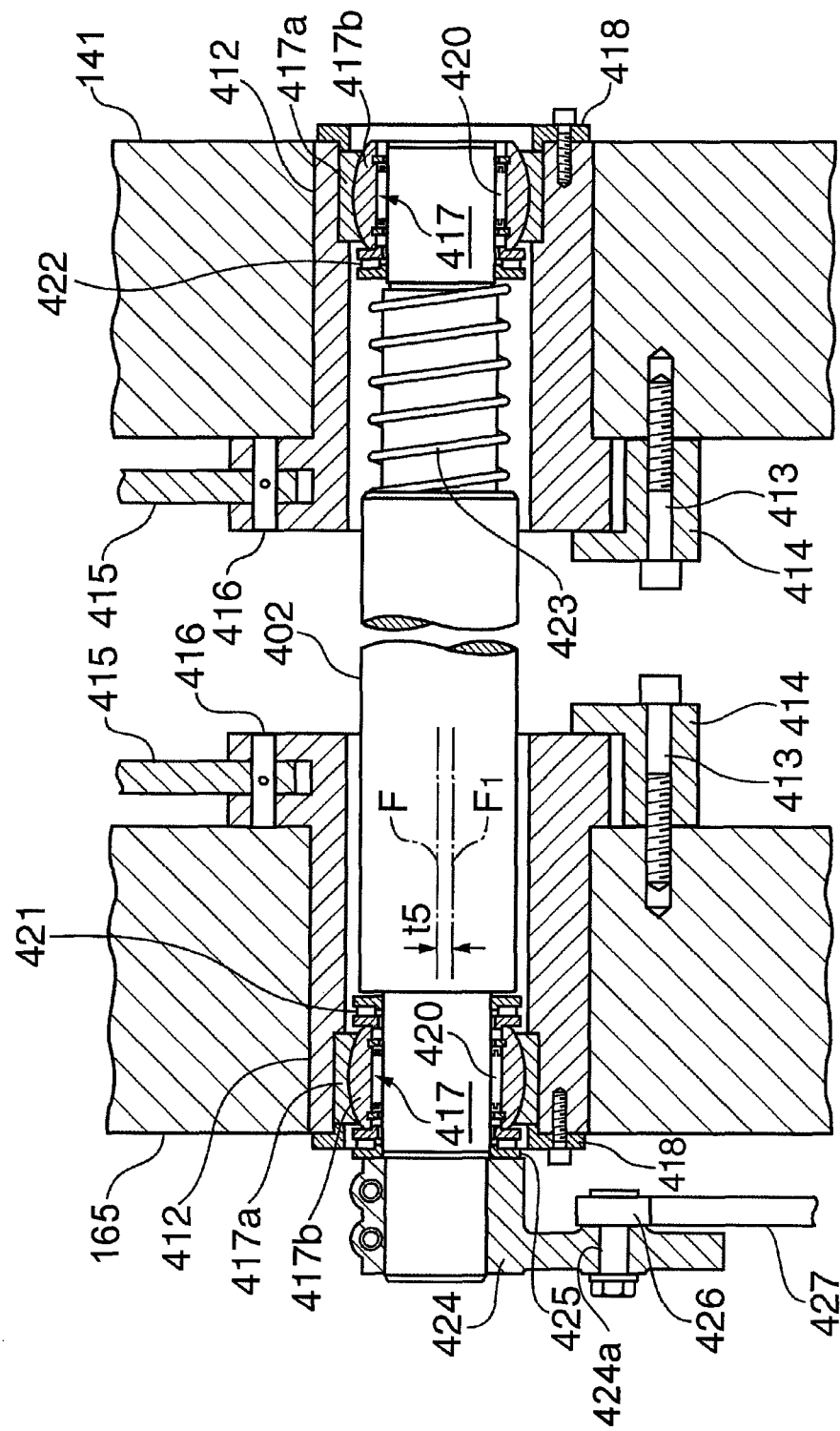
FIG. 34 is a sectional view showing the arrangement of the front lay cocking adjustment device.

As shown in FIG. 34, an eccentric bearing 412 to which an eccentric amount t5 is given by an axis F of the outer circumference and an axis F1 of the internal circumference is axially supported by each of a drive-side frame 141 and an operation-side frame 165 so as to pivot. Axial direction movement of the eccentric bearing 412 is regulated by a bearing cap 414 fixed to each of the drive-side frame 141 and the operation-side frame 165 by a bolt 413. A rod 415 having the other end connected to an operation unit (not shown) is pivotally attached, by a pin 416, to a U-shaped portion formed at the inner-side end of the eccentric bearing 412.

A spherical bearing 417 fits in each eccentric bearing 412. A bearing cap 418 prevents the spherical bearing 417 from being externally detached. The spherical bearing 417 is formed from an outer ring 417a having a spherical inner surface and a sphere 417b that fits on the spherical inner surface of the outer ring 417a. The small-diameter portions at the ends of the shaft 402 are axially supported by the inner surfaces of the spheres 417b so as to pivot via a plurality of needles 420.

A thrust bearing 421 fits on the small-diameter portion at one end of the shaft 402 between the spherical bearing 417 and one side wall of the large-diameter portion at the center of the shaft 402. A thrust bearing 422 fits on the small-diameter portion at the other end of the shaft 402 so as to be adjacent to the spherical bearing 417. In addition, a compression coil spring 423 that biases the shaft 402 against the thrust bearing 421 is held on the small-diameter portion at the other end of the shaft 402 between the thrust bearing 422 and the other side wall of the large-diameter portion at the center of the shaft 402.

The front lay 101a is axially supported, via the holder 403 (not illustrated in FIG. 34), by the large-diameter portion at the center of the shaft 402 located between the drive-side frame 141 and the operation-side frame 165. A lever 424 is axially supported at one end of the shaft 402. A thrust bearing 425 intervenes between the lever 424 and the spherical bearing 417. A cam follower 426 pivotally attached to the lever 424 via a pin 424a is in contact with a cam 427 that is supported by the operation-side frame 165 and rotates in synchronism with the printing press. When the cam 427 rotates, the shaft 402 reciprocally pivots via the cam follower 426, thereby swinging the front lay 101a.

As shown in FIG. 32, the front lay 101a is swingably supported by the shaft 402 so as to move from the position indicated by the solid line to the retraction position indicated by the alternate long and short dashed line in accordance with the counterclockwise rotation of the shaft 402 and move from the position indicated by the alternate long and short dashed line to the register adjustment position indicated by the solid line in accordance with the clockwise rotation of the shaft 402.

<Arrangement of Control Console>

Figure 35:
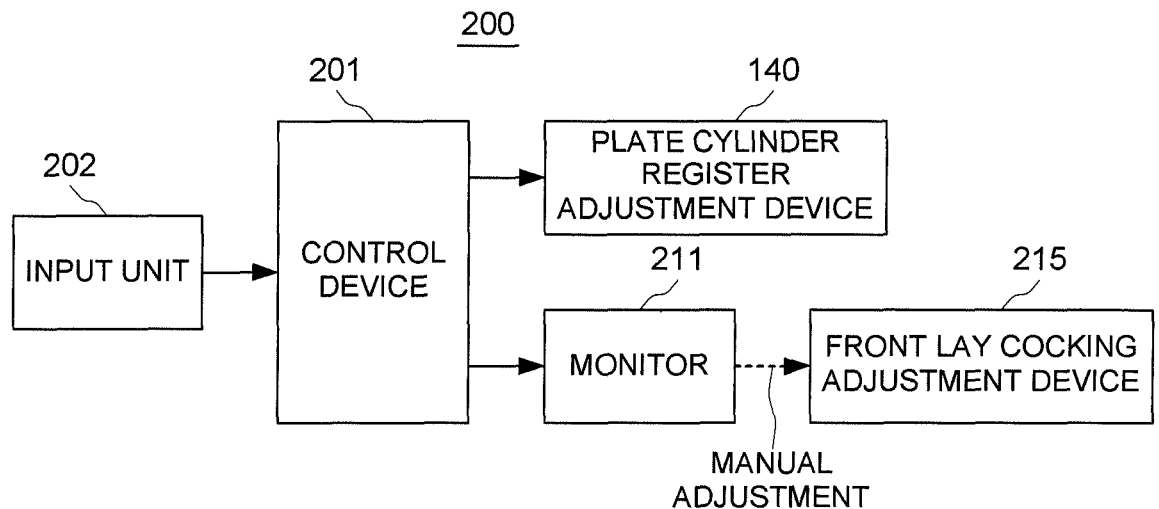
FIG. 35 is a block diagram showing the circuit arrangement of a control console that performs a manual front lay cocking adjustment operation in the third embodiment.

The same reference numerals as in FIG. 9 denote the corresponding portions in FIG. 35. As shown in FIG. 35, a table 20 of a control console 200 incorporates a control device 201 having a microcomputer configuration. As in the first embodiment, an input unit 202 formed from a keyboard and the like, a monitor 211 serving as a display unit, and a plate cylinder register adjustment device 140 that performs circumferential and lateral register adjustments are connected to the control device 201. However, the front lay cocking adjustment device 215 is not connected to the control device 201.

Figure 36:
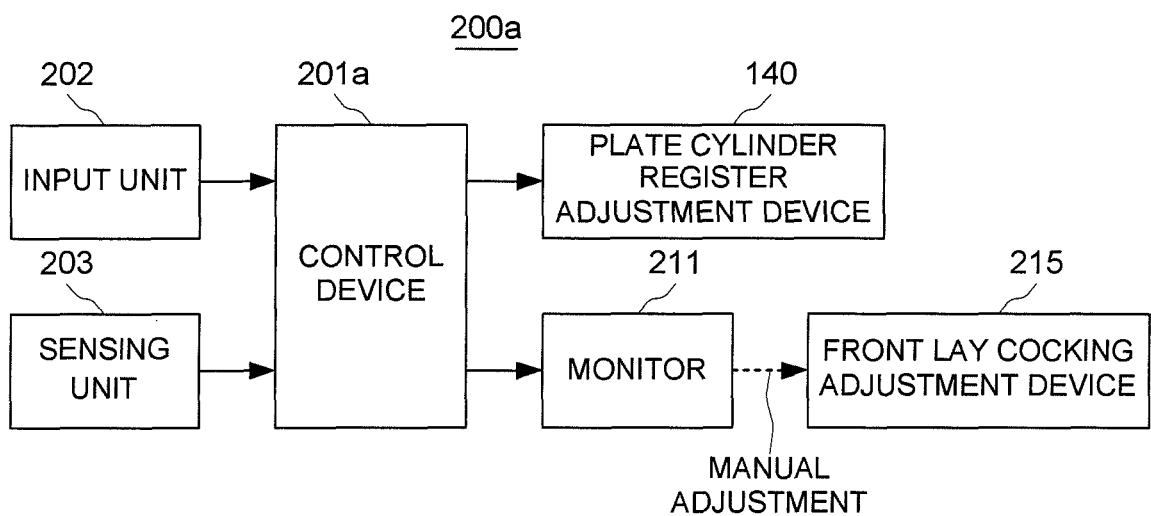
FIG. 36 is a block diagram showing the circuit arrangement of a control console that performs a manual front lay cocking adjustment operation in another embodiment corresponding to the third embodiment.

As shown in FIG. 36, a control console 200a including a sensing unit 203 formed from a camera, a photoelectric sensor, or the like may be used, as in the first modification of the first embodiment.

<Plate Cylinder Register Adjustment Operation>

The circumferential and lateral register adjustment operations for plate cylinders 110a to 110d by the plate cylinder register adjustment device 140 when circumferential and lateral misregistrations are generated between the lenticular lens sheet 1 and a pattern 13 of a plate 10a mounted on the plate cylinder 110a are the same as in the first embodiment. Hence, a description of the circumferential and lateral register adjustment operations will be omitted.

<Manual Front Lay Cocking Adjustment Operation>

A manual front lay cocking adjustment operation when manually performing front lay cocking adjustment using the front lay cocking adjustment device 215 will be described.

As shown in FIG. 35, the control device 201 of the control console 200 calculates a cocking adjustment amount hp based on a distance (gap amount) hs between a stopper 22 and a lower edge 1b of the lenticular lens sheet 1 input from the input unit 202 by the operator, as in the first embodiment (calculation step S4). The control device 201 displays the cocking adjustment amount hp on the monitor 211 (display step S5).

Alternatively, as shown in FIG. 36, the control device 201 of the control console 200a obtains the distance hs based on the detection result from the sensing unit 203, as in the first embodiment (measurement step S3). The control device 201 calculates the cocking adjustment amount hp based on the distance hs (calculation step S4) and displays the cocking adjustment amount hp on the monitor 211 (display step S5).

The operator recognizes the cocking adjustment amount hp displayed on the monitor 211, and operates the operation unit (not shown) of the front lay cocking adjustment device 215 in accordance with the cocking adjustment amount hp to move one rod 415 in a predetermined direction (a direction perpendicular to the drawing surface of FIG. 34) by a predetermined amount. The eccentric bearing 412 thus pivots, and the shaft 402 is tilted by the eccentric function. Note that instead of moving only one rod 415, both rods 415 may be moved in directions opposite to each other.

Hence, one end of the shaft 402 perpendicular to the drive-side frame 141 moves in the sheet conveyance direction or the direction reverse to it more than the other end, and the shaft 402 tilts with respect to the axial direction. Along with the tilt of the shaft 402, the front lay 101a fixed to the holder 403 axially supported by the large-diameter portion at the center of the shaft 402 tilts by the cocking adjustment amount hp. That is, the front lay 101a tilts from the position indicated by the solid line to the position indicated by the alternate long and short dashed line, as shown in FIG. 33. Alternatively, the front lay 101a tilts in a direction opposite to that indicated by the alternate long and short dashed line.

One end (leading-side end) of the lenticular lens sheet 1 conveyed on the feedboard 401 of the feeder board FB abuts against the front lay 101a tilted by the cocking adjustment amount hp. Hence, the lenticular lens sheet 1 also tilts in accordance with the tilt state of the front lay 101a.

As described above, the circumferential position adjustment mechanism, the lateral position adjustment mechanism, and the front lay cocking adjustment device 215 of the plate cylinder register adjustment device 140 perform the circumferential and lateral register adjustment operations of the plate cylinder 110a and the tilt adjustment operation of the front lay 101a in advance. Setting is thus done such that when the lenticular lens sheet 1 passes between an impression cylinder 112a and a blanket cylinder 111a in contact with the plate cylinder 110a via the front lay 101a and a transfer cylinder 114, a positional relationship in which a plurality of boundary lines 14 of the pattern 13 of the plate 10a to be transferred via the blanket cylinder 111a relatively match a plurality of groove lines 2 of the lenticular lens sheet 1 is obtained.

A printing unit 102a thus sets a state in which it is possible to accurately transfer the combined pattern portions (A1+B1, A2+B2, ...) of the pattern 13 of the plate 10a mounted on the plate cylinder 110a to the pattern transfer regions between the groove lines 2 of the lenticular lens sheet 1 conveyed via the front lay 101a of the feeder board FB and the transfer cylinder 114.

<Printing Operation of Four-Color Sheet-Fed Web Offset Printing Press>

In the four-color sheet-fed web offset printing press 100, the lenticular lens sheet 1 held by the suction device of a sheet supply device 101 is placed on the feedboard 401 of the feeder board FB and conveyed. One end (leading-side end) of the lenticular lens sheet 1 abuts against the front lay 101a provided at the distal end of the feeder board FB.

The front lay 101a is tilted by the front lay cocking adjustment device 215 in advance by the cocking adjustment amount hp. The circumferential orientation of the lenticular lens sheet 1 tilts in accordance with the tilt angle of the front lay 101a, and in this state, the leading-side end of the lenticular lens sheet 1 is gripped by the swing arm grippers of the swing device of the subsequent stage.

At this time, the control device 201 rotates the shaft 402 counterclockwise in FIG. 32 via the actuator. As the shaft 402 rotates, the front lay 101a moves from the register adjustment position indicated by the solid line to the retraction position indicated by the alternate long and short dashed line, and the lenticular lens sheet 1 is transferred from the feedboard 401 of the feeder board FB to the gripper device of the transfer cylinder 114 via the swing device.

The shaft 402 rotates clockwise during conveyance of the lenticular lens sheet 1 to the transfer cylinder 114 by the swing arm grippers of the swing device. The front lay 101a thus returns to the original register adjustment position and waits for the next lenticular lens sheet 1 to tilt its orientation.

The lenticular lens sheet 1 held by the gripper device of the transfer cylinder 114 is transferred to the gripper device of the impression cylinder 112a and conveyed as the impression cylinder 112a rotates, and passes between the impression cylinder 112a and the blanket cylinder 111a. At this time, the pattern 13 of the plate 10a of the first color mounted on the plate cylinder 110a that has undergone circumferential and lateral register adjustments in advance is transferred to the reverse surface of the lenticular lens sheet 1 via the blanket cylinder 111a.

As described above, the lenticular lens sheet 1 (FIG. 18B) with the tilted groove lines 2 is conveyed via the transfer cylinder 114 while being tilted by the front lay 101a of the feeder board FB by the cocking adjustment amount hp, and passes between the impression cylinder 112a and the blanket cylinder 111a in contact with the plate cylinder 110a. As a result, a positional relationship in which the plurality of boundary lines 14 (FIG. 18A) of the pattern 13 of the plate 10 to be transferred via the blanket cylinder 111a relatively match the plurality of groove lines 2 (FIG. 18B) of the lenticular lens sheet 1 is obtained (FIG. 18C).

The circumferential and lateral register adjustment operations of the plate cylinder 110a by the circumferential position adjustment mechanism and the lateral position adjustment mechanism of the plate cylinder register adjustment device 140 and the cocking adjustment operation by the cocking adjustment amount hp by the front lay 101a are performed in advance. Hence, the pattern is accurately transferred in a state in which the boundary lines 14 of the pattern 13 of the plate 10a of the first color match the groove lines 2 of the lenticular lens sheet 1.

The combined pattern portions (A1+B1, A2+B2, ...) of the pattern 13 of the plate 10a mounted on the plate cylinder 110a are accurately transferred, without shifts, to the pattern transfer regions between the groove lines 2 of the lenticular lens sheet 1 conveyed in a state in which the lenticular lens sheet 1 is tilted by the cocking adjustment amount hp.

The lenticular lens sheet 1 with the transferred pattern 13 of the plate 10a is transferred from the gripper device of the impression cylinder 112a to the gripper device of a transfer cylinder 115 and conveyed from the transfer cylinder 115 to a impression cylinder 112b of a printing unit 102b.

In the printing units 102b, 102c, and 102d as well, the patterns 13 of the plates 10b, 10c, and 10d of the second, third, and fourth colors are similarly accurately transferred to the reverse surface of the lenticular lens sheet 1 via blanket cylinders 111b, 111c, and 111d. After that, the lenticular lens sheet 1 is conveyed to a sheet delivery device 103 via a transfer cylinder 118 and stacked on a stack board 103a for delivery via the gripper bar of a delivery chain.

<Modification of Third Embodiment>

In the third embodiment, the operator manually performs the cocking adjustment operation of the front lay 101a using the front lay cocking adjustment device 215. The cocking adjustment operation of the front lay 101a may automatically be performed.

Figure 37:
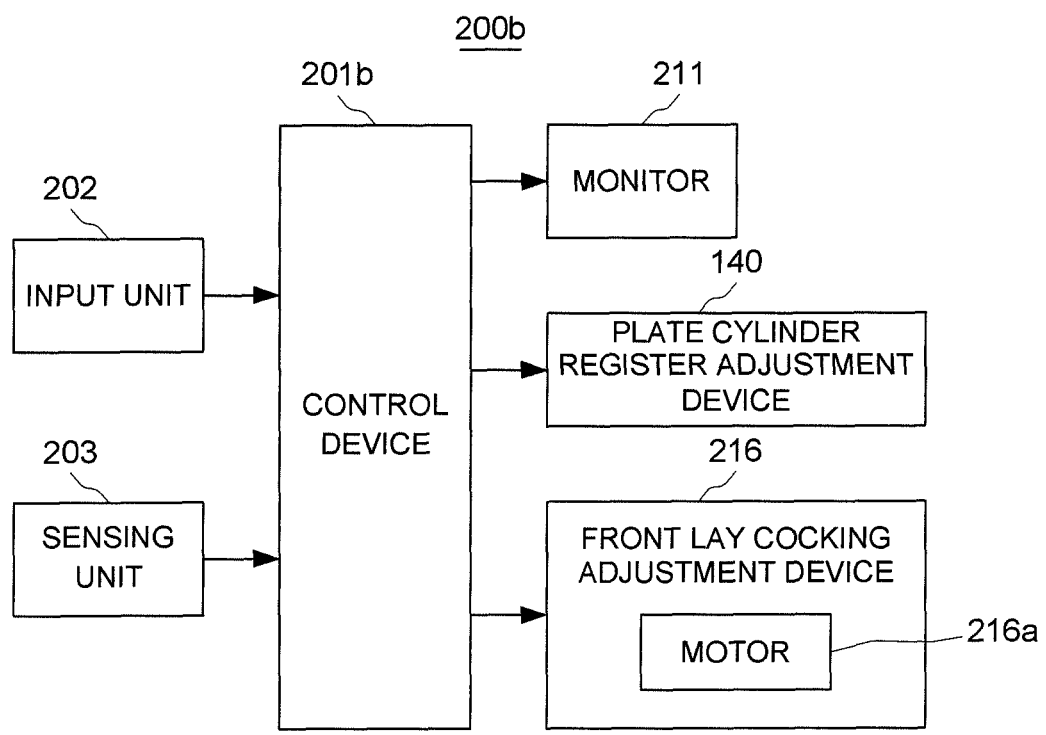
FIG. 37 is a block diagram showing the circuit arrangement of a control console that performs an automatic front lay cocking adjustment operation in the description of a modification of the third embodiment.

In this case, a front lay cocking adjustment device (cocking adjustment unit) 216 shown in FIG. 37 is used. The front lay cocking adjustment device 216 is formed by providing a motor 216a in the front lay cocking adjustment device 215 shown in FIG. 34. The motor 216a is connected to the rod 415 of the eccentric bearing 412. The control device 201 directly controls the front lay cocking adjustment device 216. The rest of the arrangement is the same as that in the third embodiment. Note that the same reference numerals as in FIG. 36 denote the corresponding portions in FIG. 37, An automatic front lay cocking adjustment operation of automatically adjusting the orientation of the front lay 101a using the front lay cocking adjustment device 216 will be described.

In this case as well, the above-described plate positioning step S1 and lenticular lens sheet aligning step S2 are performed. Then, the distance measurement step S3 of causing the sensing unit 203 and the distance calculation unit 232 to calculate the distance (gap distance) hs between the stopper 22 of the table 20 and the lower edge 1b of the lenticular lens sheet 1 is performed. The adjustment amount calculation unit 231 calculates the cocking adjustment amount hp from the known sizes Ls and Lp registered in advance and the distance hs output from the distance calculation unit 232 (calculation step S4). The monitor 211 displays the cocking adjustment amount hp (display step S5).

The control unit 233 drives the motor 216a of the front lay cocking adjustment device 216 in accordance with the cocking adjustment amount hp. One rod 415 connected to the motor 216a moves in a predetermined direction by the cocking adjustment amount hp.

One end of the shaft 402 perpendicular to the drive-side frame 141 thus moves in the sheet conveyance direction or the direction reverse to it more than the other end, and the entire shaft 402 tilts with respect to the axial direction. Along with the tilt of the entire shaft 402, the front lay 101a fixed to the holder 403 axially supported by the large-diameter portion at the center of the shaft 402 tilts by the cocking adjustment amount hp.

One end (leading-side end) of the lenticular lens sheet 1 conveyed on the feedboard 401 of the feeder board FB abuts against the front lay 101*a* tilted by the cocking adjustment amount hp. The lenticular lens sheet 1 thus tilts in accordance with the tilt state of the front lay 101*a*.

<Fourth Embodiment>

Figure 39:
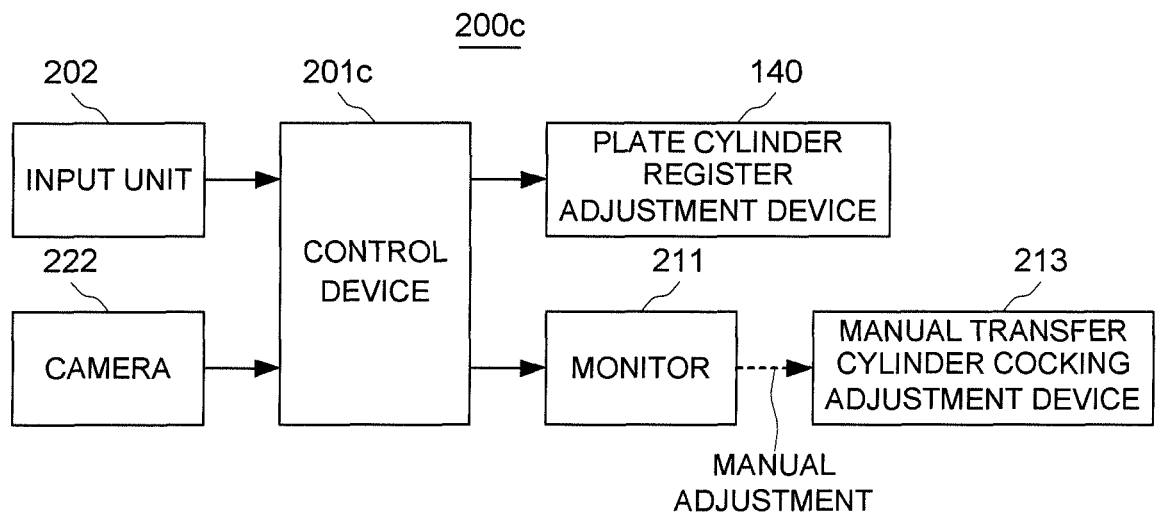
FIG. 39 is a block diagram showing the circuit arrangement of a control console that performs a manual transfer cylinder cocking adjustment operation in the fourth embodiment.
Figure 40:
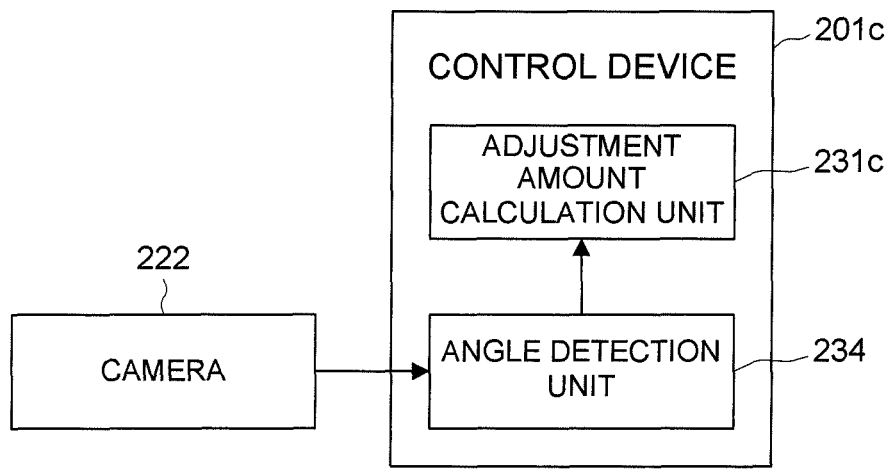
FIG. 40 is a block diagram showing the arrangement of a control device in FIG. 39.

The fourth embodiment of the present invention will be described next with reference to FIGS. 38, 39, and 40. The same reference numerals as in FIGS. 1 and 9 denote the corresponding portions in FIGS. 38 and 39.

A four-color sheet-fed web offset printing press 100*a* according to the fourth embodiment is different from the four-color sheet-fed web offset printing press 100 according to the first embodiment in the method of calculating a cocking adjustment amount hp.

Figure 38:
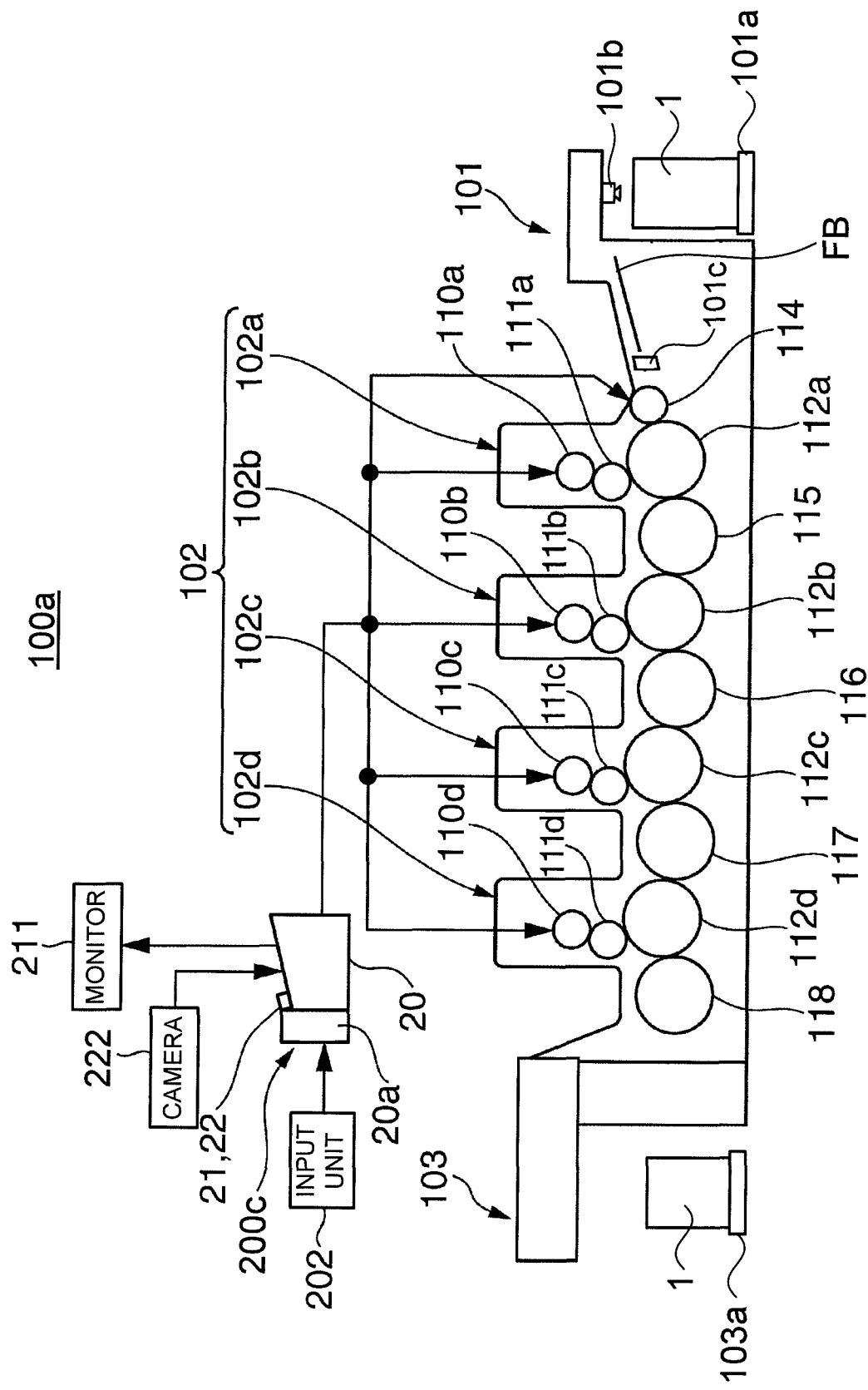
FIG. 38 is a side view showing the arrangement of a four-color sheet-fed web offset printing press according to the fourth embodiment.

As shown in FIG. 38, a control console 200*c* of the four-color sheet-fed web offset printing press 100*a* includes a camera 222 disposed above the upper surface of a table 20. As shown in FIG. 39, the camera 222 is connected to a control device 201*c* of the control console 200*c*. The control device 201*c* has a microcomputer configuration including a CPU, and includes an angle detection unit 234 and an adjustment amount calculation unit 231*c*, as shown in FIG. 40. The functions of the angle detection unit 234 and the adjustment amount calculation unit 231*c* will be described later. The rest of the arrangement of the four-color sheet-fed web offset printing press 100*a* is the same as that of the four-color sheet-fed web offset printing press 100 according to the first embodiment, and a description thereof will be omitted.

<Plate Cylinder Register Adjustment Operation>

The adjustment operation of the four-color sheet-fed web offset printing press 100*a* will be described next.

The circumferential and lateral register adjustment operations for plate cylinders 110*a* to 110*d* by a plate cylinder register adjustment device 140 when circumferential and lateral misregistrations are generated between a lenticular lens sheet 1 and a pattern 13 of a plate 10*a* mounted on the plate cylinder 110*a* are the same as in the first embodiment. Hence, a description of the circumferential and lateral register adjustment operations will be omitted.

<Manual Plate Cylinder Cocking Adjustment Operation>

A manual plate cylinder cocking adjustment operation when manually adjusting the skewing register of a transfer cylinder 114 using a manual transfer cylinder cocking adjustment device 213 will be described.

Figure 42:
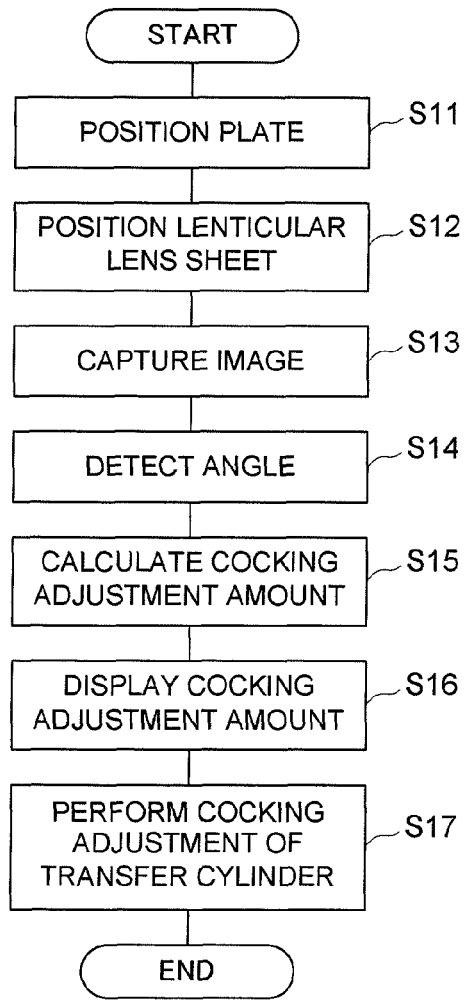
FIG. 42 is a flowchart showing the procedure of the cocking adjustment operation of the transfer cylinder.

First, the operator places the plate 10*a* of the first color to be mounted on the plate cylinder 110*a* on the upper surface of the table 20 of the control console 200*c*. At this time, a rectangular notch 11 and a U-shaped notch 12 formed in a lower edge 19 of the plate 10*a* are fitted on two stoppers 21 and 22 projecting from a frame 20*a* of the table 20 so as to abut against them, as shown in FIG. 14. The plate 10*a* is thus positioned on the table 20. Plate positioning step S11 (FIG. 42) of the plate 10*a* is performed in this way.

Figure 41A:
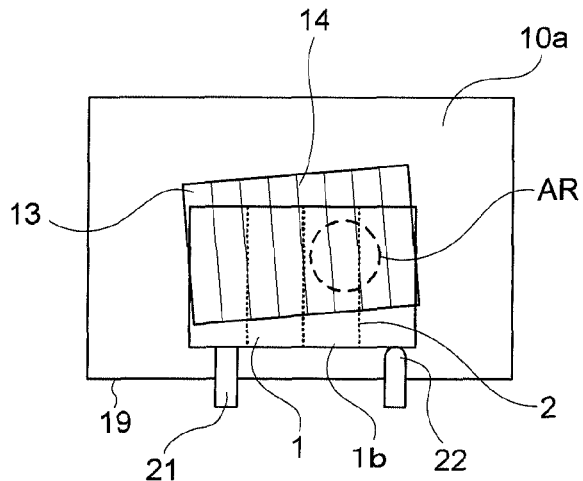
FIGS. 41A and 41B are plan views showing a state in which the boundary lines of the pattern of a plate crosses the groove lines of a lenticular lens sheet.

As shown in FIG. 41A, the operator places the lenticular lens sheet 1 on the plate 10*a* positioned on the table 20 and abuts the lower edge 1*b* of the lenticular lens sheet 1 against the stoppers 21 and 22 of the table 20. Positioning step S12 (FIG. 42) of positioning the plate 10*a* and the lenticular lens sheet 1 by the stoppers 21 and 22 is performed in this way.

Figure 41B:
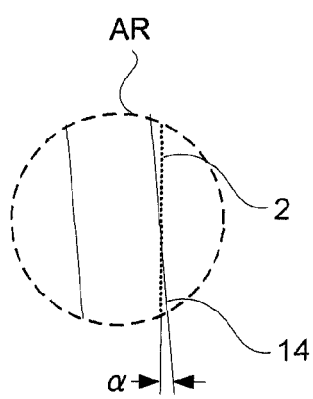

In this state, the operator captures a predetermined area AR from above the lenticular lens sheet 1 using the camera 222. Since the lenticular lens sheet 1 is formed from a transparent member, a captured image in which a plurality of boundary lines 14 of the pattern 13 of the plate 10*a* and a plurality of groove lines 2 of the lenticular lens sheet 1 cross, as shown in FIG. 41B, is obtained. Image capturing step S13 (FIG. 42) is performed in this way. The image data of the captured image is output from the camera 222 to the control device 201*c*.

The angle detection unit 234 of the control device 201*c* performs image analysis of the image data, thereby calculating an angle α made by the boundary lines 14 of the pattern 13 of the plate 10*a* positioned to the reference position by the stoppers 21 and 22 and the groove lines 2 of the lenticular lens sheet 1 positioned by abutting the lower edge 1*b* against the stoppers 21 and 22. Detection step S14 (FIG. 42) of detecting the angle α made by the boundary lines 14 and the groove lines 2 is performed in this way.

Next, the adjustment amount calculation unit 231*c* of the control device 201*c* calculates the cocking adjustment amount hp of the lenticular lens sheet 1 with respect to the pattern 13 of the plate 10*a* based on the angle α. The angle α equals the angle θ shown in FIGS. 17A to 17C. Hence, using a distance Lp between the shaft supporting portions of the transfer cylinder 114, the cocking adjustment amount hp is obtained by hp=Lp×sin α. Calculation step S15 (FIG. 42) of the cocking adjustment amount hp is performed in this way. Note that the cocking adjustment amount hp may directly be calculated from the relationship between the boundary lines 14 and the groove lines 2 without obtaining the angle α.

The control device 201*c* displays the calculated cocking adjustment amount hp on a monitor 211. The operator can thus recognize the cocking adjustment amount hp serving as an index when manually performing cocking adjustment of the transfer cylinder 114. Display step S16 (FIG. 42) of the cocking adjustment amount hp is performed in this way.

The operator operates a handle 337 based on the cocking adjustment amount hp displayed on the monitor 211 while confirming a dial 337*a* of the manual transfer cylinder cocking adjustment device 213. In accordance with the operation of the handle 337, a lever 339 swings via a piece 341, and an eccentric bearing 336 pivots via a rod 342 by an angle corresponding to the pivotal operation of the handle 337. The transfer cylinder 114 thus undergoes skewing adjustment (cocking adjustment) in accordance with the pivotal movement of the eccentric bearing 336. Transfer cylinder cocking adjustment step S17 (FIG. 42) is performed in this way.

Since the bearing 336 on the operation side of the transfer cylinder 114 has an eccentric amount t4, the shaft of the transfer cylinder 114 tilts with respect to the shaft of the impression cylinder 112*a* by the eccentric function of the bearing 336, and skewing adjustment (cocking adjustment) is performed by the cocking adjustment amount hp. The lenticular lens sheet 1 conveyed via the transfer cylinder 114 also tilts by the cocking adjustment amount hp, and the conveyance angle of the lenticular lens sheet 1 is adjusted.

That is, when the lenticular lens sheet 1 conveyed via a feeder board FB and the swing device is transferred to the gripper device of the transfer cylinder 114, the lenticular lens sheet 1 is held and conveyed in a state in which the conveyance angle undergoes skewing adjustment by the cocking adjustment amount hp because the manual transfer cylinder cocking adjustment device 213 has performed the skewing adjustment of the transfer cylinder 114 in advance by the cocking adjustment amount hp.

As described above, the circumferential position adjustment mechanism and the lateral position adjustment mechanism of the plate cylinder register adjustment device 140 perform the circumferential and lateral register adjustment operations of the plate cylinders 110*a* to 110*d* in advance. In addition, the manual transfer cylinder cocking adjustment device 213 performs the cocking adjustment operation of the transfer cylinder 114 in advance. Adjustment is thus performed in advance to a transfer enable state in which the plurality of boundary lines 14 of the pattern 13 of each of the plates 10a to 10d on the plate cylinders 110a to 110d of the first to fourth colors match the plurality of groove lines 2 of the lenticular lens sheet 1.

When passing through the transfer cylinder 114 that has undergone the skewing adjustment in advance, the lenticular lens sheet 1 having the tilted groove lines 2 also undergoes skewing adjustment by itself. The lenticular lens sheet 1 that has undergone the skewing adjustment passes between the impression cylinder 112a and the blanket cylinder 111a in contact with the plate cylinder 110a that has undergone the circumferential and lateral register adjustments in advance. At this time, a positional relationship in which the boundary lines 14 of the pattern 13 of the plate 10a transferred via the blanket cylinder 111a relatively match the groove lines 2 of the lenticular lens sheet 1 is obtained. It is therefore possible to accurately transfer the combined pattern portions (A1+B1, A2+B2, . . . ) of the pattern 13 of the plate 10a to the pattern transfer regions between the groove lines 2 of the lenticular lens sheet 1 without shifts. The adjustment operation of the four-color sheet-fed web offset printing press 100a thus ends.

Test printing and fine adjustment operations after that are the same as in the first embodiment. Additionally, as in the first embodiment, the circumferential and lateral register adjustment operations may be performed after the cocking adjustment operation of the transfer cylinder 114.

<Printing Operation of Four-Color Sheet-Fed Web Offset Printing Press>

The printing operation of the four-color sheet-fed web offset printing press 100a for the lenticular lens sheet 1 of the first lot is the same as in the first embodiment. Hence, printing for the lenticular lens sheet 1 of the second lot will be described.

A method of calculating the cocking adjustment amount hp for the lenticular lens sheet 1 of the second lot will be explained. In a state in which the lenticular lens sheet 1 of the second lot is overlaid on the lenticular lens sheet 1 of the first lot, the operator abuts the lower edges 1b of the two lenticular lens sheets 1 against the stoppers 21 and 22 of the table 20. Without rotating the lenticular lens sheet 1 of the second lot, the operator captures the predetermined area AR from above the lenticular lens sheet 1 using the camera 222. With this operation, a captured image in which the plurality of groove lines 2 of the lenticular lens sheet 1 of the first lot and the plurality of groove lines 2 of the lenticular lens sheet 1 of the second lot cross is obtained.

The angle detection unit 234 of the control device 201c performs image analysis of the image data of the captured image, thereby calculating the angle α made by the groove lines 2 of the lenticular lens sheet 1 of the first lot and the groove lines 2 of the lenticular lens sheet 1 of the second lot. The adjustment amount calculation unit 231c of the control device 201c calculates the cocking adjustment amount hp of the lenticular lens sheet 1 of the second lot with respect to the lenticular lens sheet 1 of the first lot based on the angle α. The thus obtained cocking adjustment amount hp of the lenticular lens sheet 1 of the second lot is the difference from the cocking adjustment amount hp of the lenticular lens sheet 1 of the first lot.

The cocking adjustment amount hp of the lenticular lens sheet 1 of the second lot is also calculated in advance before the start of the printing operation of the four-color sheet-fed web offset printing press 100a. After printing of the lenticular lens sheets 1 of the first lot, the operator operates the handle 337 based on the cocking adjustment amount hp of the second lot (the difference from the cocking adjustment amount hp of the first lot) obtained in advance while confirming the dial 337a of the manual transfer cylinder cocking adjustment device 213. Since the transfer cylinder 114 undergoes skewing adjustment (cocking adjustment) in accordance with the lenticular lens sheet 1 of the second lot, the conveyance angle of the lenticular lens sheet 1 of the second lot conveyed via the transfer cylinder 114 also undergoes skewing adjustment.

If a jig plate 10j shown in FIG. 21 is present, the lenticular lens sheet 1 of the second lot is overlaid on the jig plate 10j, and this state is captured by the camera 222. This allows the control device 201c to obtain the cocking adjustment amount hp of the lenticular lens sheet 1 of the second lot. That is, the angle detection unit 234 analyzes the image data of the captured image, and calculates the angle α made by the plurality of boundary lines 14 of the pattern 13 of the jig plate 10j and the plurality of groove lines 2 of the lenticular lens sheet 1 of the second lot. The adjustment amount calculation unit 231c calculates the cocking adjustment amount hp of the lenticular lens sheet 1 of the second lot based on the angle α. This corresponds to the above-described absolute cocking adjustment amount hp. Hence, the adjustment amount calculation unit 231c calculates the difference between the cocking adjustment amount hp of the lenticular lens sheet 1 of the second lot and the cocking adjustment amount hp of the lenticular lens sheet 1 of the first lot. The control device 201c displays the difference on the monitor 211 as the cocking adjustment amount hp of the lenticular lens sheet 1 of the second lot.

After the printing operation of the lenticular lens sheets 1 of the first lot has ended, the operator operates the handle 337 based on the difference displayed on the monitor 211 while confirming the dial 337a of the manual transfer cylinder cocking adjustment device 213 from the state in which the transfer cylinder 114 has undergone the skewing adjustment (cocking adjustment) based on the cocking adjustment amount hp of the first lot. Transfer cylinder cocking adjustment step S17 of the transfer cylinder 114 for the lenticular lens sheet 1 of the second lot is performed in this way.

Use of the jig plate 10j makes it possible to obtain the cocking adjustment amount hp of the lenticular lens sheet 1 of the second lot during printing of the lenticular lens sheet 1 of the first lot.

<First Modification of Fourth Embodiment>

In the fourth embodiment, the operator manually performs transfer cylinder cocking adjustment using the manual transfer cylinder cocking adjustment device 213 of the control console 200c. The transfer cylinder cocking adjustment may be performed automatically. In this case, an automatic transfer cylinder cocking adjustment device (cocking adjustment unit) 214 having the same arrangement as that of the automatic transfer cylinder cocking adjustment device 214 shown in FIG. 24 is used in place of the manual transfer cylinder cocking adjustment device 213, as in the second modification of the first embodiment. The automatic transfer cylinder cocking adjustment device 214 functions as a sheet skewing device (cocking adjustment unit) that adjusts the angle of the lenticular lens sheet 1 with respect to the plate 10a.

Figure 43:
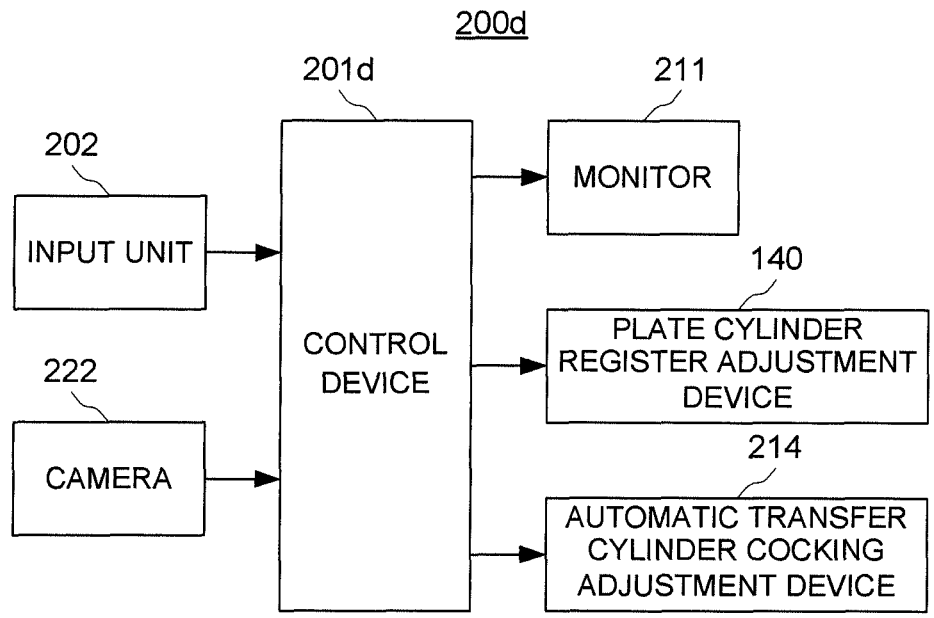
FIG. 43 is a block diagram showing the circuit arrangement of a control console that performs a manual transfer cylinder cocking adjustment operation in the description of a modification of the fourth embodiment.

As shown in FIG. 43, a control console 200d includes a control device 201d, an input unit 202, the camera 222, the monitor 211, the plate cylinder register adjustment device 140, and the automatic transfer cylinder cocking adjustment device 214. The input unit 202, the camera 222, the monitor 211, the plate cylinder register adjustment device 140, and the automatic transfer cylinder cocking adjustment device 214 are connected to the control device 201d.

Figure 44:
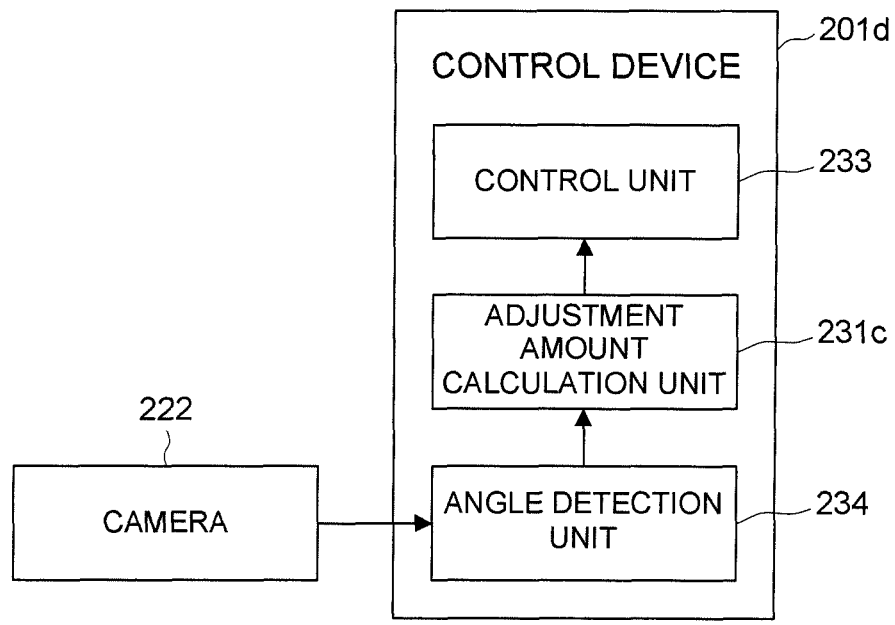
FIG. 44 is a block diagram showing the arrangement of a control device in FIG. 43.

As shown in FIG. 44, the control device 201d includes a control unit 233 in addition to the above-described angle detection unit 234 and adjustment amount calculation unit 231c. The control unit 233 controls the motor 345 of the automatic transfer cylinder cocking adjustment device 214 based on the cocking adjustment amount hp calculated by the adjustment amount calculation unit 231c, thereby controlling the sheet skewing device.

In the automatic transfer cylinder cocking adjustment operation as well, the plate positioning step S11, the positioning step S12 of positioning the plate 10a and the lenticular lens sheet 1, the image capturing step S13, the detection step S14 of detecting the angle α, and the calculation step S15 of the cocking adjustment amount hp are performed, as in the above-described manual transfer cylinder cocking adjustment operation. The cocking adjustment amount hp is output to the control unit 233. At this time, the cocking adjustment amount hp can also be displayed on the monitor 211 (display step S16).

The control unit 233 drives the motor 345 of the automatic transfer cylinder cocking adjustment device 214 in accordance with the cocking adjustment amount hp. This moves the rod 342 and makes the eccentric bearing 336 pivotally attached to the distal end of the rod 342 pivot by an angle corresponding to the cocking adjustment amount hp. As a result, the transfer cylinder 114 undergoes skewing adjustment (cocking adjustment) in accordance with the pivotal movement of the eccentric bearing 336. The control step of the control device 201d for the automatic transfer cylinder cocking adjustment device 214 is performed in this way.

<Second Modification of Fourth Embodiment>

In this embodiment, the angle α made by the boundary lines 14 of the pattern 13 of the plate 10a and the groove lines 2 of the lenticular lens sheet 1 is calculated by the camera 222 and the angle detection unit 234 of the control device 201c or 201d, and the cocking adjustment amount hp is calculated based on the angle α. This method of calculating the cocking adjustment amount hp is also applicable to the second embodiment and the modification thereof and the third embodiment and the modification thereof.

<Other Embodiments>

In the first to fourth embodiments, a case has been described in which the lenticular lens sheet 1 on which two types of pattern portions A1, B1, A2, B2, . . . are printed is used as the printing target. However, in the present invention, a lenticular lens sheet on which three types of pattern portions A1, B1, C1, A2, B2, C2, . . . are printed, or more types of pattern portions are printed may be used as the printing target.

In the first to fourth embodiments, a case has been described in which register adjustment (circumferential and lateral directions) of the plates 10b to 10d is performed using, as the reference, the register adjustment amount of the first plate 10a out of the printing units 102a to 102d of the four colors. However, in the present invention, the jig plate 10j shown in FIG. 21 may be used, and the register adjustment of the four plates 10a to 10d may be performed using the register adjustment amount of the jig plate 10j as the reference.

In the first to fourth embodiments, a case has been described in which the two stoppers 21 and 22 in the control console 200 are used. However, in the present invention, two or more reference members may be used.

In the first to fourth embodiments, a case has been described in which the plate 10a is positioned on the table 20 using the stoppers 21 and 22 serving as the reference members. However, in the present invention, two plate positioning members that position the plate 10a on the table 20 may be provided independently of the stoppers 21 and 22 serving as the reference members.

<Effects of Embodiments>

According to the above-described embodiments, the cocking adjustment amount hp for the cocking adjustment unit (140, 213 to 215) is calculated based on the relationship between the boundary lines 14 of the plate 10 and the groove lines 2 of the lenticular lens sheet 1 in a state in which the lenticular lens sheet 1 is overlaid on the plate 10. The relative angle between the plate 10 and the lenticular lens sheet 1 is adjusted based on the cocking adjustment amount hp. It is therefore possible to accurately align the plurality of pattern portions A1, B1, . . . of the plate 10 with the groove lines 2 between the lenses of the lenticular lens sheet 1 before printing, and reduce the number of rejected sheets and improve the productivity.

In an embodiment, the lenticular lens sheet 1 is overlaid on the plate 10 positioned on the table 20. At this time, the lenticular lens sheet 1 is overlaid while bringing an edge of the lenticular lens sheet 1 into contact with one stopper 21 such that the groove lines 2 of the lenticular lens sheet 1 become parallel to the boundary lines 14 of the plate 10. The cocking adjustment amount hp is calculated based on the distance hs from the other stopper 22 to the edge of the lenticular lens sheet 1 at this time. According to this method, the cocking adjustment amount hp can be calculated using simple members or the table 20 and the two stoppers 21 and 22.

In this case, the plate 10 may be provided with the scale 17 configured to measure the distance hs from the other stopper 22 to the edge of the lenticular lens sheet 1. This makes it possible to accurately measure the distance hs from the other stopper 22 to the edge of the lenticular lens sheet 1 when the boundary lines 14 of the pattern 13 formed on the plate 10 are parallel to the groove lines 2 of the lenticular lens sheet 1.

In another embodiment, the angle α between the boundary lines 14 and the groove lines 2 is detected based on the image obtained by capturing the boundary lines 14 between the plurality of pattern portions A1, B1, . . . formed on the plate 10 and the groove lines 2 between the lenses of the lenticular lens sheet 1. The cocking adjustment amount hp is calculated based on the angle α. According to this method, the operator can be saved from aligning the plate 10 and the lenticular lens sheet 1 such that the groove lines 2 become parallel to the boundary lines 14, and the cocking adjustment amount hp can be calculated in a short time.

In this case, the plate 10 and the lenticular lens sheet 1 positioned by the two stoppers 21 and 22 may be captured in a state in which the lenticular lens sheet 1 is overlaid on the plate 10. The angle α between the boundary lines 14 of between the pattern portions A1, B1, . . . of the plate 10 and the groove lines 2 of the lenticular lens sheet 1 can thus accurately be detected.

According to the above-described embodiments, the cocking adjustment unit (140, 213 to 215) includes the operation unit 187 or 337 configured to operate the cocking adjustment unit (140, 213 to 215). Hence, when the operator is caused to recognize, via the display unit 211, the cocking adjustment amount hp calculated by the adjustment amount calculation unit 231 of the control device 201, the operator can operate the operation unit 187 or 337 of the cocking adjustment unit (140, 213 to 215) in accordance with the cocking adjustment amount hp and perform cocking adjustment. It is therefore possible to easily and accurately perform the cocking adjustment operation.

According to the above-described embodiments, the control unit 233 of the control device 201 controls the cocking adjustment unit (140, 213 to 215) based on the cocking adjustment amount hp. The cocking adjustment operation is thus automatically executed without making the operator perform the cocking adjustment operation. Hence, the burden on the operator largely decreases, and accurate cocking adjustment is performed.

The cocking adjustment unit can be formed from the plate cylinder cocking device 140 that adjusts the axial-direction orientations of the plate cylinders 110a to 110d to which the plates 10 are attached or the sheet skewing devices 213 to 215 each of which adjusts the angle of the lenticular lens sheet 1 with respect to the plate 10. The relative angle between the plate 10 and the lenticular lens sheet 1 can be adjusted by the plate cylinder cocking device 140 or the sheet skewing devices 213 to 215.

What is claimed is:

1. A printing press of a lenticular lens sheet, comprising:
   a cocking adjustment unit that adjusts a relative angle between a plate on which a pattern formed from a plurality of pattern portions is formed such that boundary lines between the adjacent pattern portions become parallel and the lenticular lens sheet on which a plurality of lenses are formed such that groove lines between the adjacent lenses become parallel and which is transparent;
   a table on which the plate and the lenticular lens sheet are placed;
   an adjustment amount calculation unit that calculates an adjustment amount for the cocking adjustment unit based on a relationship between the boundary lines of the pattern formed on the plate and the groove lines of the lenticular lens sheet that are in a state in which the lenticular lens sheet is overlaid on the plate placed on the table; and
   a plate cylinder to which the plate is attached,
   wherein the cocking adjustment unit comprises a plate cylinder cocking device that adjusts an axial-direction orientation of the plate cylinder based on the adjustment amount calculated by the adjustment amount calculation unit.

2. A printing press according to claim 1, further comprising:
   a first reference member and a second reference member that are arranged on the table while being spaced apart from each other.

3. A printing press according to claim 2, wherein the adjustment amount calculation unit is configured to calculate the adjustment amount based on a distance from the second reference member to the edge of the lenticular lens sheet when the lenticular lens sheet is overlaid on the plate positioned on the table while being in contact with the first reference member such that the groove lines become parallel to the boundary lines.

4. A printing press according to claim 3, wherein the plate includes a scale indicating the distance from the second reference member.

5. A printing press according to claim 3, further comprising a distance detection unit that detects the distance from the second reference member to the edge of the lenticular lens sheet.

6. A printing press according to claim 1, further comprising:
   a camera that captures the boundary lines and the groove lines; and
   an angle detection unit that detects an angle between the boundary lines and the groove lines based on an image captured by the camera,
   wherein the adjustment amount calculation unit is configured to calculate the adjustment amount based on the angle detected by the angle detection unit.

7. A printing press according to claim 6, further comprising:
   two reference members provided on the table and serving as positioning references of the plate and the lenticular lens sheet,
   wherein the camera captures the plate and the lenticular lens sheet positioned by the two reference members in the state in which the lenticular lens sheet is overlaid on the plate.

8. A printing press according to claim 1, further comprising:
   a display unit that displays the adjustment amount calculated by the adjustment amount calculation unit,
   wherein the cocking adjustment unit includes an operation unit configured to operate the cocking adjustment unit.

9. A printing press according to claim 1, further comprising a control unit configured to control the cocking adjustment unit based on the adjustment amount calculated by the adjustment amount calculation unit.

10. A printing method of a lenticular lens sheet, comprising the steps of:
    positioning a plate on which a pattern including a plurality of pattern portions is formed such that boundary lines between the adjacent pattern portions become parallel and the lenticular lens sheet on which a plurality of lenses are formed such that groove lines between the adjacent lenses become parallel and which is transparent by placing the plate on a table and overlaying the lenticular lens sheet on the plate;
    calculating, by an adjustment amount calculation unit based on a relationship between the boundary lines of the pattern formed on the plate and the groove lines of the lenticular lens sheet that are in a state in which the lenticular lens sheet is overlaid on the plate placed on the table, an adjustment amount for a cocking adjustment unit that adjusts a relative angle between the plate and the lenticular lens sheet; and
    adjusting, by a plate cylinder cocking device that the cocking adjustment unit comprises, an axial-direction orientation of a plate cylinder to which the plate is attached based on the calculated adjustment amount.

11. A method according to claim 10, wherein the step of positioning the plate and the lenticular lens sheet includes the steps of:
    positioning the plate by a first reference member and a second reference member that are arranged on the table while being spaced apart from each other; and
    overlaying the lenticular lens sheet on the positioned plate.

12. A method according to claim 11, further comprising the steps of:
    rotating the lenticular lens sheet such that an edge of the lenticular lens sheet overlaid on the plate is separated from the second reference member while being kept in contact with the first reference member to make the groove lines and the boundary lines parallel; and
    measuring a distance from the second reference member to the edge of the lenticular lens sheet,
    wherein the step of calculating the adjustment amount includes the step of calculating the adjustment amount based on the distance.

13. A method according to claim 12, wherein the step of measuring the distance includes the step of causing a distance detection unit to measure the distance.

14. A method according to claim 10, further comprising the steps of:

causing a camera to capture the boundary lines and the groove lines in the state in which the lenticular lens sheet is overlaid on the plate; and detecting an angle between the boundary lines and the groove lines based on an image captured by the camera, wherein the step of calculating the adjustment amount includes the step of calculating the adjustment amount based on the angle.

15. A method according to claim 10, further comprising the step of displaying the calculated adjustment amount on a display unit.

16. A method according to claim 10, the step of adjusting includes the step of causing a control unit to control the cocking adjustment unit based on the calculated adjustment amount.

17. A printing press of a lenticular lens sheet, comprising:
a cocking adjustment unit that adjusts a relative angle between a plate on which a pattern formed from a plurality of pattern portions is formed such that boundary lines between the adjacent pattern portions become parallel and the lenticular lens sheet on which a plurality of lenses are formed such that groove lines between the adjacent lenses become parallel and which is transparent;

a table on which the plate and the lenticular lens sheet are placed; and an adjustment amount calculation unit that calculates an adjustment amount for the cocking adjustment unit based on a relationship between the boundary lines of the pattern formed on the plate and the groove lines of the lenticular lens sheet that are in a state in which the lenticular lens sheet is overlaid on the plate placed on the table, wherein the cocking adjustment unit comprises a sheet skewing device that adjusts a conveyance angle of the lenticular lens sheet based on the adjustment amount calculated by the adjustment amount calculation unit.

18. A printing method of a lenticular lens sheet, comprising the steps of:

positioning a plate on which a pattern including a plurality of pattern portions is formed such that boundary lines between the adjacent pattern portions become parallel and the lenticular lens sheet on which a plurality of lenses are formed such that groove lines between the adjacent lenses become parallel and which is transparent by placing the plate on a table and overlaying the lenticular lens sheet on the plate;

calculating, by an adjustment amount calculation unit based on a relationship between the boundary lines of the pattern formed on the plate and the groove lines of the lenticular lens sheet that are in a state in which the lenticular lens sheet is overlaid on the plate placed on the table, an adjustment amount for a cocking adjustment unit that adjusts a relative angle between the plate and the lenticular lens sheet; and adjusting, by a sheet skewing device that the cocking adjustment unit comprises, a conveyance angle of the lenticular lens sheet based on the calculated adjustment amount.

* * * * *